United States Patent
Walker et al.

(10) Patent No.: US 7,627,496 B2
(45) Date of Patent: Dec. 1, 2009

(54) SYSTEMS AND METHODS FOR VENDING MACHINE CUSTOMER ACCOUNT MANAGEMENT

(75) Inventors: Jay S. Walker, Ridgefield, CT (US); Matthew D. Breitenbach, Ridgefield, CT (US); Paul T. Breitenbach, Wilton, CT (US); Sih Y. Lee, Northvale, NJ (US); Paul D. Signorelli, Ridgefield, CT (US); Daniel E. Tedesco, Shelton, CT (US); Dean P. Alderucci, Westport, CT (US); Gregory J. Scribner, New Milford, CT (US)

(73) Assignee: Walker Digital, LLC, Stamford, CT (US)

( * ) Notice: Subject to any disclaimer, the term of this patent is extended or adjusted under 35 U.S.C. 154(b) by 368 days.

(21) Appl. No.: 11/398,378

(22) Filed: Apr. 5, 2006

(65) Prior Publication Data

US 2006/0247824 A1 Nov. 2, 2006

Related U.S. Application Data

(60) Provisional application No. 60/668,405, filed on Apr. 5, 2005.

(51) Int. Cl.
 *G06Q 20/00* (2006.01)
 *G06Q 30/00* (2006.01)
(52) U.S. Cl. .............................. 705/16; 705/26; 705/14
(58) Field of Classification Search ................ 705/16
 See application file for complete search history.

(56) References Cited

U.S. PATENT DOCUMENTS

| | | | |
|---|---|---|---|
| 5,269,521 A | 12/1993 | Rossides | |
| 5,772,510 A | 6/1998 | Roberts | |
| 5,997,236 A | 12/1999 | Picioccio | |
| 6,044,952 A | 4/2000 | Haggerty et al. | 194/207 |
| 6,085,888 A * | 7/2000 | Tedesco et al. | 194/217 |
| 6,298,972 B1 * | 10/2001 | Tedesco et al. | 194/217 |
| 6,854,642 B2 | 2/2005 | Metcalf | |
| 6,898,299 B1 * | 5/2005 | Brooks | 382/115 |
| 6,990,472 B2 * | 1/2006 | Rosenhaft et al. | 705/77 |
| 7,318,049 B2 * | 1/2008 | Iannacci | 705/39 |
| 2001/0053685 A1 * | 12/2001 | Mori et al. | 455/411 |
| 2002/0046186 A1 * | 4/2002 | Nishio et al. | 705/65 |
| 2002/0062175 A1 * | 5/2002 | Lion | 700/237 |
| 2002/0120499 A1 * | 8/2002 | Liu et al. | 705/14 |
| 2002/0165787 A1 | 11/2002 | Bates et al. | 705/26 |
| 2002/0165788 A1 | 11/2002 | Bates et al. | 705/26 |

(Continued)

FOREIGN PATENT DOCUMENTS

WO    WO 97/28510    8/1997

OTHER PUBLICATIONS

Jeff Cioletti (Feb. 2003). Cash out? Beverage World, 122(1723), 47-48. Retrieved Apr. 9, 2008, from ABI/INFORM Global database. (Document ID: 293631411).*

(Continued)

*Primary Examiner*—Matthew S Gart
*Assistant Examiner*—Ashford S Hayles

(57) ABSTRACT

Some embodiments are associated with providing, establishing, registering, administering, and/or managing vending machine subscription accounts. In some embodiments, third parties may administer and/or manage subscription-vending accounts associated with customers.

20 Claims, 47 Drawing Sheets

U.S. PATENT DOCUMENTS

| | | | |
|---|---|---|---|
| 2003/0088333 A1* | 5/2003 | Liff et al. .................... | 700/237 |
| 2004/0006695 A1* | 1/2004 | Ishibashi et al. ............ | 713/175 |
| 2004/0068346 A1* | 4/2004 | Boucher .................... | 700/241 |
| 2004/0073814 A1* | 4/2004 | Miyazaki et al. ............ | 713/202 |
| 2004/0153421 A1* | 8/2004 | Robinson .................... | 705/75 |
| 2004/0249711 A1 | 12/2004 | Walker et al. ................ | 705/14 |
| 2005/0240958 A1* | 10/2005 | Nguyen et al. ............... | 725/20 |
| 2005/0242174 A1* | 11/2005 | Lealao et al. ............... | 235/381 |
| 2005/0261977 A1* | 11/2005 | Kiji et al. .................... | 705/26 |
| 2006/0155607 A1* | 7/2006 | Bahir .......................... | 705/26 |

OTHER PUBLICATIONS

Notice of Allowability for U.S. Appl. No. 08/892,080 dated Sep. 30, 1999, 1pg.

Interview Summary for U.S. Appl. No. 09/460,353 dated Sep. 17, 2007, 2pp.

Office Action for U.S. Appl. No. 09/460,353 dated Feb. 7, 2008, 12pp.

International Search Report mailed Jun. 17, 2005, 3 pp.

Written Opinion of the International Searching Authority PCT/US04/41561 dated Jun. 17, 2005, 3pp.

International Search Report for Application No. PCT/US07/65859, dated Oct. 18, 2007, 3pp.

Written Opinion for Application No. PCT/US07/65859, dated Oct. 18, 2007, 3pp.

International Search Report for Application No. PCT/US07/65859, dated Oct. 18, 2007, 4pp.

Stanton, John L. et al., "21 food trends for the $21^{st}$ century. Super Marketing", Grocery Marketing, Sep. 1996, Section: vol. 62, No. 9, p. 62, ISSN: 0888-0360.

Young, Steve et al., "Cashless Vending Machines", CNNfn Digial Jam, Copyright 1999, (http global factivia com/en/arch/display asp).

"Computers/Data Collection; National NAMA Expo Equipment Report.", Automatic Merchandiser, Feb. 1, 2002, Section: No. 2, vol. 44, p. 27, 1061-1797.

Kasavana, Michael, "Labor scheduling software extends to other management functions; NAMA Insight.", Auto Merchandiser, May 1, 2003, Section: No. 5, vol. 45, p. 12, ISSN: 1061-1797.

"Cruise Critic's Top Tips for Finding the Best Cruise Values and Saving Money Onboard", PR Newswire, Aug. 26, 2003, Section: Lifestyle.

Berk, Christina Cheddar, "A Reliable Vending Machine? Right", The Wall Street Journal, Nov. 12, 2003.

Website: "Eliminate Manual Sales, Costly Inventories, Increase Security and Automate Card Sales!", (http //www vendapin com/pinprinter html), download date: Nov. 13, 2003.

Website: "The swipe & sip soda: pepsi taste-tests new wireless credit card system for vending machines", mpulse, (http //cooltown hp com/mpulse/0602-pepsi asp?print=yes), download date: Nov. 13, 2003.

* cited by examiner

Customer Care Application

Change Password

Access Quickstore24 Accounts

⇒ Search By Customer

⇒ Search By EZ Code

Enter An EZ Code*  [                    ]
red indicates required field
*indicates wildcard functionality

[SEARCH]

Access Quickstore24 Locations

⇒ Search By Location
Use the Access Quickstore24 feature after confirming the customer does not have an EZ Code. To search now, use either of the search features above.
If no account exists, then continue below.

Select A Location  [Select A Location ▼]
red indicates required field

[GO]

Incentives and Promotions

⇒ Add Email For Incentives And/Or Promotions:
[                    ]

[ADD EMAIL]

Figure 9

Additional Information About Home Page's Search By EZ Code feature

1. Complete the required Enter An EZ Code field and click the section's SEARCH button.

*IMPORTANT NOTES:* The search should only find exact matches based on the criteria defined.

2. Search Results:
   - If no results, then display a message at the top of the section indicating so (i.e., "No account met the search criteria").
   - If one results, go right into the customer's account, displaying the correct EZ Code page (to be detailed later in this document).
   - If multiple customers meet the criteria then go to the Search Results screen for EZ Codes. See below.

Search Results screen (Search By EZ Code)

Use the Search By EZ Code feature on the Home page to display this page when search criteria returns more than one result. Then, access the correct account and EZ Code page by clicking on the appropriate EZ Code link under the "EZ Code" column OR click on the Back button to return to previous page.

Search Results

Home     Search By EZ Code

| EZ Code | Username / Email | Status | Cust ID | Profile Name | Account Created |
|---|---|---|---|---|---|
| 461-7386 | gscribner@quickstore4.com | Active | 12354 | Gregg Scribner | 09/25/2004 |
| 461-7845 | Jacsm@aol.com | Active | 45443 | John Smith | 08/21/2004 |

BACK

The specifics of a customer's account are detailed later in this document (See Navigation Menu and Account Summary sections).

Figure 10

Search By Customer (Simple Search) screen
On the CCA Home page, click on the "Search By Customer" link under the Access Quickstore24 Accounts section.

The "Search By Customer" page will appear. The Simple Search version of Search By Customer will be the default page. Simply click on "Display Advanced Search" link to receive additional search criteria fields.

Figure II

Search By Customer (Advanced Search) screen

From the Search By Customer's Simple Search page, click on the "Display Advanced Search" link. The "Advanced Search By Customer" page will appear (see below). To return to the Simple Search version simply click on "Display Simple Search" link.

Search By Customer

Home      Search By EZ Code

Display Simple Search

Advanced Search By Customer

Profile

Name On Credit Card*

City

State

Email*

Phone Number

QS24 Location    [Select A Location ▼]

*Offer a dropdown field listing all available locations.*

\* Indicates wildcard search

Registration Details

Created Date Start**

Created End Date**

Last Access Date Start**

Last Access Date End**

** date format (mm/dd/yyyy)

- Include Registered Customers Only
- Include Unregistered Customers Only
- Include All Customers

*Default the first value "Include Registered Customers Only"*
*NOTE: Registered refers to all non-blocked and non-closed accounts.*

OR by

Customer ID

[SEARCH]

Figure 12

Search Results screen (Search By Customer)

From the Search By Customer screen (Simple or Advanced), display this page when search criteria returns more than one result. Then, access the correct account by clicking on the appropriate email address link under the "Username / Email" column OR click on the Back button to return to previous page.

Search Results

Home            Search By EZ Code

| Username / Email | Cust ID | Profile Name | Account Created |
|---|---|---|---|
| gscribner@quickstore4.com | 12354 | Gregg Scribner | 09/25/2004 |
| jsmith@quickstore24.com | 45443 | John Smith | 08/21/2004 |
| jtanner@aol.com | 45983 | John Tanner | 08/21/2004 |
| gbracken@yahoo.com | 48264 | Gina Bracken | 08/21/2004 |
| bcachuela@msn.com | 44532 | Brian Cachuela | 08/21/2004 |
| sjohnny@quickstore24.com | 45526 | Smooth Johnny | 08/21/2004 |

BACK

The specifics of a customer's account are detailed later in this document (See Navigation Menu and Account Summary sections).

Figure 13

Change Password screen

On the CCA Home page, click on the "Change Password" link located at the top right-hand side of the screen.

The "Change Password" page will appear.

---

Change Password

Return Home

Updated Your Customer Care Application Password

Change <NAME_OF_AGENT>'s password below.

Enter Your Current Password:*

[                    ]

Enter Your New Password:*

[                    ]

Repeat New Password:*

[                    ]

SET NEW PASSWORD

---

Additional Information About Change Password screen

1. Complete the three fields and click on the "SET NEW PASSWORD" button.

2. After clicking the SET NEW PASSWORD button to update password offer the one of the following:
    A. If Current Password is incorrect, then display a message at the top of the screen indicating so (i.e., "Your Current Password was entered incorrectly").
    B. If New Password and Repeated Password do not match, then display a message at the top of the screen indicating so (i.e., "Your New Password and Repeated Password do not match").
    C. If password is successfully changed, then display a brief message indicating so and return the user to the CCA Home page. (i.e., "You Have Successfully Changed Your CCA Access Password.")

Figure 14

Navigation Menu Within An Account

Create the Navigation Menu. The "boxed" menu offers instant navigation to many different areas within the customer account area.

IMPORTANT: This menu IS ALWAYS DISPLAYED (to the left of the page displayed) when a user is in any given customer account!!!
(See Account History section for sample layout).

Click on any link to access a specific area. The Home, Search By Customer, and Search by EZ Code.

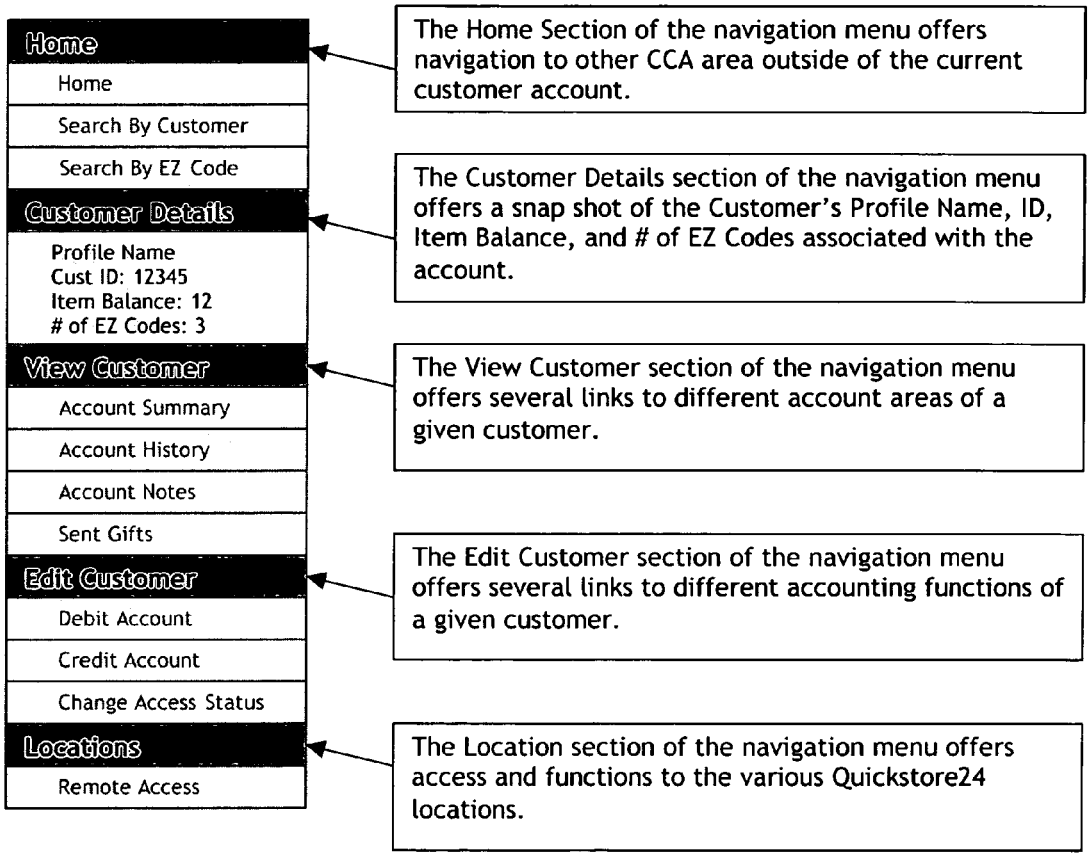

Figure 15

VIEW CUSTOMER section of the Navigation Menu

Access any customer record and this section will be available within the Navigation Menu.

Account Summary

Personal Information

Profile Name      Gregg Scribner
Email Address      gscribner@quickstore24.com

*Offer Location Identifiers here with rollover description about each location.*

Account Information

An overview of the account's combined EZ Code Account information:

| | | | |
|---|---|---|---|
| Account Status | Opened | QS24 Account Since | Sept $1^{st}$, 2004 |
| Total Account Notes Entered | 13 | Last EZ Code Used On | October 1, 2004 |
| | | Last EZ Code Used | 461-7386 |
| # of Locations Visited | 2 | Locations | HR3, SYN1 |
| | | Last Location Visited | HR3 |

Account Balance & Payments

An overview of the account's combined EZ Code Account information:

| | | | |
|---|---|---|---|
| Total # of EZ Codes | 2 | | |
| Total Item Balance | 15 | Total Items Taken To Date | 50 |
| Total Account Balance | $6.25 | | |
| (Item Balance x .4166) | | | |
| Total Payments To Date | $15.00 | Total Amount of Cash Credits | $2.00 |
| | | Total # of Item Credits | 2 |

EZ Code And Billing Information

EZ Code ($1^{st}$):      461-7386
Item Balance      12

[Access EZ Code Summary]

Billing Information
Credit Card Type      Visa
Credit Card Number      **--**-1234
Name On Credit Card      Gregg Scribner

[Access Account History]

EZ Code ($2^{nd}$):      471-1235
Item Balance      3

[Access EZ Code Summary]

Billing Information
Credit Card Type      Visa
Credit Card Number      **--**-1234
Name On Credit Card      Megan Scribner

[Access Account History]

*Click on the Access Account History button to offer a pull down section*

Figure 17

EZ Code Summary
Access this section by clicking on an EZ Code's "Access EZ Code Summary" button under the EZ Code And Billing Information section on the Account Summary page within a given customer's account.

EZ Code Summary offers detailed information on EZ Code Information, Account Balance & Payments, and Billing Information.

See below for page details.

EZ Code Summary

EZ Code Information

| | | | |
|---|---|---|---|
| EZ Code (1st): | 461-7386 | | |
| Item Balance | 12 | | |
| EZ Code Status | Opened | EZ Code Since | Sept 15th, 2004 |
| Total Account Notes Entered | 5 | Last Used On | Oct 1, 2004 |
| # of Locations Visited | 1 | Locations | HR3 |
| | | Last Location Visited | HR3 |

Account Balance & Payments

| | | | |
|---|---|---|---|
| Total Item Balance | 12 | Total Items Taken To Date | 30 |
| Total Account Balance (Item Balance x .4166) | $5.00 | | |
| Total Payments To Date | $10.00 | Total Amount of Cash Credits | $1.00 |
| | | Total # of Item Credits | 1 |

Billing Information

| | |
|---|---|
| Credit Card Type | Visa |
| Credit Card Number | **--**-1234 |
| Name On Credit Card | Gregg Scribner |
| Billing Address | 5 High Ridge Park<br>3rd Floor<br>Stamford, CT 06905 |

[Access Account History]

Figure 16

Pre-Account Details
Access this page from the "Account Details" link under View Customer section located in the Navigation Menu.

See below for page details.

---

Account Details

Access EZ Code Account Details

Access account history by selecting the appropriate EZ Code:

| Select An EZ Code ▽ |

[ GO ]

---

Additional Information About Pre-Account Details screen

1. Select An EZ Code from the dropdown field.

2. Click on the "GO" button to be directed to the Account Details section of the selected.

*NOTE:* Do NOT show this page if there is only one (1) EZ Code associated with the Quickstore24 account. If only one EZ Code, then navigate directly into to the next page (see below).

Figure 19

Account History
For the Account History area, there are many possible transaction entries. Please see the samples below. If other scenarios exist and the development team needs specifications written/submitted, please send a request to Gregg Scribner. It was suggested by Paul to keep perhaps 30 to 45 days worth of data. Another option would be to keep X amount of transactions viewable for this section (and keep any funding transaction data).

Home
- Home
- Search By Customer
- Search By EZ Code

Customer Details
- Profile Name
- Cust ID: 12345
- Item Balance: 12
- # of EZ Codes: 3

View Customer
- Account Summary
- Account History
- Account Notes
- Sent Gifts

Edit Customer
- Debit Account
- Credit Account
- Change Access Status

Locations
- Remote Access

Account History

View Account History     View Other EZ Code

EZ Code: 461-7386     *Send back to previous page.*
# of Items Available: 0

| DATE | AMOUNT | DESCRIPTION | ITEM BALANCE |
|---|---|---|---|
| | 0 | Cash Out $2.50 | |
| | - 6 | Cash Out Item Recovery | |
| 09/04/2004 | + 10 | | 0 |
| | - 1 | Debit - 1 Item (Customer Care) | |
| 09/02/2004 | - 1 | | +6 |
| | + 1 | Credit - 1 Item (Customer Care) | |
| 09/02/2004 | + 1 | | +7 |
| | - 1 | Item: Diet Coke 12 oz Can | |
| | - 1 | Item: Baked Lays 1 1/8 oz | |
| 09/02/2004 | - 2 | | +6 |
| | 0 | Item: Welch's Lemonade (dropped remotely) | |
| 09/02/2004 | 0 | | +8 |
| | - 1 | Item: Pepsi 12 oz Can | |
| | - 1 | Item: Welch's Lemonade | |
| 09/02/2004 | - 2 | | +8 |
| | + 12 | Fund Account $5.00 | |
| | - 1 | Item: Pepsi 12 oz Can | |
| | - 1 | Item: Frito Lays Chips | |
| 09/01/2004 | + 10 | | +10 |

*Click on individual links to be directed to specifics of each item. - See below -*

<-Previous 1 2 3 4 5 6 7 Next->     View All

Figure 20

Account History→ View Transaction Details screens

FUND ACCOUNT
Click on the "Fund Account $5.00" link to be directed to the appropriate "View Transaction Details page.

```
Account History

View Transaction Details                    Go Back

Date:             September 1st, 2004
EZ Code:          461-7386
Amount:           $5.00
Payment Type:     CREDIT CARD (or CASH)
Credit Card:      ************1234
Description:      Fund Account
Transaction ID:   534879
VeriSign ID:      123456789
Location:         ONLINE (or specific QS24 location)
```

VIEW ITEM DETAIL
Click any "Item:" link to be directed to the specific "View Item Detail" page.

```
Account History

View Item Detail                            Go Back

Item Name:   Diet Coke 12 oz Can
Location:    Stamford Police Department - Upstairs
Date:        09/02/2004
EZ Code:     461-7386
Counts As:   1 Item
```

If Item was remotely dropped due to a Customer complaint, then display as:
0 Item (dropped remotely)
Also, add "Comment" field.

Figure 21

VIEW CREDIT DETAIL
Click any "Credit:" link to navigate to the specific "View Credit Detail" or "View Debit" page.

Account History

View Credit Detail                                    Go Back

| | |
|---|---|
| Date: | 09/02/2004 |
| EZ Code: | 461-7386 |
| Amount: | 1 Item |
| Description: | Credit (Customer Care) |
| Transaction ID: | 536487 |
| Comment: | Customer called from home and reported that their item never dropped, so a credit was offered. |

The comment value will be whatever the Customer Care Representative enters within the Customer Care Application.

Figure 22

VIEW DEBIT DETAIL
Click any "Debit:" link to navigate to the specific "View Debit Detail" page.

```
Account History

View Debit Detail                          Go Back

Date:            09/02/2004
EZ Code:         461-7386
Amount:          - 1 Item
Description:     Debit (Customer Care)
Transaction ID:  536487
                 Comment: Customer Care
                 Representative accidentally issued
                 a credit.
```

*The comment value will be whatever the Customer Care Representative enters within the Customer Care Application.*

Figure 23

Account Notes
Access this section by clicking on the "Account Notes" link under View Customer section located in the Navigation Menu. Account Notes offers the user to enter, store, and read notes associated with a given Quickstore24 account. See below for page details.

---

Account Notes

Enter A New Note

Call Type:  Associated With:
[EMAIL ▼]  [Quickstore24 Account ▼]

Topic:
[Please select a topic ▼]

Dropdown values:
Feedback
Credit Card
EZ Code
My Account
Quickstore
Technical
Other Dropdown values:
Quickstore24
<List EZ Code #1>
<List EZ Code #2>
<List EZ Code #3>

*Additional Note:*
Default the value "Quickstore"

Note:
[                    ]

[Add Note]

Exiting Notes
Show:
o All Notes   o Only Quickstore24 Notes   o Only EZ Code 461-7386

---

Entered On:     10:45am, October 4th, 2004
Entered By:     <CCA Agent's Username>
Call Type:      Email
Associated With: Quickstore24 Account
Topic:          Technical
Note:           Customer had problems accessing their account online. Offered cache out instructions to resolve.

Show the latest notes at the top (with the oldest at the bottom)!

---

Entered On:     11:45pm, October 3rd, 2004
Entered By:     gscribner@quickstore24.com <Customer's Username>
Call Type:      Email
Associated With: Quickstore24 Account
Topic:          Technical
Note:           SUBJECT: HELP, HUNGRY FOR SNACKS!
                    COMMENT: I can't access my account online! I'm HUNGRY!

Figure 24

Sent Gifts
Access this section by clicking on the "Sent Gifts" link under View Customer section located in the Navigation Menu.

Sent Gifts offers Personal Information, EZ Code And Billing Information, Account Payments, Account Information, and EZ Code details on a specific customer.

See below for page details.

---

Sent Gifts

General Information

| Total # of Sent Gifts | 2 |
|---|---|

| Sent On: | 9:45am, October 1st, 2004 |
|---|---|
| Recipient's Name | Jack Black |
| Recipient's Email | jblack@sharktales.com |
| Sender's Name | Gregg |
| Sender's Email | gscribner@quickstore24.com |
| Type Of Gift | 2 For 1 |
| Personal Message | Nice Job on the movie. Keep up the good work. Here's a snack pass for those late nights working on the sequel. - Gregg |

Values:
2 For $1
OR
12 For $5

| Sent On: | 9:42am, October 1st, 2004 |
|---|---|
| Recipient's Name | Will Smith |
| Recipient's Email | wsmith@sharktales.com |
| Sender's Name | Gregg |
| Sender's Email | gscribner@quickstore24.com |
| Type Of Gift | 2 For 1 |
| Personal Message | Nice Job on the movie. Keep up the good work. Here's a snack pass for those late nights working on the sequel. - Gregg |

---

Additional Information About Sent Gifts screen

1. If a user purchases an EZ Code Gift for someone under their Quickstore24 Account, then the transaction should fall under a specific EZ Code Account associated with their main account. So, if the QS24 Account has only one EZ Code account, then the purchase should be associated with the one account. It should appear as a funding transaction (i.e., +$5.00), and then another purchase transaction for the gift (i.e., -$5.00).

If a Quickstore24 Account has multiple EZ Codes associated with it, then ask the customer which EZ Code Account they would like to associate with it (this would be a public side functionality feature for Send A Gift).

Figure 25

EDIT CUSTOMER section of the Navigation Menu

Access any customer record and this section will be available within the Navigation Menu.

Pre-Debit Account
Access this page from the "Debit Account" link under Edit Customer section located in the Navigation Menu. This page will take you to one of two Debit Account pages: (1) Debit An Item, or (2) Debit Credit Card.

See below for page details.

Additional Information About Pre-Debit Account screen

1. Select An EZ Code from the dropdown field.

2. Select whether you'd like to deduct an item or debit credit card.

3. Click on the "GO" button to be directed to the appropriate Debit Account page for the selected EZ Code.

*NOTE:* If there is only one (1) EZ Code associated with the Quickstore24 account, then display that EZ Code as the default value in the first dropdown field "Select An EZ Code Account".

Figure 27

Debit Account - (Debit An Item)
Access this section by clicking on the "GO" button on Pre-Debit Account page after selecting a specific EZ Code and specifying to "Debit An Item".

Debit Account - (Debit An Item) offers the ability to deduct an item(s) from the current EZ Code Account and add internal/external comments. These debits can only be performed from Quickstore's Customer Care Application (CCA), but are reflected in the customer's Account Details in both the CCA and within the Web site.

See page details below.

Debit Account   Access Other EZ Code OR Debit Option

EZ Code:            461-7386
# of Items Available    5

Send back to previous page.

Debit Item From EZ Code Account

Enter Item Amount To Deduct:

[01 ▼]   ← Dropdown Values: 01 thru 12

Enter Comment For Customer:

Enter Internal Comment For Customer Care:

DEBIT ACCOUNT

Figure 28

Debit Account – (Debit Credit Card)
Access this section by clicking on the "GO" button on Pre-Debit Account page after selecting a specific EZ Code and specifying to "Debit Credit Card".

Debit Account - (Debit Credit Card) offers the ability to directly debit from the current EZ Code Account's credit card and add internal/external comments. These debits can only be performed from Quickstore's Customer Care Application (CCA), but are reflected in the customer's Account Details in both the CCA and within the Web site. The debit will be applied to the credit card through the CCA => Gateway Provider => Bank => Credit Card.

See page details below.

Debit Account  Access Other EZ Code OR Debit Option

EZ Code: 461-7386

<Name_On_Credit_Card>'s Account Balance: <$ACTUAL_BALANCE>

*Send back to previous page.*

Enter Amount To Deduct:
$ [0.0]

Enter Comment For Customer:

Enter Internal Comment For Customer Care:

[DEBIT ACCOUNT]

Figure 29

Additional Information About Debit Account (Debit Credit Card) screen

1. Enter the amount to be deducted and enter comments.

2. Click on the "DEBIT ACCOUNT" button to proceed with debit. Once clicked, the user will be prompt with a pop up window to confirm the Transaction, see below:

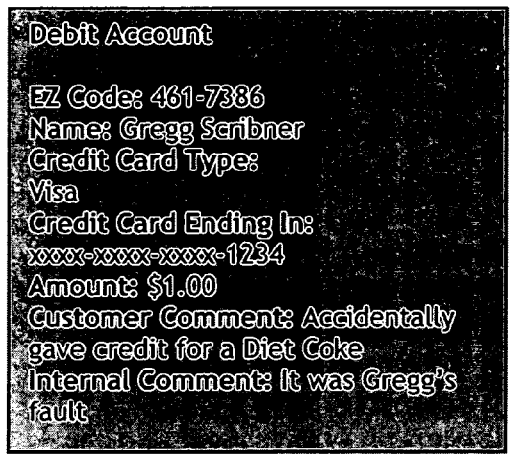

3. Click the "YES" button within the pop up window to apply the debit and return to the Account Summary screen. Press "NO" and return to the Debit Account screen without applying a debit.

Figure 30

Pre-Credit Account
Access this page from the "Credit Account" link under Edit Customer section located in the Navigation Menu. This page will take you to one of two Credit Account pages: (1) Credit An Item, or (2) Credit A Credit Card.

See below for page details.

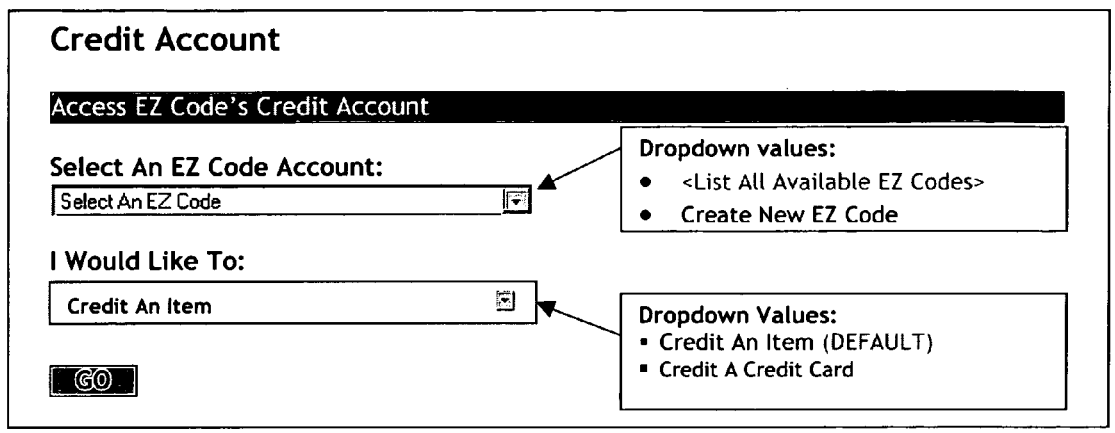

Additional Information About Pre-Credit Account screen

1. Select An EZ Code from the dropdown field or choose to create a new one.

2. Select whether you'd like to credit an item or credit a credit card.

3. Click on the "GO" button to be directed to the appropriate Credit Account page for the selected EZ Code.

NOTE: If there is only one (1) EZ Code associated with the Quickstore24 account, then display that EZ Code as the default value in the first dropdown field "Select An EZ Code Account".

ADDITIONAL NOTES: Do not allow the combination of the following values to be selected: "Create New EZ Code" & "Credit A Credit Card". Instead offer the following error: "There is no credit card associated with a new EZ Code. Please select a different combination."

Figure 6. 31

Credit Account　　　　　　　　　Access Other EZ Code OR Credit Option

EZ Code:　　　　　　461-7386
# of Items Available　　　　5

Send back to previous page.

Credit Item To EZ Code Account

Enter Item Amount To Credit:
[01 ▼]　　◄────────────────　Dropdown Values: 01 thru 12

☐ Apply Item As Refundable
☐ New EZ Code For Item Credit

Expiration Date: Used Only For Expiring Promotions
[_____](MM/DD/YYY)

*NOTE:* If this page was accessed from the Remote Access screen, then:
- Indicate (NEW): after EZ Code field
- Display default the un-editable checked box for New EZ Code For Item Credit.
- Offer new fields for Name, Email, and a radio button field to be included for Incentives/Promotions emails underneath the New EZ Code For Item Credit.

Enter Comment For Customer:
[                    ]

Enter Internal Comment For Customer Care:
[                    ]

[CREDIT ACCOUNT]

Figure 32

Additional Information About Credit Account (Credit An Item) screen

1. Enter the item amount to be directly applied to account and enter comments.
Note: If a New EZ Code is being created for a Item Credit then see Image B 2. Click on the "CREDIT ACCOUNT" button to proceed with credit. Once clicked, the user will be prompt with a pop up window to confirm the Transaction, see below:

---

Credit Account

EZ Code: 461-7386
Name: Gregg Scribner
Credit Type: Item Credit
Item Amount: 2
Customer Comment: Gave credit for 2 Diet Cokes that did not drop.
Internal Comment: User error.

Would you like to apply?

[YES] [NO]

---

Create EZ Code for Item Credit

EZ Code (NEW): 123-4521
Name: Gregg Scribner
Email: gscribner@aol.com
Promotions?: Yes
Item Credit Amount: 2
Customer Comment: Gave credit for the money they lost on 2 Diet Cokes that did not drop.
Internal Comment: Machine jam.

Would you like to create new EZ Code?

[YES] [NO]

---

Image A                    Image B

3. Click the "YES" button within the pop up window to apply the credit (or create the EZ Code) and return to the Account Summary screen. Press "NO" and return to the Credit Account screen without applying a credit or issuing a new EZ Code.

Figure 33

Credit Account     Access Other EZ Code OR Credit Option

EZ Code: 461-7386
# of Items Available 5

*(Send back to previous page.)*

Credit Card Billing Information

Credit Card Type        Visa
Credit Card Number      **--**-1234

Name On Credit Card     Gregg Scribner

Payments & Refunds

Total Amount Funded:        $10.00
Amount Previously Funded    $1.00

Maximum Refundable Credit Allowed: $9.00

Issue Credit To Credit Card

Enter Amount To Credit:
$ [ ]

☐ New EZ Code For Cash Credit

Enter Comment For Customer:
[ ]

*NOTE:* If this page was accessed from the Remote Access screen, then:
- Indicate (NEW): after EZ Code field
- Display default the un-editable checked box for New EZ Code For Cash Credit.
- Offer new fields for Name, Email, and a radio button field to be included for Incentives/Promotions emails underneath the New EZ Code For Item Credit.

Enter Internal Comment For Customer Care:
[ ]

[CREDIT ACCOUNT]

Figure 34

Additional Information About Credit Account (Credit A Credit Card) screen

1. Enter the credit amount to be directly applied to credit card and enter comments. Note: the credit can never exceed the amount displayed on the "Maximum Refundable Credit Allowed" field (Image A). If a New EZ Code is being created then see Image B 2. Click on the "CREDIT ACCOUNT" button to proceed with credit. Once clicked, the user will be prompt with a pop up window to confirm the Transaction, see below:

| Credit Account | Create EZ Code for Cash Credit |
|---|---|
| EZ Code: 461-7386<br>Name: Gregg Scribner<br>Credit Card Type:<br>Visa<br>Credit Card Ending In:<br>xxxx-xxxx-xxxx-1234<br>Amount: $1.00<br>Customer Comment: Gave credit for a Diet Coke that did not drop.<br>Internal Comment: User error.<br><br>Would you like to apply?<br><br>[YES] [NO] | EZ Code (NEW): 123-4521<br>Name: Gregg Scribner<br>Email: gscribs@msn.com<br>Promotions?: No<br>CASH Credit Amount: $1.00<br>Customer Comment: Gave credit for the money they lost on 2 Diet Cokes that did not drop.<br>Internal Comment: Machine jam.<br><br>Would you like to create new EZ Code?<br><br>[YES] [NO] |
| Image A | Image B |

3. Click the "YES" button within the pop up window to apply the credit (or create the EZ Code) and return to the Account Summary screen. Press "NO" and return to the Credit Account screen without applying a credit or issuing a new EZ Code.

Figure 35

Pre-Change Access Status

Access this page from the "Change Access Status" link under Edit Customer section located in the Navigation Menu. This page will direct you to the Change Access Status page of a specific EZ Code or if all EZ Code accounts are closed, then you can access the QuickStore24 Change Access Status.

Access Statuses included Opened, Card Required, Suspended, Blocked, and Closed. Rules of these statuses should be discussed and logic applied.

See below for page details.

---

Change Access Status

Access EZ Code's Debit Account

Click An EZ Code:

| EZ Code | Status | Cust ID | Profile Name | Account Created |
|---------|--------|---------|--------------|-----------------|
| 461-7386 | OPENED | 12354 | Gregg Scribner | 09/25/2004 |
| 461-7845 | OPENED | 45443 | John Smith | 08/21/2004 |

OR

Access Quickstore24 Account

> If all EZ Codes are Blocked or Closed, then offer the following field below the table, so the agent may close the online account (if needed):
>
> OR
>
> Access Quickstore24 Account

---

Additional Information About Pre-Change Access Status screen

1. Select An EZ Code by clicking on the blue hyperlink OR if all EZ Codes are Blocked or Closed, then user may click on Access Quickstore24 Account link to close the online account (if needed).

2. Once a link is clicked, the user will be directed to the Change Access Status page of a specific EZ Code or to the Quickstore24 Account itself (available only if all EZ Code accounts are blocked.

Figure 36

Change Access Status
Access this page from the EZ Code or Quickstore24 links located on the "Pre-Change Access Status" page (see above).

Locations section of the Navigation Menu

Access any customer record and this section will be available within the Navigation Menu.

Pre-Remote Access
Access this page from the "REMOTE ACCESS" link under Locations section located in the Navigation Menu. This page will take you to the Remote Access page of the selected location.

See below for page details.

Remote Access

Access A Quickstore24 Location

Step 1: Select A Location AND/OR Enter A Location Identifier

Location          [Select A Location ▼]

Location Identifier [                    ]

Step 2: Select An EZ Code:          ← Dropdown values:
[Select An EZ Code ▼]                  • <List All Available EZ Codes>
                                       • Create New EZ Code
[GO]

Additional Information About Pre-Remote Access screen

1. Select A Location from the dropdown field "Location" AND/OR enter a Location Identifier (LI). If the LI does not match the selected location then offer an error message at the top of the screen (i.e., "The Location and Location Identifier do not match. Try completing one field to access the location.")

2. Next, Select An EZ Code from the dropdown field "Select An EZ Code". The user has the option to Create New EZ Code if the customer does not want to associate the Remote Access with their listed EZ Codes.

2. Click on the "GO" button to be directed to the appropriate Remote Access page.

Figure 39

DROP PRODUCT

Drop up to 2 items for customer onsite:

DRINK MACHINE
☐ A11  ☐ A12  ☐ A13  ☐ A14  ☐ A15  ☐ A16  ☐ A17  ☐ A18  ☐ A19

☐ A21  ☐ A22  ☐ A23  ☐ A24  ☐ A25  ☐ A26  ☐ A27  ☐ A28  ☐ A29

☐ A31  ☐ A32  ☐ A33  ☐ A34  ☐ A35  ☐ A36  ☐ A37  ☐ A38  ☐ A39

☐ A41  ☐ A42  ☐ A43  ☐ A44  ☐ A45  ☐ A46  ☐ A47  ☐ A48  ☐ A49

☐ A51*  ☐ A52*  ☐ A53*  ☐ A54*  ☐ A55*  ☐ A56*  ☐ A57*  ☐ A58*  ☐ A59*
*Counts as 2 items

SNACK MACHINE
☐ B10  ☐ B12  ☐ B14  ☐ B16  ☐ B18

☐ B20  ☐ B22  ☐ B24  ☐ B26  ☐ B28

☐ B30  ☐ B32  ☐ B34  ☐ B36  ☐ B38

☐ B40  ☐ B41  ☐ B42  ☐ B43  ☐ B44  ☐ B45  ☐ B46  ☐ B47  ☐ B48  ☐ B49

☐ B50  ☐ B51  ☐ B52  ☐ B53  ☐ B54  ☐ B55  ☐ B56  ☐ B57  ☐ B58  ☐ B59

☐ B60  ☐ B62  ☐ B64  ☐ B66  ☐ B68

☐ B70  ☐ B72  ☐ B74  ☐ B76  ☐ B78

*Red indicates Red Item   *Green indicates Green Item   *Black indicates Red and Green Item > If cursor is left over a given item code for approximately 1 second, then display the name of the item in that slot (at that location) in a rollover text.

> Each Dropdown offers the value "Dispense Now"; select this value to remotely drop the listed item and offer a confirm. Then, offer a brief message stating "Product is dispensing" and then a "Product Dispensed" message once complete.

Enter Comment For Customer:

Enter Internal Comment For Customer Care:

> If no EZ Code is listed, as this event was a direct refund to a cash-paying customer, then make note of customer's name and information when dropping the product. Discussion point.
>
> This information will not be searchable through the CCA.

> NOTE: Paul recommended we might want to replace the above with item buttons with an actual image of a vending machine.

[DROP PRODUCT]

Figure 4(

DROP REFUND

Offer An Onsite Cash Refund In The Amount Of:

$ [_____]

Enter Comment For Customer:

[text box]

If no EZ Code is listed, as this event was a direct refund to a cash-paying customer, then make note of customer's name and information when dropping the product. Discussion point.

This information will not be searchable through the CCA.

Enter Internal Comment For Customer Care:

[text box]

[DROP REFUND]

*NOTE FOR DROP PRODUCT AND/OR REFUND:* If you are remotely accessing the Quickstore24 location for a non-holder of an EZ Code, then offer new fields for Name, Email, and a radio button field to be included for Incentives/Promotions emails above the ENTER COMMENT FOR CUSTOMER field.

Also, for the Drop Refund feature, offer a confirmation pop-up box (similar to that of Credit Account) to confirm you would like to Drop Product or Drop Cash.

Figure 42

SYSTEMS AND METHODS FOR VENDING MACHINE CUSTOMER ACCOUNT MANAGEMENT

CROSS-REFERENCE TO RELATED APPLICATIONS

The present application claims benefit and priority under 35 U.S.C. §119(e) to U.S. Provisional Patent Application Ser. No. 60/668,405 entitled "PRODUCTS AND PROCESSES FOR ESTABLISHING MULTI-TRANSACTION RELATIONSHIPS WITH CUSTOMERS OF VENDING MACHINES" filed Apr. 5, 2005, the entirety of which is hereby incorporated by reference herein.

The present application is also a Continuation-In-Part of and claims benefit and priority under 35 U.S.C. §120 to co-pending International Application No. US2004/041561 entitled "PRODUCTS AND PROCESSES FOR ESTABLISHING MULTI-TRANSACTION RELATIONSHIPS WITH CUSTOMERS OF VENDING MACHINES" filed Dec. 9, 2004, which itself claims benefit and priority to U.S. Provisional Patent Application Ser. No. 60/527,988 also entitled "PRODUCTS AND PROCESSES FOR ESTABLISHING MULTI-TRANSACTION RELATIONSHIPS WITH CUSTOMERS OF VENDING MACHINES" filed on Dec. 9, 2003, the entirety of each of which is hereby incorporated by reference herein.

The present application is also related to Applicants' (1) U.S. Pat. No. 6,298,972, entitled "METHOD AND APPARATUS FOR ESTABLISHING AND MANAGING VENDING MACHINE SUBSCRIPTIONS", issued Oct. 9, 2001; (2) U.S. Pat. No. 6,085,888, entitled "METHOD AND APPARATUS FOR ESTABLISHING AND MANAGING VENDING MACHINE SUBSCRIPTIONS", issued Jul. 11, 2000; (3) U.S. Pat. No. 5,988,346, entitled "METHOD AND APPARATUS FOR ESTABLISHING AND MANAGING VENDING MACHINE SUBSCRIPTIONS", issued Nov. 23, 1999; and (4) co-pending International Application No. US2005/015572 entitled "PRODUCTS AND PROCESSES FOR PROVIDING OFFERS FOR PRODUCTS DISPENSED FROM A DISPENSING DEVICE", filed on May 4, 2005.

BACKGROUND

Applicants have previously invented various systems and methods for establishing and managing subscriptions to items sold at vending machines. Such systems and methods and descriptions thereof that may be found in the above-referenced related patents are hereby incorporated by reference herein.

In some embodiments of Applicants' prior inventions, a vending machine control system may identify and output an offer for a subscription to one or more products offered at a vending machine. Such subscriptions may, for example, allow customers to purchase at least two units of a product, and redeem the units of the product at different points in time (e.g., one unit the first day, another unit the following day). Such subscription offers may provide customers with the ability to purchase the products (or units of the products) at a discount relative to the total of the retail prices of all the units. For example, a customer may be offered the opportunity to purchase a "subscripbon" to six (6) cans of soda, redeemable one per day (1/day), for the price of five (5) cans. Subscription offers are a useful promotion as they permit the vending machine to increase revenue in a predictable manner. Further, any per unit discount provided by the subscription offer and/or promotion may be economically justified by the guaranteed increase in sales volume that results when the customer accepts the subscription offer, and pays for the subscription.

In some situations, however, these and other embodiments may be improved upon, supplemented, and/or otherwise altered to address various shortcomings, inefficiencies, and/or to facilitate other and/or additional desired functionalities.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 9 is a block diagram of an exemplary display according to some embodiments;

FIG. 10 is a block diagram of an exemplary display according to some embodiments;

FIG. 11 is a block diagram of an exemplary display according to some embodiments;

FIG. 12 is a block diagram of an exemplary display according to some embodiments;

FIG. 13 is a block diagram of an exemplary display according to some embodiments;

FIG. 14 is a block diagram of an exemplary display according to some embodiments;

FIG. 15 is a block diagram of an exemplary display according to some embodiments;

FIG. 17 is a block diagram of an exemplary display according to some embodiments;

FIG. 18 is a block diagram of an exemplary display according to some embodiments;

FIG. 19 is a block diagram of an exemplary display according to some embodiments;

FIG. 20 is a block diagram of an exemplary display according to some embodiments;

FIG. 21 is a block diagram of an exemplary display according to some embodiments;

FIG. 22 is a block diagram of an exemplary display according to some embodiments;

FIG. 23 is a block diagram of an exemplary display according to some embodiments;

FIG. 24 is a block diagram of an exemplary display according to some embodiments;

FIG. 25 is a block diagram of an exemplary display according to some embodiments;

FIG. 27 is a block diagram of an exemplary display according to some embodiments;

FIG. 28 is a block diagram of an exemplary display according to some embodiments;

FIG. 29 is a block diagram of an exemplary display according to some embodiments;

FIG. 30 is a block diagram of an exemplary display according to some embodiments;

FIG. 31 is a block diagram of an exemplary display according to some embodiments;

FIG. 32 is a block diagram of an exemplary display according to some embodiments;

FIG. 33 is a block diagram of an exemplary display according to some embodiments;

FIG. 34 is a block diagram of an exemplary display according to some embodiments;

FIG. 35 is a block diagram of an exemplary display according to some embodiments;

FIG. 36 is a block diagram of an exemplary display according to some embodiments;

FIG. 39 is a block diagram of an exemplary display according to some embodiments;

FIG. 41 is a block diagram of an exemplary display according to some embodiments; and FIG. 42 is a block diagram of an exemplary display according to some embodiments;

DETAILED DESCRIPTION

I. Introduction

Figure 1:
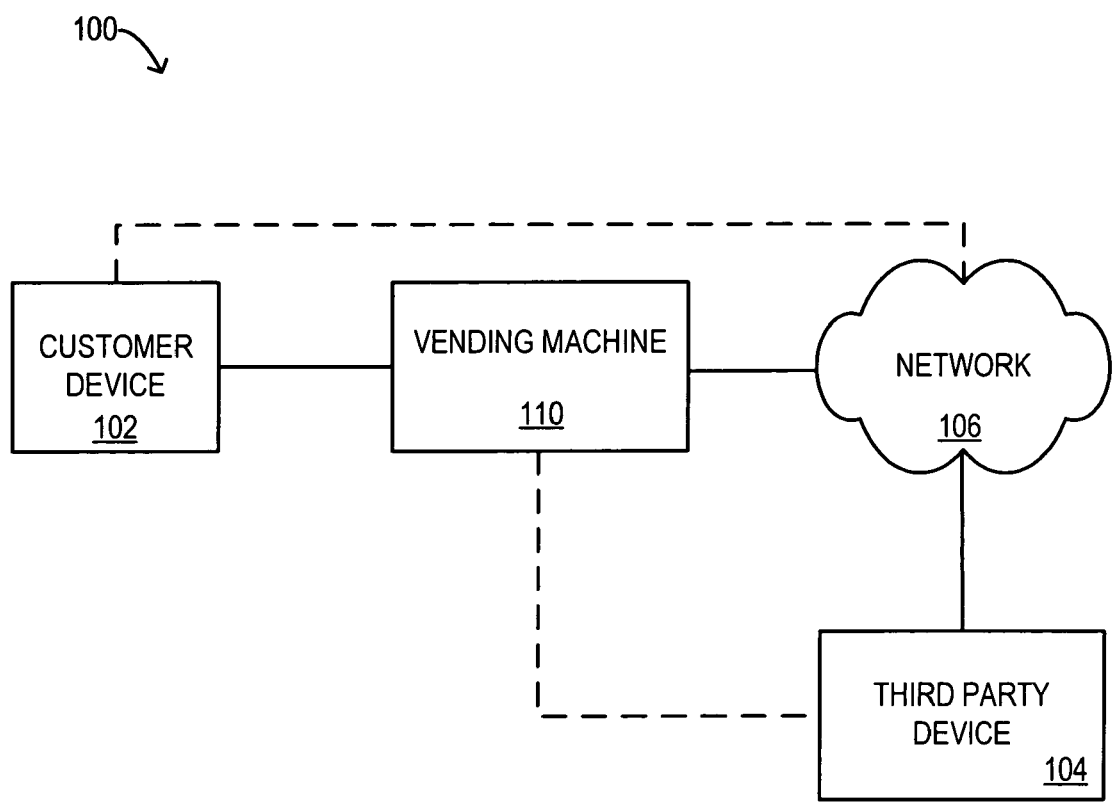
FIG. 1 is a block diagram of a system according to some embodiments.

Applicants have recognized that, in some situations, it may be advantageous to provide a vending machine (and/or other device, such as a kiosk) configured to: (i) prompt a customer to provide an indication of a subscription code and/or identifier; (ii) receive the indication of the subscription code and/or identifier; (iii) register customers for vending machine subscriptions; (iv) provide subscription codes to customers; (v) determine and satisfy product redemptions associated with vending machine customer subscriptions; (vi) manage customer subscription accounts; and/or (vii) provide third-party access and/or management of customer subscription accounts.

According to some embodiments for example, a customer may approach a vending machine that displays a message (e.g., via a touch screen and/or other display device) instructing the customer to insert money and/or to provide a subscription code and/or identifier. The customer may, according to some embodiments, insert money in excess of a threshold (e.g., the customer tenders five dollars ($5) or more), and the vending machine may respond by asking whether the customer would like to purchase a subscription to any twelve (12) items for the tendered five dollars ($5). The customer may then indicate, for example, that the customer would like to purchase the subscription (e.g., by pressing a button marked "Purchase Subscription").

The vending machine may the, according to some embodiments, ask the customer (e.g., via a textual and/or graphic display) to choose a subscription code or provided the customer with a subscription code (e.g., selected for the customer by the vending machine). In the case that the customer indicates a subscription code, the customer may enter the code via a keypad, and may be asked to verify the code. The customer may enter the same code again via the keypad, and in response the vending machine may provide the customer with a printed voucher indicating the subscription code. In some embodiments, such as in the case that a subscription code is selected on the customer's behalf, the vending machine may simply print the voucher indicating the code (e.g., without receiving further input from the customer). According to some embodiments, the code may be provided to the customer via e-mail, voice, and/or other means. In some embodiments, the customer's subscription may be also or alternatively associated with a subscription identifier such as a biometric identifier. The customer may, for example, utilize a fingerprint-scanning device coupled to the vending machine in order to establish an indication of the customer's finger (or thumb) as a subscription identifier.

In a transaction involving redemption, the customer subsequently may approach the vending machine that displays a message instructing the customer to insert money and/or a subscription code or identifier. The customer, now having a subscription account, may enter the code printed on the voucher, scan a finger or thumb, provide an aural indication, and/or otherwise provide an indication of the subscription identifier. The vending machine, according to some embodiments, may then verify that the subscription code is valid and determine the terms of the subscription, including how many products may still be redeemed pursuant to the subscription. In some embodiments, the vending machine may also or alternatively determine one or more third-party or other account management provisions that govern usage of the account by the customer.

The customer may then, for example, indicate which item(s) are desired (e.g., by entering an indication via a keypad of the product row containing the desired item(s)). The vending machine may then ask if any other items are desired (not yet having reached a maximum number of items which may be dispensed per transaction, per day, etc.), and the customer may in turn, for example, indicate three (3) more desired items in the same manner. The vending machine, according to some embodiments, may then cease requesting if any other items are desired, and dispense the four (4) indicated items.

According to some embodiments, a registered account may be accessed, modified, and/or otherwise controlled through a vending machine or through a remote device (e.g., a computer) associated with the vending machine. In some embodiments, a third party may access, modify or otherwise control the account so that an account holder may only redeem pre-paid units pursuant to various terms and conditions (account parameters) set by the third party. For example, a vending machine operator may control the terms of a subscription account associated with a particular customer (e.g., a vending machine operator may increase the number of units in the account balance as a reward for being a loyal, profitable customer). Or, a parent of a school-age child may control the terms of a subscription account so that the child can only redeem healthy snacks from a vending machine located at the child's school. Further, in some embodiments, a sponsor may set the parameters of a subscription account (e.g., so that a customer may only redeem units bearing the sponsor's brand name).

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims.

Some embodiments described herein are associated with a "control system". As used herein, the term "control system" may generally refer to any combination of hardware, software, firmware, and/or microcode that is operative to carry out and/or facilitate embodiments described herein. For example, a control system may comprise a processor performing instructions of a program to provide subscription accounts, account access, and/or account control or management functionality to customers and/or third parties. The control system may comprise, according to some embodiments, a single device and/or component or may comprise any practicable number of networked devices.

Some embodiments described herein are associated with a "network device". As used herein, the term "network device" may generally refer to any device that can communicate via a network. Examples of network devices include a PC, a workstation, a server, a printer, a scanner, a facsimile machine, a copier, a PDA, a storage device (e.g., a disk drive), a hub, a router, a switch, and a modem or a wireless phone. In some embodiments, network devices may comprise one or more network components, such as a Static Random Access Memory (SRAM) device or module, a network processor, and/or a network communication path, connection, port, or cable. Some examples of network devices may include, but are not limited to, servers or controllers, customer devises, vending machines, input devices, output devices, and peripheral devices.

As used herein, the terms "server" and "controller" may be used interchangeably and may generally refer to any device that may communicate with one or more vending machines, one or more third-party servers, one or more remote controllers, one or more customer devices, one or more peripheral devices and/or other network nodes, and may be capable of relaying communications to and/or from each such device. A controller or sever may, for example, comprise one or more network devices and/or components.

As used herein, the terms "customer device" and "user device" may be used interchangeably and may generally refer to any device owned and/or operated by, or otherwise associated with a customer, which device is capable of accessing and/or outputting online and/or offline content. Customer devices may communicate with one or more servers or controllers, one or more vending machines, one or more third-party service provider servers, one or more user terminals, and/or other network devices or nodes. In some embodiments, customer devices may, for example, include gaming devices, PC devices, PDA devices, Point-Of-Sale (POS) terminals, point of display terminals, kiosks, telephones, cellular phones, Automated Teller Machines (ATM) devices, pagers, and/or combinations of such devices. In some embodiments, customer devices may communicate with vending machines and remote devices and/or computers wirelessly, through any practicable wireless communication networks, formats and/or protocols, including but not limited to those described herein.

As used herein, the term "vending machine" may generally refer to any system, apparatus, and/or module that is operable to provide and/or facilitate the provision of goods and/or services to customers. Vending machines may include, but are not limited to, for example, one or more stand-alone, networked, automated, mechanical, and/or electrical devices coupled to dispense products such as beverages and/or snacks to customers. In some embodiments, vending machines may comprise, be coupled to, and/or may be otherwise associated with one or more input devices, output devices, and/or peripheral devices (e.g., to operate in accordance with embodiments described herein).

As used herein, the terms "product," "good," "item", "merchandise," and "service" may be used interchangeably and may generally refer to anything licensed, leased, sold, available for sale, available for lease, available for licensing, and/or offered or presented for sale, lease, or licensing including individual products, packages of products (such as mystery packages), subscriptions to products, contracts, information, services, and intangibles. Examples of goods sold at vending machines may include, but are not limited to: beverages (e.g., cans or bottles of soda or water), snacks (e.g., candy bars), and recordable media (e.g., pre-recorded and/or dynamically-recorded disks or tapes). Examples of services sold by vending machines include car washes, photography services and access to digital content (e.g., permitting the downloading of digital picture, video, and/or audio files such as audio "bring tones" and/or wallpapers to a handheld device). In some embodiments, Wi-Fi and/or other network access (e.g., access to a peer-to-peer network), arcade style games, pinball games, and/or other media content may comprise a product and/or service offered by a vending machine.

As used herein, the term "input device" may generally refer to a device that is used to receive input. An input device may communicate with and/or be part of another device (e.g. a point of sale terminal, a point of display terminal, a customer terminal, a server, a customer device, a vending machine, a controller, and/or a peripheral device). Some examples of input devices include, but are not limited to: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a Universal Serial Bus (USB) port, a Global Positioning System (GPS) receiver, a Radio Frequency IDentification (RFID) receiver, a RF receiver, a thermometer, a pressure sensor, and a weight scale or mass balance.

As used herein, the term "output device" may generally refer to a device that is used to output information. An output device may communicate with and/or be part of another device (e.g. a vending machine, a point of sale terminal, a point of display terminal, a customer device, and/or a controller). Possible output devices may include, but are not limited to: a Cathode Ray Tube (CRT) monitor, a Liquid Crystal Display (LCD) screen, a Light Emitting Diode (LED) screen, a printer, an audio speaker, an Infrared Radiation (IR) transmitter, an RF transmitter, and/or a product hopper, dispenser, and/or data port.

As used herein, the term "peripheral device" may refer to any device associated with one or more vending machines, the peripheral device being operable to perform in accordance with embodiments as described herein. For example, in one embodiment a traditional vending machine may be retrofitted with a peripheral device that comprises a processor, memory, and/or an output device for facilitating promotions such as mystery package promotions in accordance with embodiments described herein. A peripheral device may or may not be attached or coupled to a vending machine. A peripheral device may or may not be operable to direct the associated vending machine to perform certain functions. A peripheral device, or portions thereof, may be housed inside the casing of the associated vending machine. Further, a peripheral device may be operable to detect one or more events at a vending machine. For example, a peripheral device may be operable to detect one or more signals output by a processor of a vending machine. Further still, a peripheral device may be operable to communicate with a processor of an associated vending machine. According to some embodiments, a peripheral device (and/or a vending machine itself) may be configured to conserve coins and/or to facilitate intelligent dispensing of products.

Some embodiments described herein are associated with an "operator". As used herein, the term "operator" may generally refer to the owner of a vending machine or an agent or associate thereof (e.g., a route driver or lessee of a vending machine). In some embodiments, an operator may also be associated with a server or controller and/or customer devices utilized to implement embodiments described herein. Operators may also or alternatively be associated with the manufacture and/or distribution of one or more products or services provided via a vending machine. According to some embodiments, an operator may be associated with restocking one or more vending machines (e.g., on a restock date and/or at a restock time).

As used herein, the term "promotion" may generally refer to a message that is output, regarding some product, distinct from a general offer to sell products from a vending machine at retail prices. For example, a promotion may comprise a message intended to increase machine profitability. Typically, a promotion allows customers to purchase one or more products under terms that are generally more favorable to the customer than standard retail terms (e.g., at prices less than or equal to the corresponding product's full price(s), but greater than or equal to the corresponding product's minimum price(s)). In some embodiments, a promotion may comprise an offer and/or incentive associated with providing a subscription account to a customer.

As used herein, the terms "package deal", "combination deal", "package promotion", "combination promotion", "combination product promotion", "load-up deal", "value combo deal", and "combo deal" may be used interchangeably and may generally refer to any offer enabling a customer to purchase at least two products. In many embodiments the at least two products are sold for a single price. In many embodiments, the two products are dispensed to the customer essentially simultaneously (e.g., within seconds of each other). Typically, package offers are configured so the price of the at least two products is less than the sum of the prices of the two products, and thus the customer saves money compared to the sum of the individual component products' retail prices. According to some embodiments, customers may be presented with package offers in association with subscription accounts (e.g., an account may comprise a subscription to a package of products that may be redeemed at various times).

As used herein, the term "package price" may generally refer to the price that is charged (typically in a single transaction) for the units of products purchased pursuant to a package offer (e.g., associated with one or more package instances). Typically, package prices reflect a net-savings to the customer when compared to the sum of the respective retail prices of the individual component products. In some embodiments, such as in the case that a package is offered to a customer as a subscription offer, the package price may be equivalent to the subscription price.

Some embodiments herein are associated with "communication". As used herein, the term "communication" may refer to any information, data, and/or signal that is provided, transmitted, received, and/or otherwise processed by an entity, and/or that is shared or exchanged between two or more people, devices, and/or other entities.

As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

Some embodiments described herein may be associated with a "communication session". As used herein, the phrase "communication session" may refer to any instance and/or occurrence of a receipt, transmittal, exchange, and/or sharing of information associated with the communication between two or more parties and/or entities. A communication session may include, for example, an e-mail transmittal, receipt, and/or exchange, an Instant Messaging (IM) session, a voice call (e.g., over a Public Switched Telephone Network (PSTN), a cellular network, or VoIP), a file upload, download, and/or exchange, a receipt and/or transmittal of broadcast media, and/or any combination thereof. Communication sessions may include continuous, periodic, intermittent, and/or any other frequency of communication that is or becomes known or practicable.

Some embodiments described herein are associated with a "communication link". As used herein, the phrase "communication link" may refer to any connection, wire, port, device, and/or signal and/or any transmission, exchange, repeating, and/or other flow of information or data that is associated with the establishing, maintaining, facilitation, and/or other management and/or participation in a communication session. In some embodiments, a communication link may involve a "handshake", multiplexing and/or de-multiplexing of signals, encryption and/or decryption of data, data validation, data conversion, and/or implementation of one or more compression, transmission, and/or communication protocols.

Some embodiments described herein may be associated with a "customer", an "account holder", and/or a "subscriber". As used herein the terms "customer", "account holder", and "subscriber" may generally be used interchangeably, although it should be noted that a customer may not be associated with an account, and therefore may not be deemed an "account holder" or a "subscriber". In some embodiments, an account holder may comprise a person who is entitled to redeem units of vended product pursuant to a registered subscription. In one or more embodiments, a customer may register a subscription at a vending machine. Further, in one or more embodiments, a customer may register a subscription online. Further still, in one or more embodiments, a third party (e.g., a parent) may register a subscription for a customer (e.g., as a gift) either online or at a vending machine.

As used herein, the terms "registered subscription", "vending machine customer account", "account", and "subscripion" may be used interchangeably and may generally refer to any relationship between a customer and a vending machine operator that permits the customer to redeem multiple units of a product (and/or multiple products) at different times. The relationship may, for example, comprise a contractual relationship that is (i) formed upon the customer's acceptance of a subscription offer, and/or (ii) recorded and tracked in a database (e.g., by the vending machine and/or associated devices). A registered subscription may generally be recorded in association with one or more account parameters set by an account holder and/or by a third party.

As used herein, the terms "account parameter", "account rule", "subscription parameter", and "subscription rule" may be used interchangeably and may generally refer to any rule or criteria associated with a subscription account. Such parameters may, for example, be recorded (e.g., in a database) in association with a subscription that defines the terms and conditions for redemption of subscription items at a vending machine. In one or more embodiments, rules or parameters may define the item(s) that may be redeemed according to product attributes such as the product's identity, type, category, brand, manufacturer, ingredients, nutritional information, and the like. Further, in one or more embodiments, other conditions or rules for redemption may be set, including but not limited to: (i) time conditions (e.g., redemption only after noon; redemption only within two (2) days of scheduled restock event); (ii) weather conditions (e.g., no redemption if temperature exceeds ninety (90) degrees Fahrenheit); (iii) inventory conditions (e.g., redemption only permitted if more than fifteen (15) units of a product remain in inventory); and/or (iv) sales conditions (e.g., redemption only permitted if actual velocity is less than ideal velocity and/or redemption only permitted for relatively unpopular products). Such rules may generally be set by an account holder and/or by a third party.

As used herein, the term "third party" may generally refer to any person and/or entity that may set the parameters of a customer's subscription account through a vending machine and/or a remote device or computer. The third party will generally comprise a different entity than the customer, such as a customer's employer, parent, spouse, etc. In one or more embodiments, a third party is one or more of an operator of a vending machine, a parent of a customer, a teacher, a principal, a personal trainer, nutritionist/weight manager, etc. Further, in one or more embodiments, a third party is a sponsor who subsidizes all or a portion of the subscription price. The third party may comprise, for example, a manufacturer of a particular product and/or product line offered by the vending machine.

Some embodiments described herein may be associated with a "subscription code", a "code", and/or a "subscription identifier". As used herein the terms "subscription code", "code", and "subscription identifier" may generally be used interchangeably, and may generally refer to any information or data that is associated with a vending machine customer subscription. Such a code or identifier may, in some embodiments, be correlated in a database with a registered subscription. Typically, such codes and/or identifiers may be "unique" or substantially unique identifiers. Such codes and/or identifiers may include, but are not limited to, customer-selected codes such as a Personal Identification Number (PIN) code, codes generated automatically (e.g., random digits) for the customer, a customer Social Security Number (SSN), customer credit or debit card numbers, currency serial numbers (e.g., the serial number of a dollar bill), customer birthdays, user names, passwords, device serial numbers (e.g., associated with a customer's device), and/or biometric data (e.g., a customer's retinal patterns, fingerprint and/or thumbprint patterns, topical facial patterns, signatures, or the like). In some embodiments, subscription codes may be stored on, printed on, and/or otherwise indicated by tokens, coupons, cards, vouchers, wirelessly transmitting devices, RFID transmitters, and other physical media, as described herein. Subscription codes may generally be established, defined, and/or verified upon acceptance and/or consummation of a subscription offer.

As used herein, the term "subscription offer" may generally refer to any offer that is provided to a customer proposing that the customer pay a subscription price in exchange for the ability to redeem at least two units of a product or products at a vending machine in at least two redemption transactions. Thus, by accepting subscription offers, customers may be able to purchase at least two units of a product, and redeem the units of the product at different points in time (e.g., one the first day, another the following day). Subscription offers may be presented to customers via a vending machine (e.g., via voice, sound, and/or one or more displays) and/or via other devices or methods, such as via e-mail, direct mailing, etc. Subscription offers may also or alternatively be presented to every customer that interfaces with a vending machine, or only certain customers, such as customers that insert a certain threshold amount of funds, etc.

Some embodiments herein are associated with a "subscription price". As used herein, the term "subscription price" may generally refer to the price charged in conjunction with the registration and/or acceptance of a subscription offer. In some embodiments, the subscription price may be equal to the sum of the full prices of the products indicated by the subscription offer. In other embodiments, the subscription price may be less than the sum of the full prices of the products indicated by the subscription offer. In such embodiments, subscription offers would provide customers with the ability to purchase the products at a discount relative to the total of the retail prices of all the purchased units. In yet other embodiments, such as "hard reserve" embodiments described herein, the subscription price may be more than the sum of the full prices of the products indicated by the subscription offer. A subscription price need not be fixed. For example, the amount a customer pays may not be in return for a fixed number of items. Also, the amount paid need not be known a priori. For example, the amount may be periodically charged in portions (e.g., once per week), and the amounts so charged need not be equal. In some embodiments, a third party may at least partially subsidize a subscription price.

As used herein, the terms "full price" and "retail price" may be used interchangeably and may generally refer to the normal price charged for the purchase of a given product (e.g., the price for which any customer may purchase a given product by inserting an equivalent monetary amount into the vending machine). Typically, subscription and/or package offers present customers with the opportunity to purchase items at less than full price and/or less than the total combined retail price of all subscription and/or package items.

Some embodiments herein are associated with a "voucher". As used herein, the term "voucher" may generally refer to any practicable type or configuration of substrate that is capable of indicating subscription identifiers, codes, and/or parameters. A voucher may comprise, for example, any form of physical medium for storing subscription codes and identifying registered subscriptions, such as a token, a card, and/or a certificate. In various embodiments, vouchers may comprise one or more of: credit cards, debit cards, stored value cards, smart cards, or other paper-based or plastic cards, certificates, vouchers, coin and/or disk shaped media (e.g., tokens), wireless transmitters, and/or RFID tags. In some embodiments, vouchers may be "machine readable." Examples of machine-readable vouchers include cards with markings thereon, such as punch holes or bar codes, for optical recognition by a vending machine. Also, machine-readable vouchers may voucher may identify a single registered subscription (e.g., a code refers to a specific registered subscription in a relational database). In other embodiments, several vouchers may identify a single registered subscription (e.g., a booklet of vouchers or several vouchers attached by perforation). During redemption transactions, vouchers may be presented by customers to a vending machine, which may validate the vouchers (as described herein), and, if appropriate, dispense one or more units of one or more products.

As used herein, the term "registration" may generally refer to the act, by a customer, of applying, registering, signing up, and/or otherwise indicating a desire to obtain a vending machine customer subscription and/or account. Registration may be performed via the vending machine and/or remotely, such as via a computer coupled to the Internet. In some embodiments, registration may be accomplished by and/or associated with a "registration transaction". Registration and/or a registration transaction may generally comprise the process by which a customer accepts a subscription offer by (1) signaling acceptance of a subscription offer (e.g., by pressing a button on a vending machine's keypad), and/or (2) providing payment to a vending machine operator. In some embodiments, registration may take place at a vending machine. In such embodiments, a registration transaction may optionally include the dispensing of a first product or products in a subscription. In other embodiments, registration may take place through a communications network, such as a telephone or computer network. In some embodiments, registration may be preceded by, include, and/or follow the recordation of account parameters by an account holder and/or a third party.

As used herein, the term "redemption" may generally refer to the act, by a customer, of requesting, redeeming, and/or otherwise obtaining a unit of a product in accordance with and/or pursuant to a vending machine customer subscription and/or account. Redemption may generally be performed via the vending machine and/or an associated device. In some embodiments, redemption may be accomplished by and/or associated with a "redemption transaction". Redemption and/or a redemption transaction may generally comprise the process by which a customer who has previously accepted a subscription offer (e.g., and thereby engaged in a registration transaction) enters a subscription code or identifier into an input device that is in communication with a vending machine control system, and receives one or more units of the product indicated by the underlying subscription. In some embodiments, codes may be entered directly by customers (e.g., into a keypad and/or via a fingerprint reader). In other embodiments, codes may be entered via voucher (e.g., a bar-coded voucher is deposited into a barcode reading bill validator). In some embodiments, a vending machine and/or computer associated therewith may determine whether or not certain account parameters are satisfied before honoring a request to redeem a unit of product from a vending machine.

Some embodiments herein are associated with a "subscription renewal". As used herein, the term "subscription renewal" generally refers to the process by which a previously registered subscription is identified and updated to reflect a customer's entitlement to additional units of product. In some embodiments, subscriptions are renewed as part of a redemption transaction. In other embodiments, subscriptions may be renewed through a communications network, such as a telephone or computer network. Renewal may be performed upon request, or authorized to occur automatically under certain conditions. For example, in one embodiment, renewal may only be permitted upon approval by a third party (e.g. a parent), while in other embodiments, renewal may occur automatically (i) at pre-defined time intervals, and/or (ii) upon the occurrence of various events (such as in the case that the number of units credited to the customer's account falls below a pre-determined level).

As used herein, the terms "restock date" and "restock time" may generally refer, respectively, to the date and/or time that a vending machine is scheduled to be restocked by an operator (or agent thereof) of a vending machine. The time between restock dates may generally be referred to as a "sales period" or "fill period". In some embodiments however, a sales period may otherwise be defined, e.g., such that multiple (and/or fractional) sales period may occur between restock dates.

As used herein, the terms "actual velocity" and "actual item velocity" may be used interchangeable to generally refer to the actual rate at which a given product is sold by a vending machine during a sales period.

Some embodiments herein are associated with an "ideal velocity", an "ideal product velocity", a "target product velocity", and/or a "target velocity". As used herein, the terms "ideal velocity", "ideal product velocity", "target product velocity", and/or "target velocity" may be used interchangeably and may generally refer to a desired rate at which a given product should be sold by a vending machine during a sales period. Thus, in some embodiments, an ideal velocity may be set or calculated for each product indicating the rate at which products must be sold in order to deplete the inventory to a certain level by the end of a given sales period (e.g., by the restock time). For example, an ideal product velocity may be calculated by a vending machine control system after an operator inputs a restock date and a desired remaining inventory for the date (e.g., an operator may wish to have only one (1) of each item remaining at the restock date so that the machine sells as many items as possible without completely selling out and thereby disappointing customers). Thus, if an operator (i) stocks fifty (50) units of Soda A, (ii) inputs a restock date fourteen (14) days away, and (iii) indicates that only one (1) unit of Soda A should remain at the restock date, the control system may divide forty-nine (49; the number of units that are desired to be sold) by fourteen (14; the number of days until restock) to conclude that, on average, three and one half (3.5) units must be sold per day within the sales period in order to realize the ideal product velocity. As discussed herein, a vending machine control system may periodically, substantially continuously, or otherwise determine whether or not actual item velocity is at least equal to the ideal item velocity, and if not, may institute subscription offers and/or promotions as described herein.

III. Systems and Apparatus

A. Introduction

Generally, a vending machine for use with some embodiments may comprise a device that is capable of (i) prompting a customer to provide an indication of a subscription code and/or identifier; (ii) receiving the indication of the subscription code and/or identifier; (iii) registering customers for vending machine subscriptions; (iv) providing subscription codes to customers; (v) determining and satisfying product redemptions associated with vending machine customer subscriptions; (vi) managing customer subscription accounts; (vii) providing third-party access and/or management of customer subscription accounts; (viii) processing a payment; and/or (ix) dispensing a product.

Referring first to FIG. 1, a block diagram of a system 100 according to some embodiments is shown. The system 100 may comprise, for example, a customer device 102 and/or a third party device 104 in communication (e.g., via a network 106) with a vending machine 110. This communication may generally be established by and/or facilitated via the vending machine 110 (although it should be understood that in some embodiments, other and/or additional devices may be utilized to establish and/or facilitate the communication, such as a kiosk, Automatic Teller Machine (ATM), etc.). Either or both of the customer device 102 and the third party device 104 may communicate directly with and/or be coupled directly to the vending machine 110. In some embodiments, either or both of the customer device 102 and the third party device 104 may otherwise communicate with the vending machine 110, such as via the network 106. The network 106 may comprise any type and/or configuration of network that is or becomes known or practicable. The network 106 may comprise, for example, any number of wired and/or wireless networks.

According to some embodiments, the customer device 102 may be utilized by a customer (not shown) to communicate with the vending machine 110 to (i) purchase a product, (ii) establish a subscription account, (iii) redeem a subscription product, (iv) and/or manage a subscription account. The third party device 104 may, according to some embodiments, be utilized to communicate with the vending machine 110 (and/or other devices associated therewith that are not explicitly shown in FIG. 1) to establish subscription accounts (e.g., on behalf of and/or for one or more customers) and/or to manage subscription accounts, such as by defining, editing, and/or selecting account rules and/or parameters, and/or by monitoring, updating, and/or checking account transactions and/or balances.

In some embodiments, the customer device 102 may comprise a PC, laptop, PDA, and/or wireless or cellular telephone. The customer device 102 may, for example, comprise a Bluetooth®-enabled cellular telephone. In such embodiments, the vending machine 110 may detect and/or actively solicit the customer device 102 with an offer to purchase a subscription (e.g., instead of and/or in addition to displaying messages via the vending machine 110). The network 106 may generally comprise any practicable and/or desirable type and/or configuration of network, such as the Internet. The third party device 104 may generally comprise any type of network device such as a PC, cellular and/or other telephone, and/or PDA that is operable to communicate with the vending machine 110. The third party device 104 may, for example, be owned and/or operated by and/or otherwise associated with an individual and/or entity that desires to establish, maintain, and/or manage customer accounts. In some embodiments for example, the third party device 104 may comprise a device owned and/or operated by a parent, spouse, employer, and/or other individual or entity associated with the customer and/or customer device 102. According to some embodiments, either or both of the customer device 102 and the third party device 104 may comprise a single device and/or components of a single device. The customer device 102 and/or the third party device 104 may also or alternatively be coupled to and/or be part of the vending machine 110 (e.g., a keypad and/or other input device).

Figure 2:
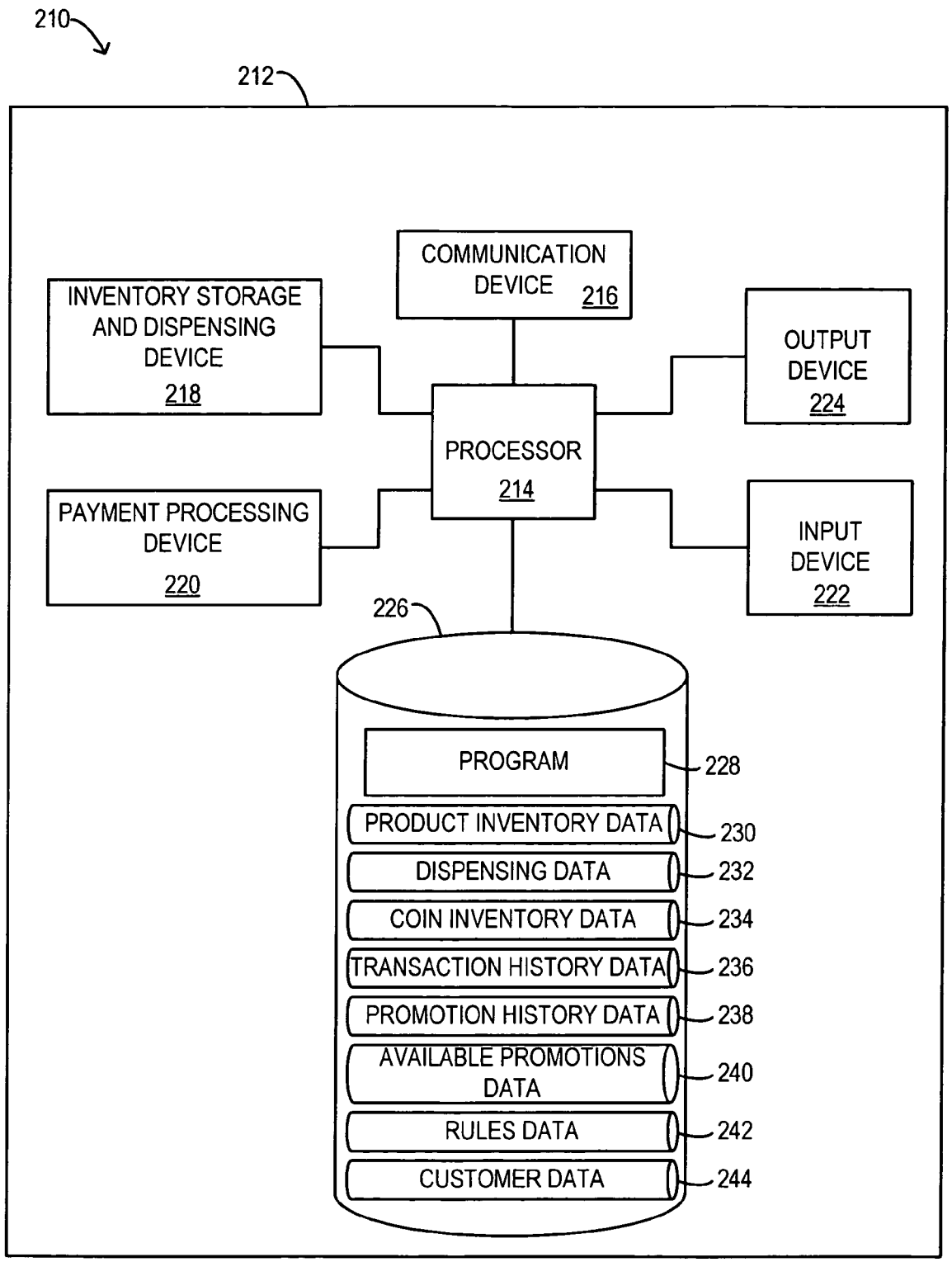
FIG. 2 is a block diagram of a vending machine according to some embodiments.

Turning now to FIG. 2, a block diagram of a vending machine 210 according to some embodiments is shown. In some embodiments, the vending machine 210 may be similar in configuration and/or functionality to the vending machine 110 of FIG. 1. The vending machine 210 may comprise, for example, a casing 212 enclosing one or more of a processor 214, a communications device 216, an inventory and dispensing device 218, a payment processing device 220, an input device 222, an output device 224, and/or a data storage device 226. According to some embodiments, the vending machine 210 may be configured to perform and/or facilitate processes in accordance with embodiments described herein. The vending machine 210 may, for example, be utilized to offer and/or provide subscription accounts to customers and/or to allow third parties to manage such customer subscription accounts.

B. Casing/Cabinetry

In some embodiments, a suitable casing 212 and/or cabinetry may be constructed from any suitable material, including but not limited to any combination of (1) commercial grade sixteen-gauge steel (e.g., for exterior panels and internal shelving), (2) transparent materials such as glass or Plexiglas (e.g., for product display windows), (3) rubber (e.g., for waterproofing insulation), (4) plastic, and/or (5) aluminum.

Many commercially available casings 212 may be adapted to work in accordance with various embodiments. For example, in snack machine embodiments, a suitable casing 212 may comprise the "129 SnackShop" manufactured by Automatic Products International, Ltd. of Saint Paul, Minn., which stands at seventy-two inches (72"/1829 mm) wide, has a width of thirty-eight and seven eighths inches (38⅞"/988 mm), and a depth of thirty-five inches (35"/889 mm). Other suitable snack machine casings 112 include the A La Carte® machine from Automatic Products, and the GPL SnackVendor model #159 from Crane Merchandising Systems/Crane Co. of Stamford, Conn.

In beverage machine embodiments, casings 212 commercially available from Dixie Narco, Inc. of Williston, S.C. may be employed. Beverage machine casings 212 may comprise a "cooler" or "glass front" style front panel, featuring a transparent front panel (e.g., glass) enabling customers to see inventory for sale. Alternatively, beverage machine casings 212 may comprise a "bubble front" style front panel, featuring a decorative front panel, typically used to advertise a logo of a product manufacturer commercially interested in the operation of the vending machine 210.

Other embodiments are contemplated as well, including combination snack and beverage vending machine embodiments, such as those available from Crain Co. Further details concerning the suitability of machine casings 212 and/or cabinetry are well known in the art, and need not be described in further detail herein.

C. Processor/Controller

According to some embodiments, the vending machine 210 may include the processor 214 that may be or include any type, quantity, and/or configuration of processor that is or becomes known. The processor 214 may comprise, for example, an Intel® IXP 2800 network processor or an Intel® XEON™ Processor coupled with an Intel® E7501 chipset. In some embodiments, the processor 214 may comprise multiple inter-connected processors, microprocessors, and/or micro-engines. According to some embodiments, the processor 214 may include or be coupled to one or more clocks or timers (not explicitly shown) and to the communication device 216 through which the processor 214 may communicate, in accordance with some embodiments, with other devices such as one or more peripheral devices, one or more servers, and/or one or more user devices (such as the customer device 102 and/or the third party device 104, both of FIG. 1). The communication device 216 may, for example, comprise any type or configuration of communication port, cable, modem, and/or signal transceiver that is or becomes known or practicable.

In some embodiments, the processor 214 may also or alternatively be in communication with and/or coupled to any number of other components of the vending machine 210 such as the inventory and dispensing mechanism 218, the payment processing mechanism 220, the input device 222, the output device 224, and/or the data storage device 226.

D. Inventory Storage and Dispensing Device

In some embodiments, the vending machine 210 may comprise the inventory storage and dispensing device 218. The inventory storage and dispensing device 218 may, according to some embodiments, comprise any number and/or configuration of devices and/or components that facilitate and/or are associated with the storage and/or dispensing of products or services available via the vending machine 210. Product inventory storage and product dispensing functions of the vending machine 210 configured in accordance with a snack machine embodiment may include, for example, one or more of: (i) a drive motor, (ii) metal shelves, (iii) a product delivery system (e.g., a chute, product tray, and/or product tray door), (iv) dual spiral (e.g., double helix) item dispensing rods, (v) convertible (e.g., extendable) shelves, and/or (vi) a refrigeration unit. In embodiments using the casing 212 of the "model 129 SnackShop" manufactured by Automatic Products, three (3) removable shelves may be employed, together providing for thirty (30) product rows and an inventory capacity of between one hundred and eighty-five (185) to five hundred and twenty-two (522) commonly vended snack products.

Inventory storage and distribution functions of the vending machine 210 configured in accordance with a beverage machine embodiment may include one or more conventional components, including: (i) metal and/or plastic shelving, (ii) product dispensing actuators/motors, (iii) product delivery chutes, and/or (iv) a refrigeration unit.

In many types of beverage and snack vending machines, operators will typically stock several units of the same product linearly arranged in a column, allowing individual units to be dispensed upon command. The same product may be stocked in more than one column. Similarly, more than one product may be stocked in a single column. In the case that one or more services are available via the vending machine 210, the inventory storage and dispensing device 218 may comprise any device or component that is associated with the storage, transmission, encoding or decoding (e.g., including encryption and decryption), and/or other processing, routing, or electronic delivery or redemption of such services.

Further details concerning vending machine inventory storage and dispensing devices 218 are well known in the art, and need not be described in further detail herein.

E. Payment Processing Device

According to some embodiments, the vending machine 210 may comprise the payment processing device 220. The payment processing device 220 may, according to some embodiments, comprise any number and/or configuration of devices and/or components for receiving payment and/or dispensing change, including a coin acceptor, a bill validator, a card reader (e.g., a magnetic stripe reader), and/or a change dispenser.

In some embodiments, a magnetic stripe card reader may read data on a magnetic stripe of a credit or debit card, for example, and it may cooperate with conventional POS credit card processing equipment to validate card-based purchases through a conventional transaction authorization network. Suitable card-based transaction processing systems and methods are available from USA Technologies, Inc.™ of Wayne, Pa. In some embodiments, a coin acceptor, bill validator and/or change dispenser may communicate with and/or be coupled to a currency storage apparatus (a "hopper"; not shown) and may comprise conventional devices such as models AE-2400, MC5000, TRC200 by Mars, Inc.™ of West Chester, Pa., or CoinCo™ model 9300-L.

Coin acceptors and/or bill validators may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled "Coin Tube Monitor Means", the payment and coin-related aspects of which are incorporated by reference herein. According to some embodiments, a change dispenser activates the return of coinage to the customer where appropriate (e.g., where a customer rejects or otherwise fails to accept a dynamically priced upsell offer). Such apparatus may feature Multidrop Bus (MDB) and/or Micromech peripheral capabilities, as are known in the art.

In another embodiment, the vending machine 210 may be configured to receive payment authorization and/or product selection commands or signals through a wireless device communication network (e.g., via the communication device 216), directly or indirectly, from a customer device (e.g., a cellular telephone, not shown; the customer device 102 and/or the third party device 104, both of FIG. 1). In such an embodiment, the payment processing device 220 may comprise a cellular transceiver operatively connected to the processor 214 to receive, transmit, and/or process such signals. Systems and methods allowing for the selection of and payment for vending machine products via cellular telephones are provided by USA Technologies, Inc.™. Further, in such an embodiment, a customer cellular telephone may serve as an input device 222 and/or an output device 224, as described elsewhere herein.

Further details concerning vending machine payment processing devices 220 are well known in the art, and need not be described in further detail herein.

F. Input and Output Devices

According to some embodiments, the vending machine 210 may comprise the input device 222 and/or the output device 224. In some embodiments, the input device 222 may be operable to receive input from (i) a customer indicating a product and/or offer selection (e.g., a subscription offer selection), from (ii) an operator (or agent thereof) during stocking or maintenance of the vending machine 210, and/or from (iii) a third party desiring to establish and/or manage a customer subscription account. Also, the output device may be configured for outputting product and/or offer information (such as subscription and/or package deal information and/or promotions) to a customer, operator, and/or third party.

Many combinations of input devices 222 and output devices 224 may be employed according to various embodiments. In some embodiments, the vending machine 210 may include more than one input device 222. For example, the vending machine 210 may include an exterior input device 222 for receiving customer input and an interior input device 222 (neither shown separately) for receiving operator input. In some embodiments, the input device 222 may provide the dual functionality of receiving input data from both operators and customers (and/or third parties). Likewise, a vending machine may comprise more than one output device 224 (e.g., an LCD screen and several LED devices, as described herein). In some embodiments, such as those which feature touch screens (described elsewhere herein), the functionality of both input devices 222 and output devices 224 may be provided by a single device.

Many input devices 222 are contemplated. Thus, an input device 222 may comprise one or more of the following: (i) a set of alpha-numeric keys for providing input to the vending machine, such as the Programmable Master Menu® Keypad, (ii) a selector dial, (iii) a set of buttons associated with a respective set of item dispensers, (iv) a motion sensor, (v) a barcode reader (e.g., a 1-D or 2-D barcode reader), (vi) a voice recognition module, (vii) a Dual-Tone Multi-Frequency receiver/decoder, (viii) a wireless device (e.g., a cellular receiver; a radio-frequency receiver; an infrared receiver; a wireless access point or wireless router; other wireless devices), (ix) a smart card reader, (x) a magnetic stripe reader, (xi) a biometric identification apparatus (e.g., an iris scanner, a retinal scanner, a thumbprint reader, etc.), (xii) a customer device, and/or (xiii) any other type or configuration of input device 222 that may be or become known or practicable.

In some embodiments, an input device 222 may comprise an optical reader (e.g., a 2-D bar code scanner) capable of scanning a barcode, such as a bar code which is displayed on a screen or monitor of a user's cellular phone, PDA, Blackberry® business phone, Blackberry® handheld or other handheld device. One system employing such technology, the Cmode® service, has been developed by a partnership between Coca-Cola® Co. and NTT DoCoMo™ Inc. of Japan. According to some embodiments, the input device 222 may comprise a fingerprint (e.g., and/or thumbprint) reader such as a Fujitsu MBF200 Scanner, which is manufactured by Tacoma Technology, Inc of Taipai, Taiwan and Fujitsu® Microelectronics America, Inc. of Tokyo, Japan. The Fujitsu® MBF200 offers a resolution of five hundred dots per inch (500 dpi), an image capture area of 12.8×15 mm (0.5"× 0.6"), and a unit size of 60×40×15 mm (2.4"×1.6"×0.6"). The Fujitsu® MBF200 may communicate with a vending machine processor 214 through any practicable interface such as a USB interface. The Fujitsu® MBF200 may be desirable in an embodiment where the vending machine processor 214 is instructed through a Linux-based operating system. In embodiments featuring the Fujitsu® MBF200, fingerprint-matching software may be employed. Exemplary fingerprint matching software may include, for example, VeriFinger™ 4.2 from Neurotechnologija, Ltd. of Vilnius, Lithuania.

In some embodiments, a suitable fingerprint reader for use as an input device 222 may include the AF-S2 FingerLoc™ from AuthenTec®, Inc. of Melbourne, Fla. The AF-S2 FingerLoc™ offers a resolution of two hundred and fifty dots per inch (250 dpi), an image capture area of 13×13 mm (0.51"× 0.51"), and a unit size of 24×24×3.5 mm (0.94"×0.94°×0.14°). The AF-S2 FingerLoc™ may communicate with a vending machine processor through any practicable interface such as a USB interface. The AF-S2 FingerLoc™ may be desirable in an embodiment where the vending machine processor 214 is instructed through a Microsoft® Windows®-based operating system. In embodiments featuring the AF-S2 FingerLoc™, fingerprint matching software may be employed. Exemplary fingerprint matching software may include, for example, VeriFinger™ 4.2 from Neurotechnologija, Ltd. of Vilnius, Lithuania.

Likewise, many types of output devices 224 are contemplated. For example, an output device may comprise an LCD screen or device. Alternatively or additionally, the output device 224 may comprise one or more LED displays or devices (e.g., several alphanumeric multi-color or single color LED displays on the shelves of a vending machine associated proximately with each row of product inventory).

In one embodiment, an LED display screen is mounted atop the vending machine (via bolts or other mounting hardware) and is used to communicate offers and other messages (e.g., product advertisements, such as package deals and/or subscription offers or promotions) to prospective customers. A suitable LED display screen for such an embodiment may be housed in an aluminum case having a length of approximately twenty-seven and one half inches (27.5"/698.5 mm), a height of approximately four and one quarter inches (4.25"/107.95 mm), and a depth of approximately one and three quarter inches (1.75"/44.5 mm). Such a display screen may have a display area capable of showing about thirteen (13) alphanumeric and/or graphical characters. Further, such an LED display screen may comprise a serial computer interface, such as an RJ45/RS232 connector, for communicating with the processor 214. Further still, such an LED display may be capable of outputting text and graphics in several colors (e.g., red, yellow, green, black) regarding current and upcoming promotions.

Further, in some embodiments, the output device 224 may comprise a printer. In one embodiment, a printer may be configured to print on card stock paper of approximately one hundredth of an inch or less (e.g., 0.01"/0.15 mm or less) in thickness, such as the EPSON EU-T400 Series Kiosk Printer. Further, a printer may be capable of thermal line printing of various alphanumeric and graphical symbols in various font sizes (e.g., ranging from nine (9) to twenty-four (24) point) on various types of paper. Additionally, such a printer may communicate with the processor 114 via an RS232/IEEE 12834 and/or bi-directional parallel connection. Such a printer may further comprise a data buffer of various practicable sizes, such as approximately four kilobytes (4 KB). In some embodiments, the printer may be operable to output subscription codes and/or identifiers (e.g., by printing vouchers) to customers and/or to print stickers, labels, and/or other indications to be attached to products vended by the vending machine 210. The output device 224 may also comprise a device operable to attach and/or print indications of access codes onto one or more products of the vending machine 210 (e.g., as the products are loaded by an operator, while the products are shelved within the vending machine 210, and/or as the products are dispensed—such as a hopper printing and/or coupling mechanism). According to some embodiments, the output device 224 may also or alternatively comprise an audio module, such as an audio speaker, that outputs information to customers audibly.

As stated, in some embodiments, a touch-sensitive screen may be employed to perform both input device 222 and output device 224 functions. Suitable, commercially available touch screens for use according to various embodiments are manufactured by EIo TouchSystems, Inc., of Fremont, Calif., such as EIo's AccuTouch series touch screens. Such touch screens may comprise: (i) a first (e.g., outer-most) hard-surface screen layer coated with an anti-glare finish, (ii) a second screen layer coated with a transparent-conductive coating, and/or (iii) a third screen layer comprising a glass substrate with a uniform-conductive coating. Further, such touch screens may be configured to detect input within a determined positional accuracy, such as a standard deviation of error less than plus or minus eight hundredths of an inch (±0.08"/2 mm). The sensitivity resolution of such touch screens may be more than one hundred thousand touchpoints per square inch (100,000 touchpoints/in$^2$/15,500 touchpoints/cm$^2$) for a thirteen inch (13") touch screen. For such touch screens, the touch activation force required to trigger an input signal to the processor 214 via the touch screen may typically be around two to four ounces (2-4 ounces/57-113 g). Additionally, touch screens for use according to various embodiments may be resistant to environmental stressors such as water, humidity, chemicals, electrostatic energy, and the like. These and other operational details of touch screens (e.g., drive current, signal current, capacitance, open circuit resistance, and closed circuit resistance) are well known in the art and need not be described further herein.

In some embodiments, input and/or output functionality of the vending machine 210 may be facilitated through a wireless device configured to send data to, and/or receive data from, a customer device (e.g., the customer device 102 of FIG. 1), such as a laptop computer or a cellular telephone. In some embodiments, such a wireless device may comprise a sensor that detects signals from a customer device. Such signals may include but are not limited to radio frequency signals and/or IR signals. Thus, in one or more embodiments, a wireless input device 222 may comprise a WAP or router configured to operate in accordance with an IEEE 802.11 standard, including the 802.11b and 802.11g standards, which transmit at 2.4 GHz, or the 802.11a standard, which transmits at 5 GHz. Such a wireless input device 222 may, in some embodiments, have the capability to "frequency hop" between radio frequencies so as to reduce interference and/or increase security. Encryption techniques may also or alternatively be employed to increase the security of transmissions. Suitable WAPs are available from Belkin™ Corporation of Compton, Calif. and Cisco™ Systems, Inc. of San Jose, Calif. The wireless input device 222 may, in some embodiments, be used to establish a communication link (such as a first communication link with a customer device) as described herein.

Additionally, in some embodiments, an output device 224 may comprise an audio module, such as an audio speaker, that outputs information to customers audibly. Speakers may comprise conventional speakers and/or modem hypersonic speakers. An output device 224 may include, for example, unidirectional and/or hypersonic speakers which can selectively focus sound to particular locations or customers, while not disturbing others who are not in the location of the focused sound. For a description of such speakers, see Suzanne Kantra Kirschner, "We've heard hypersonic sound. It could change everything", Popular Science, available at http://www.popsci.com/popsci/science/article/0,12543, 351353,00.html, the unidirectional and/or hypersonic speaker concepts and descriptions of which are hereby incorporated by reference herein.

In some embodiments, the output device 224 may comprise a physical device having a game theme, such as a spinning "prize wheel" similar to those featured on the television game show Wheel of Fortune™ or The Price is Right™, a roulette wheel, mechanical slot machine reels, or the like. Such a wheel may communicate to customers various information. For example, the wheel may spin and stop on an icon that represents, e.g., a prize entitlement. A physical wheel in the general appearance of the wheel on the Wheel of Fortune™ game show may be attached to a vending machine.

Also or in addition to a wheel, another output device 224 that is a peripheral device attached to and in communication with the vending machine 210 may communicate game-related information. By utilizing such an output device 224, vending machines 210 may be retrofitted with a separate device to employ game-themed promotions. The use of removable peripheral devices may be important in certain situations (e.g., where doorways to interior locations are low), as such satellite devices may be removed during transport and attached once vending machines are brought to the intended location. Likewise, such peripheral devices may be side-mounted, where the ceiling height may impair other location of the peripheral. Further, the use of a separate device is advantageous in that it may be in communication with more than one vending machine 210, allowing many vending machines 210 to participate in game-themed vending promotions.

G. Data Storage/Memory

The data storage device 226 may include any appropriate combination of magnetic, optical and/or semiconductor memory, and may include, for example, additional processors, communication ports, RAM, Read-Only Memory (ROM), a compact disc and/or a hard disk. The processor 214 and the storage device 126 may each be, for example: (i) located entirely within a single computer or other computing device; or (ii) connected to each other by a remote communication medium, such as a serial port cable, a Local Area Network (LAN), a telephone line, RF transceiver, a fiber optic connection and/or the like. In some embodiments for example, the vending machine 210 may comprise one or more computers (or processors 214) that are connected to a remote server computer (e.g., via the communication device 216) operative to maintain databases, where the data storage device 226 is comprised of the combination of the remote server computer and the associated databases.

The data storage device 226 may generally store one or more programs 228 for controlling the processor 214. The processor 214 may perform instructions of the program 228, for example, and thereby operate in accordance with some embodiments, and particularly in accordance with the methods described in detail herein. According to some embodiments, the program 228 may comprise any number or type of programs that are or becomes known or practicable. In some embodiments, the program 228 may be developed using an object oriented programming language that allows the modeling of complex systems with modular objects to create abstractions that are representative of real world, physical objects and their interrelationships. However, it would be understood by one of ordinary skill in the art that the embodiments described herein can be implemented in many different ways using a wide range of programming techniques as well as general purpose hardware systems or dedicated controllers.

The program 228 may be stored in a compressed, un-compiled and/or encrypted format. The program 228 furthermore may include program elements that may be generally useful, such as an operating system, a database management system and/or device drivers for allowing the processor 214 to interface with computer peripheral devices and/or the various components of the vending machine 210. Appropriate general purpose program elements are known to those skilled in the art, and need not be described in detail herein.

Further, the program 228 may be operative to execute a number of invention-specific objects, modules and/or subroutines which may include (but are not limited to) one or more subroutines to determine whether a promotion should be output; one or more subroutines to determine a promotion type; one or more subroutines to populate a promotion type (such as a subscription offer or promotion), thereby constructing a promotion instance; one or more subroutines to select a constructed promotion instance from a plurality of hypothetical promotion instances; one or more subroutines to determine an expected value of a promotion being considered for output; one or more subroutines to determine how and/or when products should be dispensed from the vending machine 210; one or more subroutines to determine and/or provide subscription codes; one or more subroutines to provide management access to customer subscription accounts (e.g., to third parties); and/or one or more subroutines to provide and/or facilitate the sale and/or management of subscription accounts. Examples of some of these subroutines and their operation are described in detail with respect to the processes described elsewhere herein.

According to some embodiments, the instructions of the program 228 may be read into a main memory (not explicitly shown) of the processor 214 from another computer-readable medium (such as the data storage device 226), like from a ROM to a RAM. Execution of sequences of the instructions in the program 228 may cause the processor 214 to perform the process steps described herein. In alternative embodiments, hard-wired circuitry or integrated circuits may be used in place of, or in combination with, software instructions for implementation of the processes described herein. Thus, some embodiments are not limited to any specific combination of hardware, firmware, and/or software.

In addition to the program 228, the data storage device 226 may also be operative to store one or more databases, files, and/or tables, containing information such as (i) product inventory data 230, (ii) dispensing data 232, (iii) coin inventory data 234, (iv) transaction history data 236, (v) promotion history data 238, (vi) available promotions data 240, (vii) rules data 242, and/or (viii) customer data 244 (e.g., which may include subscription data and/or third party data). Any number of other arrangements may be employed besides those suggested by the tables shown. For example, even though eight separate data tables, stores, files, and/or databases are illustrated, embodiments may be practiced effectively using fewer or more functionally equivalent databases or similar structures. These databases and/or other databases (not shown) may also or alternatively store information associated with specifically with subscriptions and/or information useful in the management thereof. Subscription codes and/or identifiers, subscription rules or parameters, subscription transaction history data, third party data, and/or other metrics may, for example, be stored to facilitate the providing and/or management of subscriptions via the vending machine 210.

Further, despite the depiction of the data as tables, an object-based model could be used to store and manipulate the data types and likewise, object methods or behaviors can be used to implement the processes described herein.

H. Vending Machine Retrofitting

In some embodiments, one or more of the processor 214, the input device 222, the output device 224, and the data storage device 226 may be included, wholly or partially, in a separate device (e.g., separate from and/or external to the casing 212; not shown), such as the e-Port™ by USA Technologies Inc., that may be in communication with the vending machine 210. The separate devices may also or alternatively be in communication with a network such as the Internet (e.g., via the communication device 216).

The e-Port™ is a credit and smart card-accepting unit that controls access to office and MDB vending equipment, and serves as a point of purchase credit card transaction device. The e-Por™ includes an LCD that allows for the display of color graphics, and a touch sensitive input device (touch screen) that allows users to input data to the device. The display may be used to prompt users interactively with, e.g., offers and information about their transaction status.

The separate device may alternatively be a programmed computer running appropriate software for performing various functions described herein. The separate device may be operable to receive input from customers, receive input from third parties, receive payment from customers, exchange information with a remotely located server (e.g., an ISP server, a VoIP service provider's server) and/or display messages to customers (e.g., subscription offers). The separate device may be operable to instruct the vending machine that appropriate payment has been received (e.g., via a credit card read by the separate device), that a particular product or products should be dispensed by the vending machine, and/or how and/or when those products should be dispensed (e.g., to avoid product collisions and/or other complications). Further, a separate device may be operable to instruct the vending machine to execute and/or offer subscriptions, price changes, or the like.

Thus, a separate device may be operatively connected to a vending machine 210 to perform various processes and steps described herein including the providing and/or management of vending machine customer accounts, such as the subscription accounts described herein. In this manner, conventional vending machines may be retrofitted with such separate devices so as to perform the processes described herein.

I. Other Separate Devices

It should be noted that, in some embodiments, some or all of the functions and method steps described herein may be performed partially or entirely by one or more separate devices (not explicitly shown), which are not necessarily retrofitted to a vending machine 210. Separate devices for use with such an embodiment include, but are not limited to, kiosks and customer devices (PDA devices, laptop computers, and cellular telephones). In some embodiments featuring separate devices, such devices may be capable of communicating, directly (e.g., via Bluetooth® connectivity) or indirectly (e.g., through a web server or IVRU), to a vending machine control system in order to facilitate the inventive functionality described herein. In some embodiments featuring separate devices, such separate devices are capable of communicating with a remote computer.

J. Network Embodiments

Network environments may include a remotely located device or computer (e.g., a server, mainframe, or other device) that is in communication, via a communications network (such as the network 106 of FIG. 1), with one or more vending machines 210 and/or customer devices. Such a configuration may facilitate third party management of customer accounts as described herein.

The remote device or computer may communicate with the vending machines 210, customer devices, and/or third party devices, and the vending machines 210 may communicate with each other, directly or indirectly, via a wide variety of wired and/or wireless means, mediums, protocols and communications standards. Some, but not all, possible communication links and networks that may comprise the network or be otherwise part of the system include but are not limited to: PSTN links, satellite links, cellular links, optical links, infrared links, radio frequency links, and/or Cable TV links. Various networking configurations, standards and protocols may be employed, including but not limited to: IP addressing via the Internet, a local area network (LAN), a wireless LAN, a wide area network (WAN), Ethernet (or IEEE 802.3), Token Ring, SAP, ATP, Bluetooth™, TCP/IP and/or via any appropriate combination thereof. Communication may be encrypted to ensure privacy and prevent fraud in any of a variety of ways well known in the art.

Vending machines 210 may comprise computers, such as those based on the Intel® Pentium® or Centrino™ processor, that are adapted to communicate with the remote device or computer. Any number and type of machines may be in communication with the remote device or computer.

Those skilled in the art will understand that vending machines 210, devices and/or computers in communication with each other need not be continually transmitting to each other. On the contrary, such vending machines, devices and/or computers need only transmit to each other as necessary, and may actually refrain from exchanging data most of the time. For example, a vending machine in communication with another machine via the Internet may not transmit data to the other machine for weeks at a time.

In some embodiments, the remote device or computer may be accessible, directly or indirectly, via a separate device (such as a customer device and/or third party device) by a customer, operator, and/or third party. Accordingly, a customer, operator, and/or third party may use a device to communicate with the remote computer. A separate device may receive from the remote computer messages described herein as being output by the vending machine 210 (e.g., subscription codes), and/or may transmit to the remote computer input described herein as being provided to the vending machine 210 (e.g., subscription codes). Thus, various data described herein as received through an input device of a vending machine 210 may be received by the vending machine 210 from a separate device (e.g., through a Bluetooth® connection) or from a remote computer (which may relay data first received from a customer device such as a personal computer). Similarly, various data described herein as received through an input device 222 of a vending machine 210 may be received through a Web browser communicating with a remote server, which in turn communicates with the vending machine 210.

K. External Appearance

Figure 3:
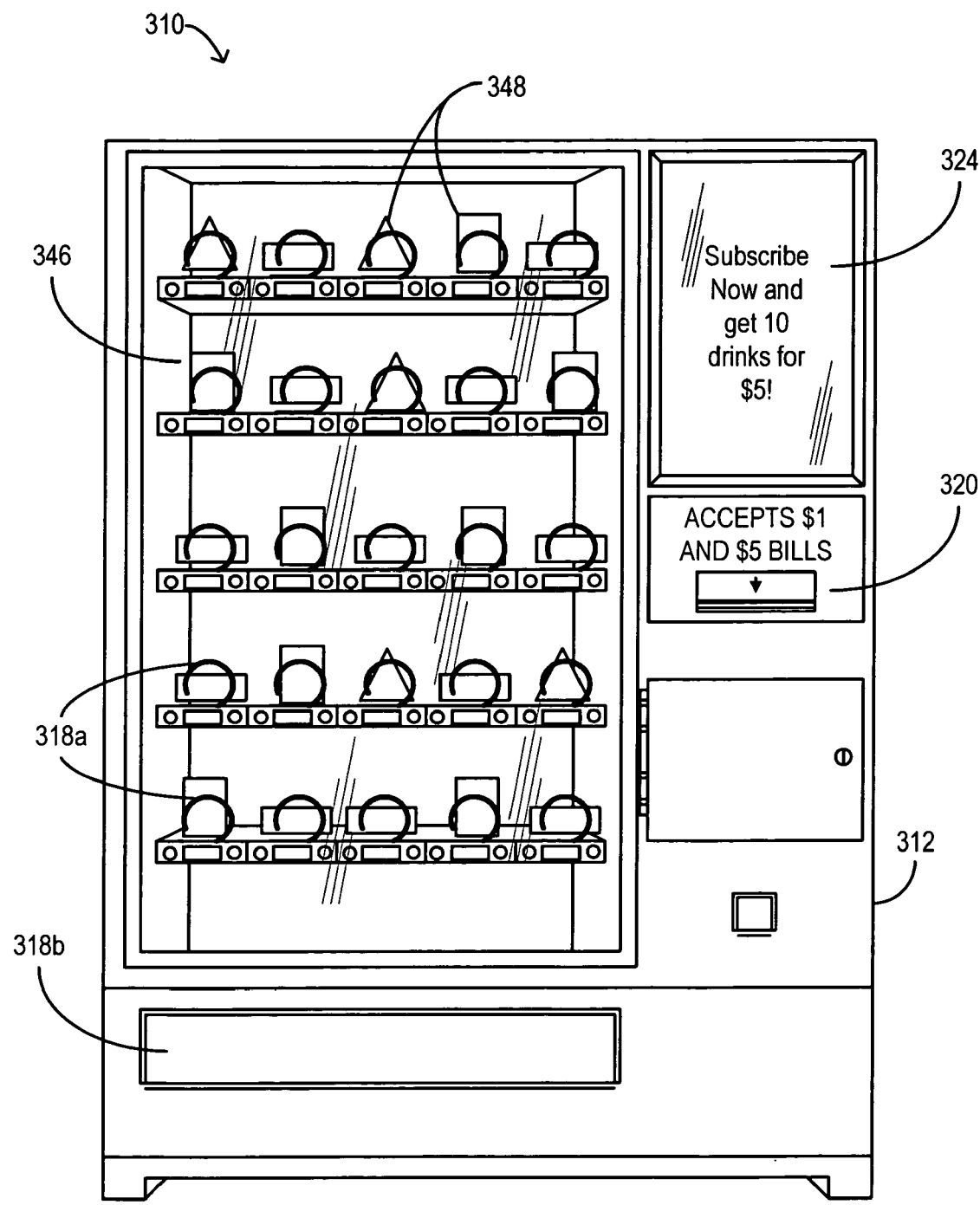
FIG. 3 is a diagram illustrating an example of the external appearance of a vending machine according to some embodiments.

Referring to FIG. 3, a diagram illustrating an example of the external appearance of a vending machine 310 according to some embodiments is shown. In some embodiments, the exemplary vending machine 310 may be similar in configuration and/or functionality to the vending machines 110, 210 described in conjunction with any of FIG. 1 and/or FIG. 2. The exemplary vending machine 310 may comprise, for example, (i) a cabinet 312, (ii) an inventory dispensing mechanism 318a-b (comprising a product storage mechanism 318a and/or a product hopper 318b), (iii) a payment processing mechanism 320, (iii) an output device 324 (e.g., for outputting text and/or graphical information about promotions such as subscription offers or promotions to a customer, and/or for facilitating subscription account management), and (iv) a product display window 346 behind which are visible the products 348 available for sale from the vending machine 310 and the product storage mechanism 318a that holds the products within the vending machine 310. According to some embodiments, the components 312, 318, 320, 324, 346 of the vending machine 310 may be similar in configuration and/or functionality to the similarly named and/or numbered components described in conjunction with FIG. 2 herein.

The casing 312 may, fore example, comprise any type or configuration of cabinetry or enclosure to at least partially house components of the vending machine 310. As described elsewhere herein, for example, the casing 312 may be constructed of steel, aluminum, plastic, rubber, other metals or composite materials, and/or any combinations thereof. In some embodiments, the casing 312 may be configured for the sale of various products or services such as a typical and/or modified version of a typical snack, beverage, dessert, meal, non-edible object, media, and/or any other vending machine 310. According to some embodiments, the inventory dispensing mechanism 318a-b may comprise various component such as the product storage mechanism 318a and/or the product hopper 318b). The product storage mechanism 318a may, for example, comprise a number of latches, levers, paddles, doors, spirals, and/or other product retention, detention, and/or dispensing mechanisms, as are known in the art.

According to some embodiments, a product selected and/or purchased by a customer may be released by the product storage mechanism 318a so that it falls into the product hopper 318b. The product hopper 318b may, according to some embodiments, comprise one or more doors, holes, and/or other means via which a customer may retrieve a dispensed product. The product hopper 318b may also or alternatively comprise one or more components to facilitate prevention of unauthorized product removal (e.g., from someone reaching up into the vending machine 310 via the product hopper 318b) and/or to facilitate the reduction of impact forces experienced by products dropping from the product storage mechanism 318b above.

In some embodiments, the payment processing mechanism 320 may comprise any practicable type of payment receiving, transmitting, and/or processing device that is or becomes known (such as those described elsewhere herein). The payment processing mechanism 320 may, for example, comprise a currency validator and/or input slot, such as shown in FIG. 3. According to some embodiments, the output device 324 may display various information associated with subscription offers and/or promotions and/or product or service sales to a customer. As shown in FIG. 3, for example, the output device 324 may comprise a display screen (and/or touch screen) that advertises the availability of subscriptions via the vending machine 310. The particular offer shown in FIG. 3, for example, allows a customer to pay five dollars ($5) to receive a subscription to ten (10) drink units (e.g., where ten (10) drink units sold separately and/or not pursuant to a subscription may cost more than five dollars ($5)). In accordance with some embodiments, one or more of the subscription products or product units may comprise a "mystery" product selected by the vending machine 310, such as to manage inventory and/or sales. Such "mystery" units or products may, according to some embodiments, be provided as part of and/or in addition to the subscription. Various mystery and mystery package embodiments are described in Applicant's co-pending U.S. application Ser. No. 11/282,525, entitled "SYSTEMS AND METHODS FOR VENDING PROMOTIONS" and filed on Nov. 18, 2005, the mystery product and mystery package concepts of which are hereby incorporated by reference herein.

L. Software Architecture

In some embodiments, a control system may execute instructions for managing the operation of a vending machine (such as the vending machines 110, 210, 310 of FIG. 1, FIG. 2, and FIG. 3, respectively), and in particular in accordance with various embodiments described herein. Such vending machine functions include, but are not limited to: (1) product pricing (e.g., displaying prices via an LED and/or changing such prices where appropriate), (2) processing vending transactions by (i) receiving customer selections via an input device (such as product and/or subscription selections), (ii) processing payment via a payment processing mechanism, (iii) actuating corresponding product dispensing mechanisms, (3) selecting subscription offers or promotion types and constructing subscription offer instances, (4) outputting subscription offers to customers via output devices (including display of graphics/content, such as game-themed content, on LCD and LED displays), (5) recording transaction information (inventory levels, acceptance rates for promotions, etc.), and/or (6) facilitating customer and/or third party subscription account management.

In some embodiments, machine components (e.g., machine hardware, including mechanical hardware such as input devices, output devices, product dispensing devices, and payment processing devices including coin acceptors, bill validators, card readers, and/or change dispensers) may be controlled by the control system through a standard RS-232 serial interface. In such embodiments, embedded Application Programming Interface (API) devices or modules may be used to enable software to actuate and/or control vending machine components via RS-232 connectivity. Such vending machine components may be operatively connected to the control system directly or indirectly, in any manner that is practicable. Alternatively, machine components may communicate with the control system through a USB standard (e.g., USB ports may allow "plug-and-play" installation of machine components).

Figure 4:
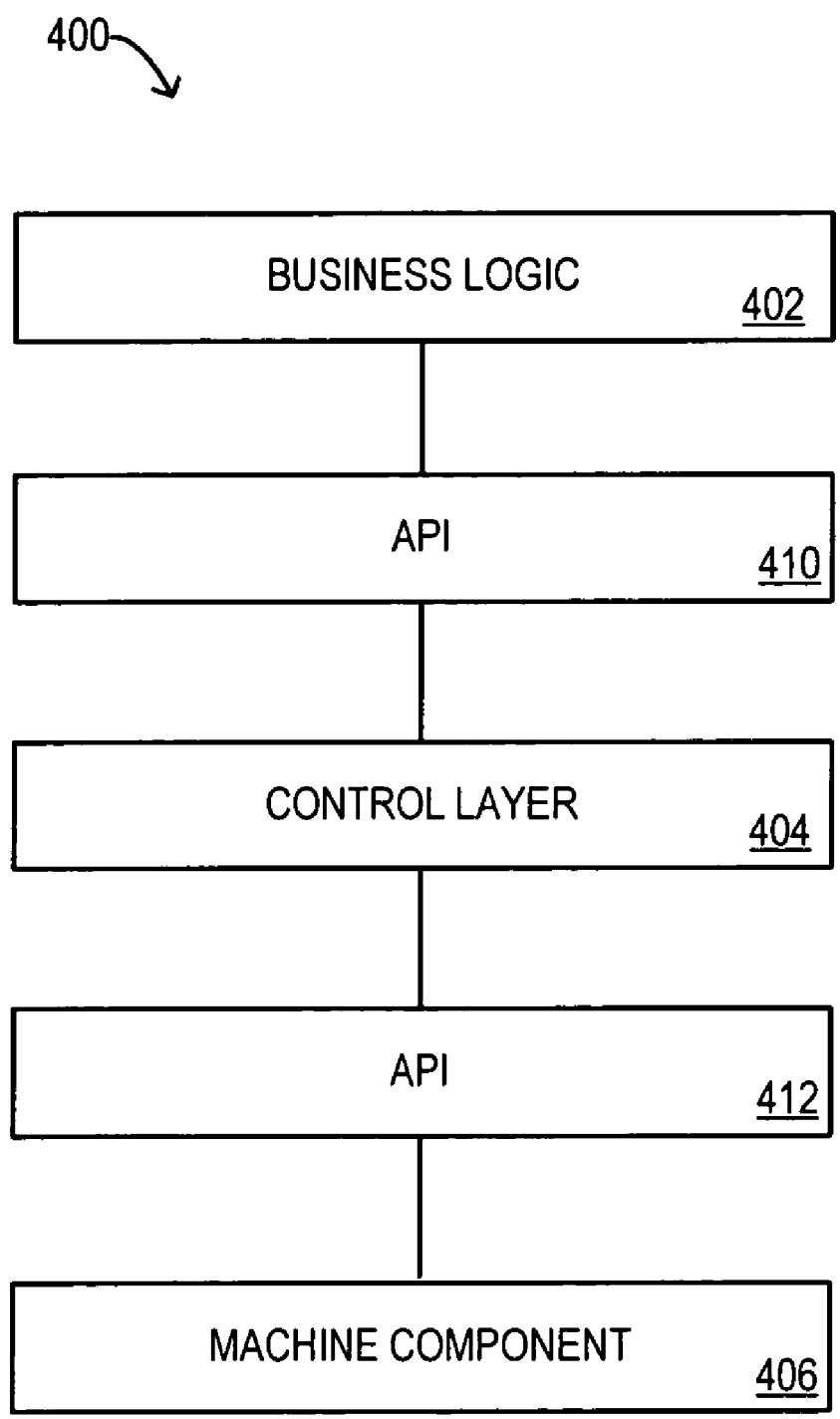
FIG. 4 is a block diagram of a system according to some embodiments.

Referring now to FIG. 4, a block diagram of a system 400 according to some embodiments, is shown. The system 400 may, for example, comprise and/or represent an exemplary portion of control software that may be utilized to implement some embodiments. The system 400 illustrates, for example, control software as being divided into three abstract components. Such division may provide a clear partition of tasks, which may be desirable so that any future modification and new programming can be applied without disrupting other components. The three abstract components illustrated include a Business Logic software component 402, a Control Layer software component 404, and an exemplary Machine Components software component 406. As stated earlier, more machine components may be employed in addition to the exemplary one illustrated herein.

The software components are each connected to one another via a respective API 410, 412. As is known in the art, an API 40, 412 may comprise a set of routines, protocols, and/or tools for building software applications. The Business Logic software component 402 may, according to some embodiments, be connected to the Control Layer software component 404 via an API 410. Similarly, the Control Layer software component 404 may be connected to the Machine Component software component 406 via another API 412.

The Business Logic software component 402 visually represents the portion of the software that selects mystery promotions or mystery promotion type instances and/or constructs mystery promotion instances, as discussed herein. Such a component may, for example, access a rules database and a product inventory database to perform such functions.

The Control Layer software component 404 visually represents the portion of the software which interfaces with at least one Machine Component software component 406, and thereby transmits commands to perform such functions as: (i) outputting subscription offer information via an output device (e.g., a machine component), (ii) dispensing products via a product dispensing mechanism (e.g., a machine component), and/or (iii) dispensing change due to a customer via a payment processing mechanism, which may include a change dispenser and a currency storage apparatus (e.g., several machine components).

The Machine Component software component 406 generally represents software or machine hardware, including mechanical hardware such as input devices, output devices, inventory dispensing devices, and payment processing devices including coin acceptors, bill validators, card readers, change dispensers, etc.

Figure 5A:
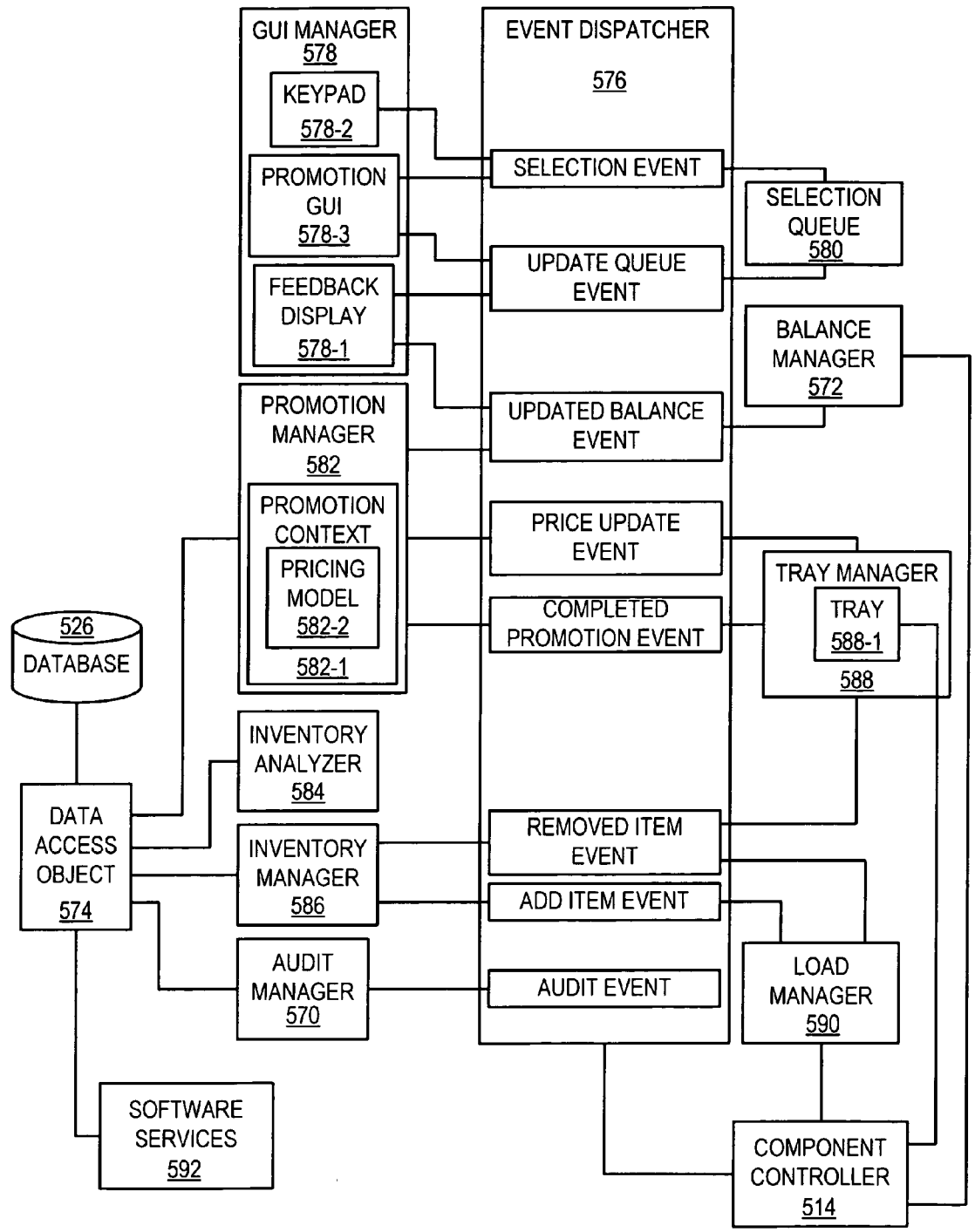
FIG. 5A and FIG. 5B are schematic block diagrams of exemplary configurations of software architecture according to some embodiments.

Referring now to FIG. 5A, a schematic block diagram of an exemplary configuration of software architecture 500 according to some embodiments is shown. It should be noted, however, that many architectural configurations are possible to carry out the inventive processes described herein. The software architecture 500 is a model of a software application for use in execution of embodiments described herein, designed using Unified Modeling Language™ (UML). The model comprises various software components and illustrates how the various software components may interact with one another.

According to some embodiments, the software architecture 500 may comprise a component controller 514 and/or a database 526. The component controller 514 may manage (and mask the implementation of) vending machine components. Examples of vending machine components include: input devices, output devices, coin acceptors, bill validators, card readers, change dispensers, product dispensing mechanisms, and bar code readers. In some embodiments, the component controller 514 may be similar in configuration and/or functionality to the processor 214 described in conjunction with FIG. 2. The database 526 may comprise a persistence store (e.g., MySQL, file based, and/or Oracle®). The database 526 may, for example, be similar in configuration and/or functionality to the data storage device 226 described in conjunction with FIG. 2.

In some embodiments, an audit manager 570 listens for audit events fired by other management components and acts on them by persisting meaningful state about the event to audit data structures. This function journals all significant events, transactions, and other meaningful system operations so that they can be used in subsequent analysis and reporting functions. The definition of "meaningful state" can potentially be specified through configuration management. The event/configuration driven approach provides flexibility if auditing/reporting requirements change.

According to some embodiments, a balance manager 572 represents the current monetary balance in the machine. It interacts with the component controller 514 and responds to money insertion by incrementing its balance value. It fires UpdatedBalance events whenever the balance changes. It listens for DrainBalance events and executes processes of the component controller 514 that return funds to the user.

In some embodiments, a data access object 574 may be the layer of abstraction that is responsible for persisting domain objects such as inventory objects and audit data. The data access object 574 may, for example, be in communication with the database 526 and/or one or more other data stores (not shown).

According to some embodiments, an event dispatcher 576 acts as a proxy broker for events so that components do not need to explicitly listen to each other (e.g., have undue knowledge of each other by reference). Some examples of events that may be managed by this component, and that are shown in FIG. 5A, include: a SelectionEvent event, an UpdatedQueueEvent event, an UpdatedBalanceEvent event, a TrayLEDUpdateEvent event, a CompletedPromotionEvent event, a DispensedItemEvent event, an AuditEvent event, and/or an EnterOperatorModeEvent event.

In some embodiments, a Graphical User Interface (GUI) manager 578 is a container for all GUI components and/or sub-components and defines their layout in reference to one another. The GUI manager 578 will also listen for events from the event dispatcher 576. Swing events may be handled by the individual sub-components 578-1, 578-2, 578-3 of the GUI manager 578. According to some embodiments, the sub-components may comprise a feedback display 578-1, a keypad 578-2, and/or a promotion GUI 578-3. The feedback display 578-1 is a sub-component that manages feedback from the keypad 578-2, instructions, and error messages.

The keypad 578-2 is a sub-component that represents the keypad data entry interface (rendered as Swing graphical objects on a touch screen LCD). It forces selection events to be fired that are relevant to the feedback display 578-1 and a selection queue 580.

The promotion GUI 578-3 is a sub-component that represents promotion-related user interface rendering such as graphical selection menus, banners, animation, etc. The promotion GUI 578-2 fires events that can effect the selection queue 580 and also listens for events from a promotion manager 582. The selection queue 580 is a container for cumulative product selections made during the course of user interaction with a subscription offer and/or promotion. The promotion manager 582 manages all of the subscription offer and/or promotion-related business rules in play in a vending machine. It can manage multiple subscription offer and/or promotion contexts simultaneously and executes all rules related to validation, execution, and workflow related to these subscription offer or promotion contexts. This component implements a subscription offer or promotion context factory object that encapsulates business rule logic related to subscription offer and/or promotion eligibility, selection, pricing and composition.

In some embodiments, the promotion manager 582 may comprise, define, and/or manage one or more components such as a promotion context 582-1 and/or a pricing model 582-2. The promotion context 582-1 may comprise all of the state and workflow rules required by the promotion manager 582 to execute a given subscription offer and/or promotion. The pricing model 582-2 may, according to some embodiments, be a sub-component of the promotion context 582-1. The pricing model 582-2 may, for example, contain all the product pricing data needed to execute the subscription offer and/or promotion described by that context.

According to some embodiments, an inventory analyzer 584 performs derivation and aggregation computations on inventory state and audit data. The results of these computations are persisted for use by other components (e.g., the promotion manager 582). The computation functions can be initiated on demand or by a scheduler service when the system is dormant.

In some embodiments, an inventory manager 586 maintains the current state of the machine's inventory. It listens for events that will ask it to update the inventory that was fired by components such as a tray manager 588 and a load manager 590. The tray manager 588 is the container and manager of composite tray components. It is responsible for initiating and coordinating multiple-product dispense operations. According to some embodiments, the tray manager 588 may be a module and/or device that operates and/or manages a tray 588-1. The tray 588-1 may, for example, be a sub-component of the tray manager 588 and/or may represents a product dispensing apparatus and its composite rows/slots in the vending machine. Its responsibilities include dispensing products and displaying LED data through the component controller 514.

According to some embodiments, a load manager 590 manages the inventory load processes. It may interact with a bar code scanner via the component controller 514, such as when an operator restocks the machine's inventory. The load manager 590 may also or alternatively fire inventory change events. Examples of load processors and/or devices are described in commonly owned and co-pending U.S. patent application Ser. No. 10/951,296 entitled "METHODS AND APPARATUS FOR DEFINING AND UTILIZING PRODUCT LOCATION IN A VENDING MACHINE" and filed on Sep. 27, 2004, the load management concepts and descriptions of which are incorporated by reference herein.

In some embodiments, a software service 592 may provide miscellaneous application services, including (but not limited to): subscription management, configuration management, connection pooling, diagnostic logging, and/or scheduling services.

Figure 5B:
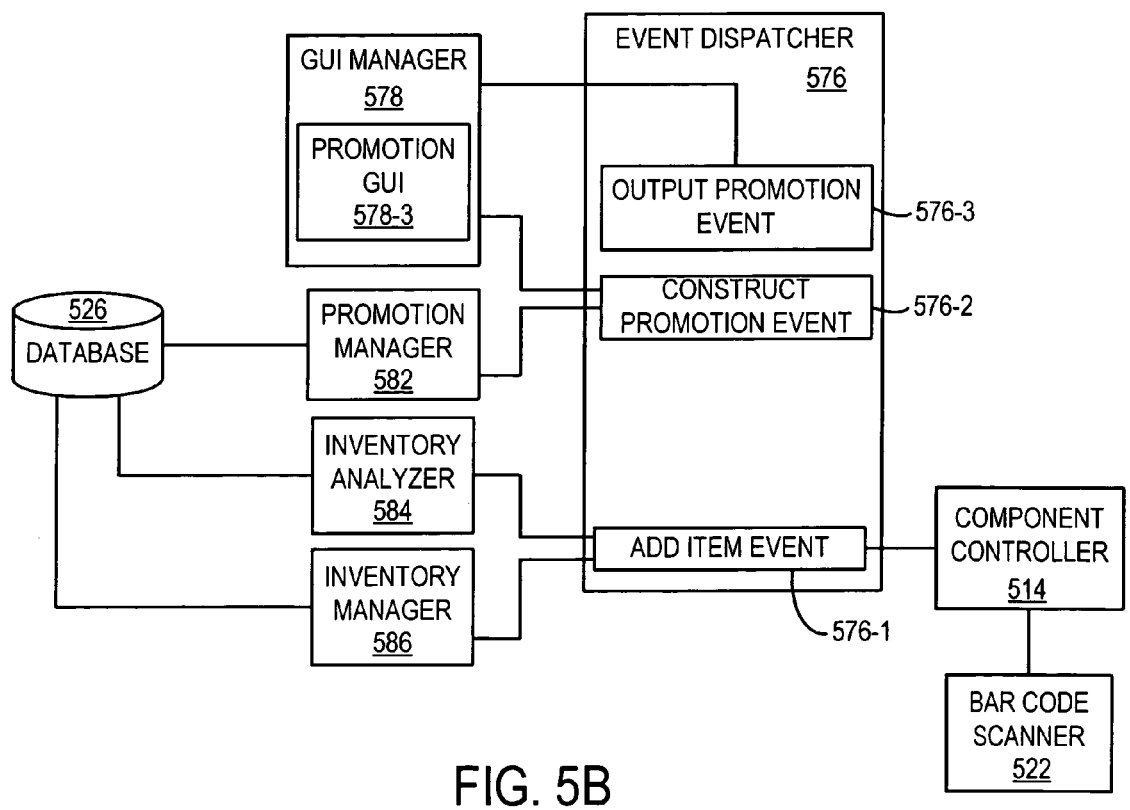

Referring now to FIG. 5B, a schematic block diagram of another exemplary configuration of the software architecture 500 according to some embodiments is shown. The configuration of the software architecture 500 shown in FIG. 5B is a model of a software application for use in some embodiments, designed using UML. The software architecture 500 may comprise various software components and one or more hardware components. For example, the software architecture 500 may comprise a component controller 514, a barcode scanner 522, a database 526, an event dispatcher 576, a GUI manager 578, a promotion manager 582, an inventory analyzer 584, and/or an inventory manager 586. According to some embodiments, the components 514, 520, 526, 576, 578, 582, 584, 586 of the software architecture 500 may be similar to the similarly named and/or numbered components described in conjunction with any of FIG. 1 and/or FIG. 5A herein.

In some embodiments, the event dispatcher 576 may include and/or define three (or more) exemplary events. The events may comprise, for example, an AddItem event 576-1, a ConstructPromotion event 576-2, and/or an OutputPromotion event 576-3. According to some embodiments, some or all of the events 576-1, 576-2, 576-3 may be triggered by an addition of a product to a vending machine.

As shown in FIG. 5B, the component controller 514 may be in communication with a particular vending machine component such as the bar code scanner 522. In some embodiments, the bar code scanner 522 may be similar in configuration and/or functionality to the input device 122 described in conjunction with FIG. 1. The bar code scanner 522 may, for example, be a particular type of input device 122 (i.e., one that is operable to scan barcodes). In some embodiments, the component controller 514 may be in communication with fewer or more components (such as input devices 122 and/or output devices 124) than are shown in FIG. 5B.

In some embodiments, when an operator of the vending machine adds a product to the inventory of the vending machine, the operator may scan a bar code of the product (e.g., using the bar code scanner 522). The component controller 514 communicates the input of the bar code scanner 522 to the event dispatcher 576, which recognizes the input of the bar code scanner 522 as an AddItem event 576-1. As described above, the event dispatcher 576 may act as a proxy broker for events, alleviating the need for components to listen for events from other components. Thus, the event dispatcher 576 may communicate the AddItem event 576-1 to the inventory manager 586, without the need for inventory manager 582 to listen for events from the component controller 514. The inventory manager 582, in turn, may cause a record of the added item and/or of the AddItem event 576-1 to be stored in the database 526 (e.g., via the data access object 574 from FIG. 5A, which is not illustrated in FIG. 5B for purposes of simplicity).

The inventory analyzer 584, in turn, may analyze the current inventory (e.g., based on the addition of the product or based on another event, such as the occurrence of a predetermined time) and store an indication of a need for a subscription offer and/or promotion for two or more products based on the current state of the inventory. The indication may be stored in database 526. The promotion manager 582 may, according to some embodiments, access the database 526 and determine the need for a subscription offer and/or promotion. The promotion manager 582 may then, for example, construct a subscription offer and/or promotion, based on the need. The event dispatcher 576 may determine the occurrence of the ConstructPromotion event 576-2 and communicate the occurrence of this event to the GUI manager 578. The GUI manager 578 may, in turn, cause the subscription offer to be displayed via a promotion GUI 578-1 sub-component. The promotion GUI sub-component 578-1 and/or the GUI manager 578 may then, for example, construct the OutputPromotion event 576-3. The event dispatcher 576 may, according to some embodiments, detect the OutputPromotion event 576-3 and communicate the occurrence of this event to another component (e.g., promotion manager 582) and thus, indirectly, cause a record of the output of the subscription offer to be stored in the database 526.

IV. Processes

Various methods for improving the establishment and management of vending machine customer subscriptions are provided. Generally, according to some embodiments, a subscription may be processed by a vending machine by (i) determining and outputting a subscription offer, (ii) registering a subscription and/or establishing account parameters, and (iii) processing the redemption of one or more subscription items.

Figure 6:
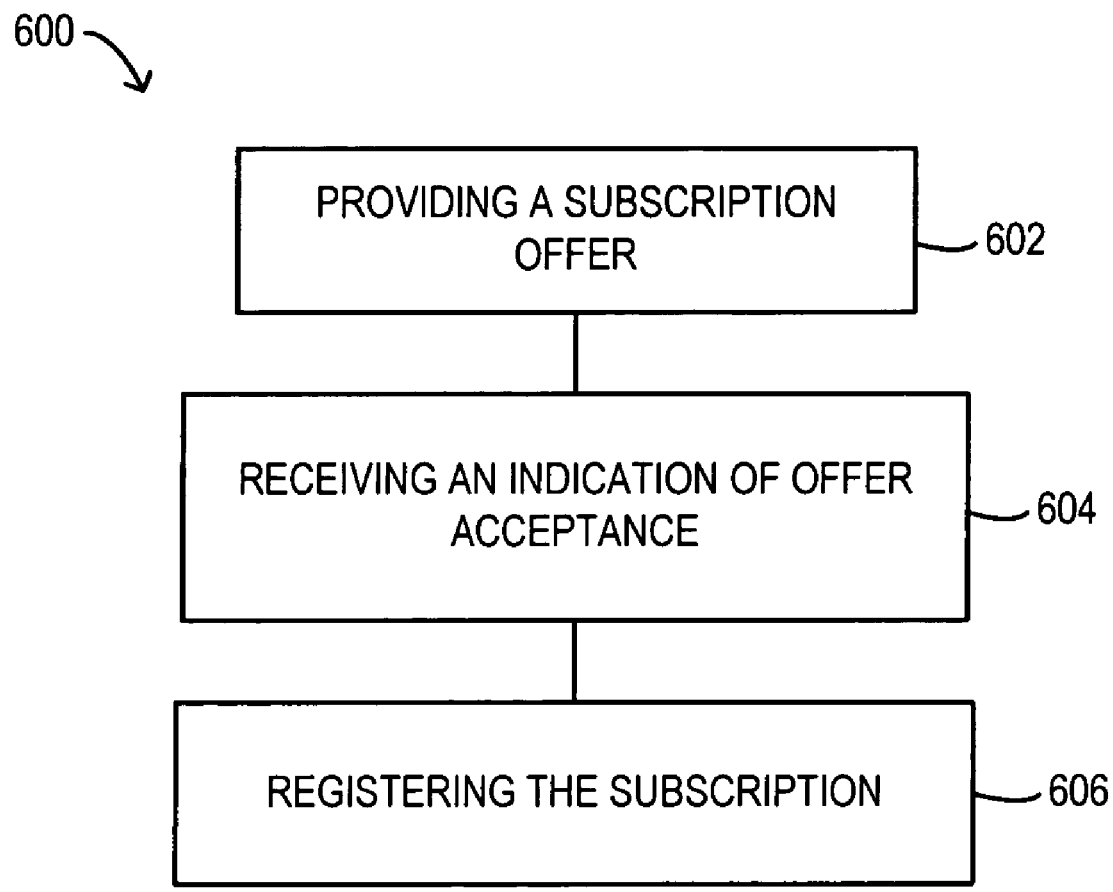
FIG. 6 is a flow diagram of a method according to some embodiments.

Turning to FIG. 6, for example, a flow diagram of a method 600 according to some embodiments is shown. The method 600 may comprise, for example, a method for providing vending machine subscriptions to customers and/or for allowing and/or facilitating customer and/or third party management of such accounts. In some embodiments, the method 600 (or portions thereof), and all other processes described herein unless expressly specified otherwise, may be performed, for example, by a vending machine 110, 210, 310, a peripheral device, a controller, a peripheral device controller, a user device, another computing device, and/or any combination thereof. Additionally, while some of the steps of a process may be performed by a first device, other steps may be performed by another device and/or a combination of devices. Further, the method 600, and all other processes described herein unless expressly specified otherwise, may include steps in addition to those expressly depicted in the figures or described in the specification without departing from the spirit and scope of some embodiments. Similarly, the steps of the method 600 and any other process described herein, unless expressly specified otherwise, may be performed in an order other than depicted in the figures or described in the specification, as is practicable and/or appropriate.

In some embodiments, the method 600 may begin at 602, by providing an offer for a subscription to products offered for sale by a vending machine. The offer may be provided in many ways. Offers may be displayed via a vending machine, for example, and/or may be published, broadcast, mailed or e-mailed, and/or otherwise disseminated to one or more customers and/or third parties. According to some embodiments, customers proximate to a vending machine may be provided with subscription offers (via graphic, sounds, etc.). In some embodiments, such customers (and/or devices associated therewith) may be detected, and the offer may be provided in response to the detecting. According to some embodiments, offers may be provided based on customer interaction with the vending machine. Funds provided to the vending machine by the customer may, for example, be compared to one or more predefined thresholds to determine if the customer qualifies for a subscription offer (e.g., has input enough money to purchase an available subscription).

In conjunction with the processes described herein, an ongoing example is illustrated by FIG. 7A, FIG. 7B, FIG. 7C, FIG. 7D, and FIG. 7E. These figures generally illustrate an exemplary vending machine display and/or touch screen that may be utilized to provide subscription offers, cause products to be vended from the machine, provide a game-style interface to customers, and/or to facilitate management of customer accounts. Where appropriate, reference to these figures will be made herein.

Figure 7A:
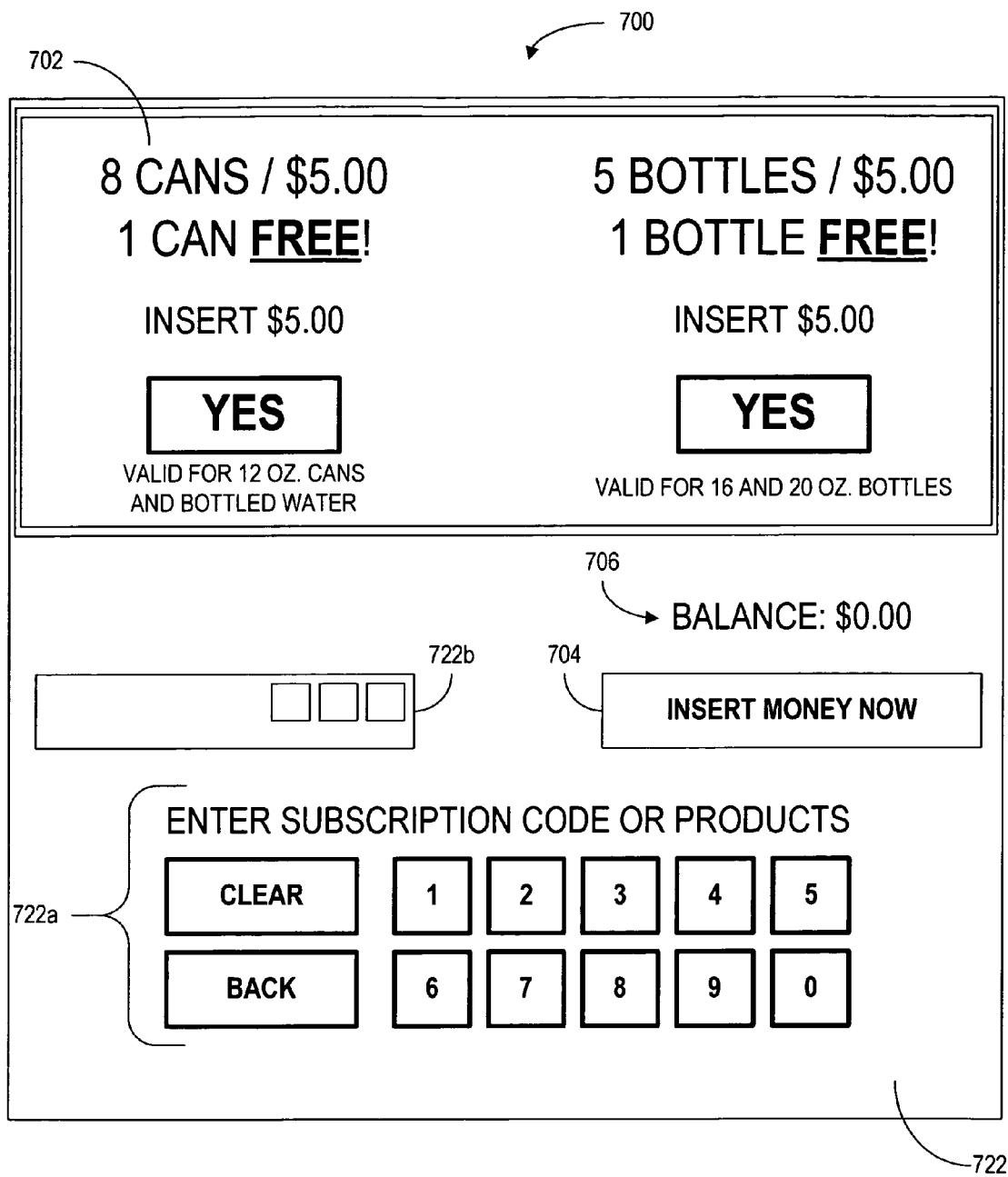
FIG. 7A, FIG. 7B, FIG. 7C, FIG. 7D, and FIG. 7E are block diagrams of an exemplary display according to some embodiments.

FIG. 7A, for example, is a block diagram of an exemplary vending machine display 700 according to some embodiments. The display 700 may generally comprise an offer area 702, a message area 704, a balance indicator 706, and/or an input area 722. As shown, the offer area 702 may display one or more available subscription offers to customers, while the message area 704 may provide dynamically updated instructions and/or messages directed to customers. The balance indicator 706 may provide an indication of any balance that the customer may have with the vending machine (e.g., in terms of monetary amounts, number of product units, etc.). The input area 722 may comprise any practicable input mechanism and/or device, such as a keypad 722a and/or a fingerprint scanner 722b. In some embodiments, such as in the case that the display 700 comprises a touch screen display, any of the input areas 722a-b may comprise one or more portions of the display 700 (e.g., one or more dedicated portions, dynamically relocated portions, etc.).

According to some embodiments, the subscription offer (e.g., displayed via the offer area 702 of FIG. 7A) may be determined by the vending machine and/or associated devices (e.g., a vending server and/or peripheral device). In one or more embodiments, a vending machine control system may determine subscription offers in one or more of a plurality of ways. In one embodiment, as described in Applicant's U.S. Pat. Nos. 6,298,972, 6,085,888, and 5,988,346 (the subscription embodiments of each of which are hereby incorporated by reference herein) subscription terms associated with offers may be predefined and stored in a database accessible to the control system. In other embodiments, as described herein, subscription terms may be constructed dynamically according to stored rules that consider, e.g., the supply of and demand for vending machine inventory.

Subscriptions may include a term defining particular products (e.g., Coke® soda) or categories of products. Categories of products may include, for example, (i) product types (e.g., soda, which includes Coke®, Sprite® and A&W® Root Beer soda), (ii) products that have a price with certain characteristics (e.g., products priced at fifty cents ($0.50), products priced between fifty cents ($0.50) and seventy-five cents ($0.75)), and/or (iii) products within a certain "inventory group" (e.g., drinks which are indicated by an illuminated, colored LED adjacent the drink).

The one or more products included in a category (e.g., an "inventory group") may change over time, or remain unchanged. The customer may, but need not, be informed that the products that a category includes are subject to change. Therefore, the customer (who can redeem products pursuant to a subscription including one or more product categories) can redeem products which may be unknown to the customer, and which may remain unknown to the customer. For example, the products in a first product category (e.g., a "red" product category) might include different items at each of the following times (all of which are, in this example, at different times): (a) when a subscription is offered to a customer, (b) when that customer accepts the offer, (c) when the customer redeems a first product of the subscription, (d) when the customer redeems a second or subsequent product of the subscription.

Revenue and profit management functionality may be employed in various embodiments, such as embodiments involving subscriptions for categories of products. For example, the methodology disclosed in commonly-owned, co-pending (i) U.S. patent application Ser. Nos. 08/947,798, entitled "METHOD AND APPARATUS FOR DYNAMICALLY MANAGING VENDING MACHINE INVENTORY PRICES"; (ii) U.S. patent application Ser. No. 10/968, 282, filed Oct. 18, 2004, entitled "PRODUCTS AND PROCESSES FOR PROMOTING MULTIPLE TRANSACTIONS AT A RETAIL ESTABLISHMENT"; (iii) U.S. patent application Ser. No. 10/855,247, filed May 27, 2004, entitled "METHOD AND APPARATUS FOR MANAGING VENDING MACHINE OFFERS"; and (iv) U.S. patent application Ser. No. 10/902,397, entitled "PRODUCTS AND PROCESSES FOR VENDING A PLURALITY OF PRODUCTS", this methodology being hereby incorporated by reference herein, may be employed so that, during a redemption transaction, the products which are available for redemption (e.g., because they are included in a "product category") may be determined based on the values, or changes in values, of supply and demand.

In some embodiments, a subscription may be defined by the ability to redeem (i) a predetermined number, (ii) of products of a certain type (e.g., drinks), and/or (iii) which products each have a certain price or a price within a certain range (e.g., fifty cents ($0.50), less than seventy-five cents ($0.75)). For example, if a subscription is defined by the ability to redeem a number of drinks which have a price of fifty cents ($0.50), price-management functionality may be employed to determine which products may be redeemed pursuant to that subscription (i.e., determine products which have prices that are, or have decreased to, fifty cents ($0.50) or less, and such products would accordingly be eligible for redemption). Or, if a customer subscribes to items in the "red" inventory group, "inventory grouping" functionality described in U.S. patent application Ser. No. 10/902,397 may be used to determine (e.g., based on criteria such as profitably) which items should be allocated to the red inventory group, and thus redeemable by the customer during a redemption transaction. Subscriptions to inventory groups could be marketed to customers as "value" or "club price" subscriptions to clearance items.

Terms which a subscription includes may be defined, generated, and/or selected based on one or more of various criteria, such as the characteristics of the customer, the actions of the customer, the previous purchases of the customer, the redemption patterns of the customer, products that the customer has purchased or attempted to purchase, products that the customer has redeemed, frequency of redemption of products, and/or information provided by third parties (e.g., account parameters; complaints; general nutritional requirements for school-age account holders).

A customer may select a subscription or otherwise request and/or receive a subscription, either with or without having received or responded to an offer (e.g., from the vending machine) to receive a subscription. For example, a customer may select or activate a subscription that has terms equivalent or similar to terms of a subscription that the customer previously held (e.g., "renewing" an old subscription). Similarly, the customer may select or activate a subscription that has terms equivalent or similar to terms of a subscription that the customer currently holds, but is expiring (e.g., "renewing" an expiring subscription). Further, a customer may select or activate a subscription that has account parameters set by a third party, such as a parent.

It can be advantageous to output subscription offers when a subscription is close to expiration (e.g., when five (5) days remain before a subscription expires and is no longer usable without renewal or recharging). It can further be advantageous to output a series of subscription warnings and/or offers (e.g., through email, phone calls using registered contact information) to the customer when the customer's subscription is close to expiration.

Alternatively, an offer to receive a subscription may be output to the customer, who may accept or reject the offer. In one embodiment, as disclosed in Applicant's U.S. Pat. Nos. 6,298,972, 6,085,888, and 5,988,346, predefined subscription offers are output to all customers routinely (e.g., upon detecting that a customer arrives at a vending machine, upon a customer providing payment to the vending machine). However, in another embodiment, subscription offers may be "triggered" upon the occurrence of certain conditions (and therefore one or more subscription offers are provided upon the occurrence of such conditions). That is, stored rules may provide that certain offers are to be output to customers upon the occurrence of certain conditions detectable by the vending machine control system. In Applicant's co-pending U.S. patent application Ser. No. 10/855,247, Applicants disclosed provided vending machine subscription offers in response to a customer's selection of a particular product. Further, Applicants disclosed an embodiment therein in which customers who have already deposited the amount necessary for the purchase of a single unit are offered a subscription for an amount equal to his or her change due. For example, if the customer deposits five dollars ($5.00) and selects an item priced at fifty cents ($0.50) per unit, the machine may offer twelve (12) units redeemable over the span of several days in exchange for the four dollars and fifty cents ($4.50) that otherwise would be returned to the customer. Alternatively, customers who have already deposited the amount necessary for the purchase of a single unit may be prompted (e.g., through text displayed on an output device of the vending machine) to deposit additional currency in order to accept a subscription offer.

Subscription offers may also be triggered by a customer action in other ways. In some embodiments, one or more subscription offers may be triggered upon the deposit of (i) a particular amount of currency, (ii) a particular denomination of currency, and/or (iii) a particular type of payment (e.g., currency, coins, paper bills, credit card, debit card, payment code, coupon, voucher) that is used or to be used.

Figure 7B:
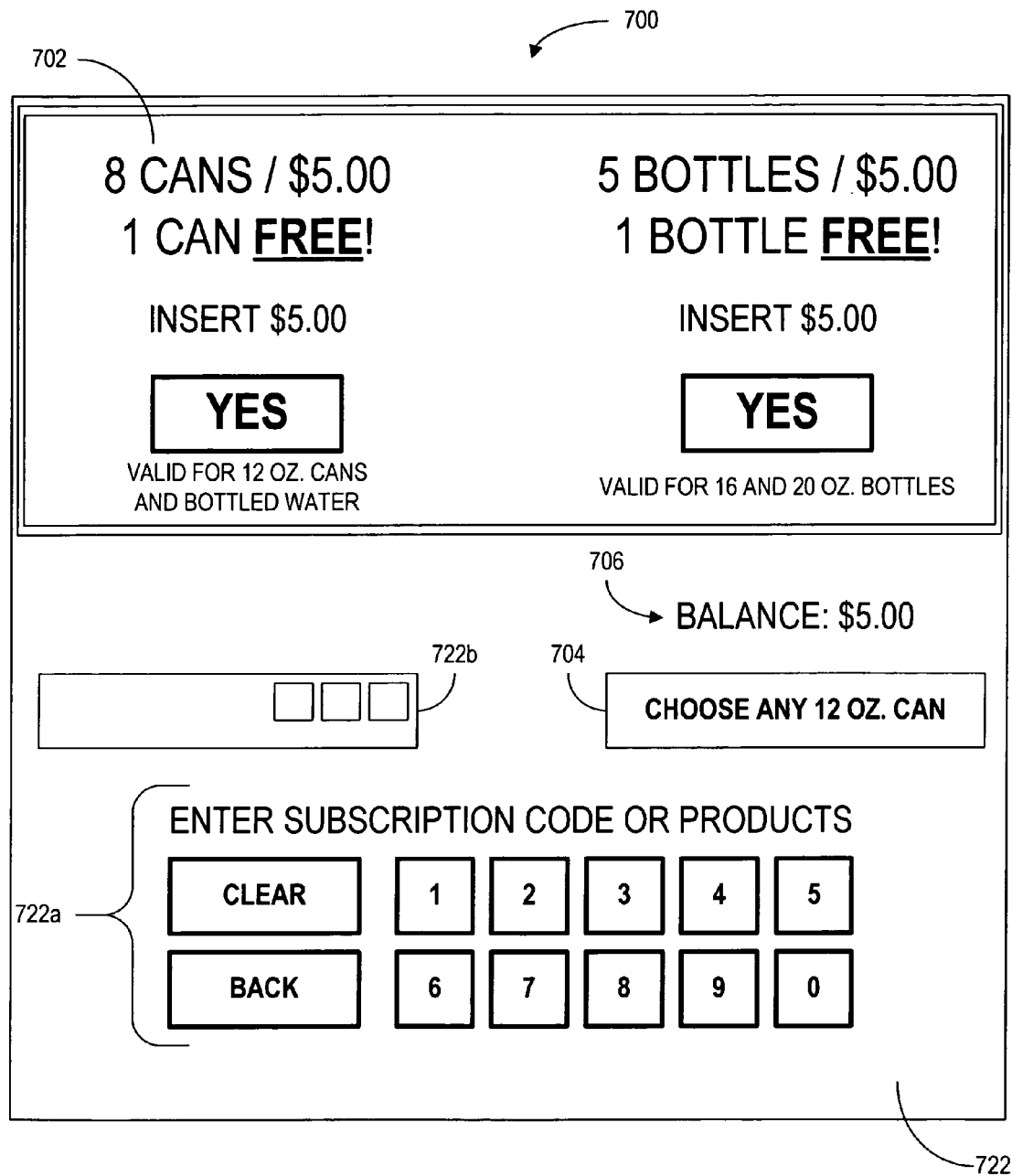

The terms of the offered subscription can depend on, e.g., the amount of currency deposited. For example, as illustrated by FIG. 7B pursuant to the ongoing example, if a customer deposits a five dollar ($5) bill into the vending machine's bill validator (indicated by the balance indicator 706 of FIG. 7B), the vending machine control system may be programmed (e.g., through stored rules) to output one or more (predefined or dynamically-configured) subscription offers (e.g., the offers presented via the offer area 702 of FIG. 7A and/or FIG. 7B). "Table 1" below illustrates an example database defining rules for the predefined subscription offers which are output based on particular deposit amounts being received.

TABLE 1

| Deposit Amount | Subscription Offer Terms and Conditions | Subscription Offer Content |
| --- | --- | --- |
| $5 | Subscription to 6 cans of Sprite ® soda | "Get a free can of Sprite ® by subscribing to 6 cans of Sprite for your deposited $5! Just press ACCEPT button on touch screen now and receive soda card from printer." |

TABLE 1-continued

| Deposit Amount | Subscription Offer Terms and Conditions | Subscription Offer Content |
|---|---|---|
| $10 | Subscription to 12 cans of Sprite ® soda | "Get two free cans of Sprite! Subscribe to 12 cans of Sprite for your deposited $10. Just press ACCEPT button on touch screen now." |
| $20 | Subscription to 25 cans of Sprite ® soda | "Save 20%! Subscribe to 25 cans for your $20. Just press ACCEPT button on touch screen." |

For each of the three (3) example subscription offers described in "Table 1", there is a corresponding unit price per item (five dollars ($5) per six (6) cans=eighty-three cents ($0.83) per can; ten dollars ($10) per twelve (12) cans=eighty-three cents ($0.83) per can; twenty dollars ($20) per twenty-five (25) cans=eighty cents ($0.80) per can). Assuming in this example that a can of Sprite® soda has a retail price of one dollar ($1) per can, this retail price is larger than any of unit price per item for any of the subscriptions in "Table 1". Thus, a customer who wants to acquire the respective number of cans will save money (when compared to the per can retail price) by purchasing any of the three subscription offers described in "Table 1".

Some terms of a subscription may become available to current or previous owners of subscriptions (e.g., upon renewal of a subscription). For example, the unit price per customer applying for and being approved for a Visa® credit card from a particular bank.

In some embodiments, the terms of a subscription and/or the conditions under which an offer for a subscription are provided may be determined according to stored rules, such as stored rules that consider supply and/or demand for various products provided by a vending machine. For example, subscription offers may be dynamically constructed (e.g., using relational databases and/or evaluating various data as described by Applicants) by identifying and selecting a product having particular characteristics. "Table 2" below illustrates an exemplary subscription offer rules database for use in such an embodiment. Each of the rules shown in "Table 2" indicates (among other things) a method for selecting a product to offer, such as "the canned soda product that has the greatest ratio of actual velocity to ideal velocity".

TABLE 2

| Time until end of fill period | Subscription Offer Construction Rules | Subscription Offer Content |
|---|---|---|
| 3 days until end of fill period | Output offer for subscription to the canned soda product that has the greatest ratio of actual velocity to ideal velocity. Terms: 8 sodas for $5. | "Subscribe to 8 cans of [soda X] for $5. Press ACCEPT button on touch screen now!" |
| 5 days until end of fill period | Output offer for subscription to the soda product with the greatest profit margin. Terms: 12 sodas for $10. | "Subscribe to 12 cans of [soda Y] for $10. Press ACCEPT button on touch screen now!" |
| 10 days until end of fill period | Output offer for subscription to the soda product with the most units in inventory. Terms: 25 sodas for $20. | "Subscribe to 25 cans of [soda Z] for $20. Press ACCEPT button on touch screen now!" | item may decrease with successive purchases of a five-dollar ($5) subscription (e.g., first subscription provides six (6) units, the next seven (7) units, and subsequent subscriptions provide eight (8) units for the same subscription holder). In one embodiment, failing to renew a subscription in a timely manner can cause the loss of a significant benefit—smaller unit prices per item.

In an embodiment, the terms of a subscription may define that the money paid for the subscription is fully or partially paid for by a third party instead of the customer. Such an arrangement may be in exchange for the customer agreeing to transact with the third party in some way. For example, a subscription for six (6) cans of soda per week without payment could be offered to a customer in exchange for the Thus, by referencing such rules (e.g., which may be stored in a local database, which may be remotely accessible via a server) and an inventory database (or other structure) which records or tracks, for each product, such data as the product name/identifier, category (e.g., "soda"), price, cost, target sales rate, actual sales rate, and the like, the vending machine control system can determine, at an appropriate time in the fill period, how to populate the appropriate subscription offer content, thereby dynamically constructing subscription offers.

In a dynamic offer construction embodiment, terms of a subscription offer may be dynamically constructed according to, for example, the actual and/or ideal sales rate of a particular product. For example, based on a product's actual sales rate, the vending machine control system may determine that, at the current retail price (which of course affects the actual sales rate), the product is not likely to equal or exceed its ideal sales rate. Therefore, the vending machine control system may determine that, as a result, the vending machine will likely have units of the product remaining at the end of the fill period, absent a promotion or other mechanism which increases sales volume for the product. Accordingly, the control system may dynamically construct subscription offer terms for the product, which are designed to clear the inventory of the product by the end of the fill period by, e.g., spurring increased sales volume of the product.

For example, assuming a product was originally stocked with ten (10) units at the beginning of a ten (10) day fill period, the product's ideal sales rate would be one (1) unit per day. Assuming further that the retail price is set at one dollar ($1.00), and that the actual sales rate is half a can per day (0.5/day), it may be determined (using revenue management techniques, as are known) that the price per unit should be set to fifty cents ($0.50) in order to sufficiently stimulate demand so that supply is depleted by the end of the fill period. Thus, assuming there are six (6) units remaining in inventory, the control system may construct a subscription offer for six (6) units at three dollars ($3), reflecting a price savings of fifty cents per unit ($0.50/unit).

Such an embodiment may be desirable as it allows vending machine operators to deeply discount inventory while guaranteeing a sufficiently offsetting sales volume through the subscription offer. That is, such subscription offers are superior to simply discounting per unit retail prices because customers are required to pre-purchase enough units to justify the discount.

In further embodiments, construction of such dynamically-determined subscription terms (e.g., subscription prices, quantities, products) might be based on (i) the expected demand that results from a particular subscription or set of subscriptions (i.e., by acknowledging that "subscription" offers may have different demand characteristics than per unit sales at retail prices), and/or (ii) the expected redemption rate for items in such subscriptions.

In yet another dynamic offer construction embodiment, subscription offers are generated according to overall patterns in sales occurring via the vending machine. For example, if sales volume at a particular machine is below a certain threshold (e.g., two transactions per hour) during one or more particular period of times (e.g., "off peak" times, such as between the hours of 7:00 PM and 7:00 AM each day), then subscription terms may be defined in which redemption of subscription items is only be permitted during such off-peak times (or during other periods, as desirable). Thus, the subscription includes a term that defines a predetermined period of time for redemption that is a time of otherwise low volume sales.

Further, in one such embodiment, vending machine subscription offers with off-peak redemption conditions may be output if the vending machine determines, via a motion detector or other sensing device, that there are many unsatisfied customers (e.g., detecting that the ratio of people in the vicinity of the vending machine during a certain period of time to the number of people transacting within the period of time surpasses a certain threshold, indicating that several potential customers are not getting served as a result of high demand and long lines). Thus, subscription offers with off-peak redemption conditions can help to balance the overall demand for vending machine products throughout the fill period.

Many other embodiments with respect to subscription terms are contemplated. In various embodiments, subscription activity periods may begin and/or expire based on fill periods (restock dates). Further, in some embodiments, subscription terms may be customizable. For example, customers may input a request to purchase a subscription to a certain quantity of a product or products. The vending machine control system may then calculate a price and/or terms for the requested subscription based on revenue and profit management considerations (e.g., current sales rates, ideal sales rates). For example, if the requested items are in high demand and short supply, the vending machine control system may determine that the subscription price should be set at, e.g., a two percent (2%) discount relative to the subscription items' retail prices. Additionally or alternatively, the vending machine control system may output subscription terms that account for the high demand nature of the requested products by, for example, requiring the customer to accept at least one out-of-stock event during the subscription period.

The terms of a subscription and/or the conditions under which an offer for a subscription are provided may be defined with respect to a predetermined amount of expenditures, such as a predetermined dollar amount that may be spent on promoting particular products. For example, a one million dollar ($1,000,000) budget may be allocated to funding discounts on a particular product across all vending machines for an estimated period of time.

The terms of a subscription and/or the conditions under which an offer for a subscription are provided may be determined by a third person, such as a parent, a teacher, a principal, a commercial sponsor, an employer, an insurer, a regulator, and/or an operator (e.g., a supervisor responsible for managing vending machines in a predetermined area).

In some embodiments, a subscription may include terms such that a customer can redeem one or more of at least two types of product. For example, a customer may subscribe to a "package" which permits the customer to redeem five (5) beverages and five (5) snacks.

In some embodiments, a subscription may include terms such that a customer can redeem subscription items from more than one vending machine. For example, a subscribing customer may receive a first unit from a first machine using a subscription code, and a second unit from a second machine using the same subscription code. Thus, for example, a customer may redeem one item from a snack machine and one item from a beverage machine.

A subscription may define further types of terms regarding redemption of products. For example, the subscription may define the number of products per transaction that must be redeemed. In one embodiment, for every redemption transaction pursuant to a subscription, a customer must redeem two (2) items (e.g., the customer must select a product from a "red" category and a product from a "green" category).

According to one or more embodiments, the terms of a subscription may be determined, in whole or part, based on a sweepstakes-style promotion. For example, in one embodiment, a sweepstakes promotion may provide that a randomly selected customer may receive a subscription for one thousand (1000) units of product; another sweepstakes promotion may provide that a randomly selected customer may receive a subscription good for as many units of a certain product as the customer can redeem (e.g., consume) within a certain period of time (e.g., one (1) year).

In one sweepstakes-style promotion (which may be referred to as a "progressive jackpot" embodiment), the number of units that a customer may win may be based on the total number of customers who purchase products from one or more vending machines within a certain period of time. For example, a running total may be maintained throughout the course of the promotion, where the running total is incremented (e.g., by one (1); by three (3)) after each transaction (e.g., after each purchase of a product, each purchase of a subscription, each redemption of a subscription item, etc). Randomly or pseudo-randomly, during the course of the promotion or thereafter, a customer may be selected as a winner.

Figure 7C:
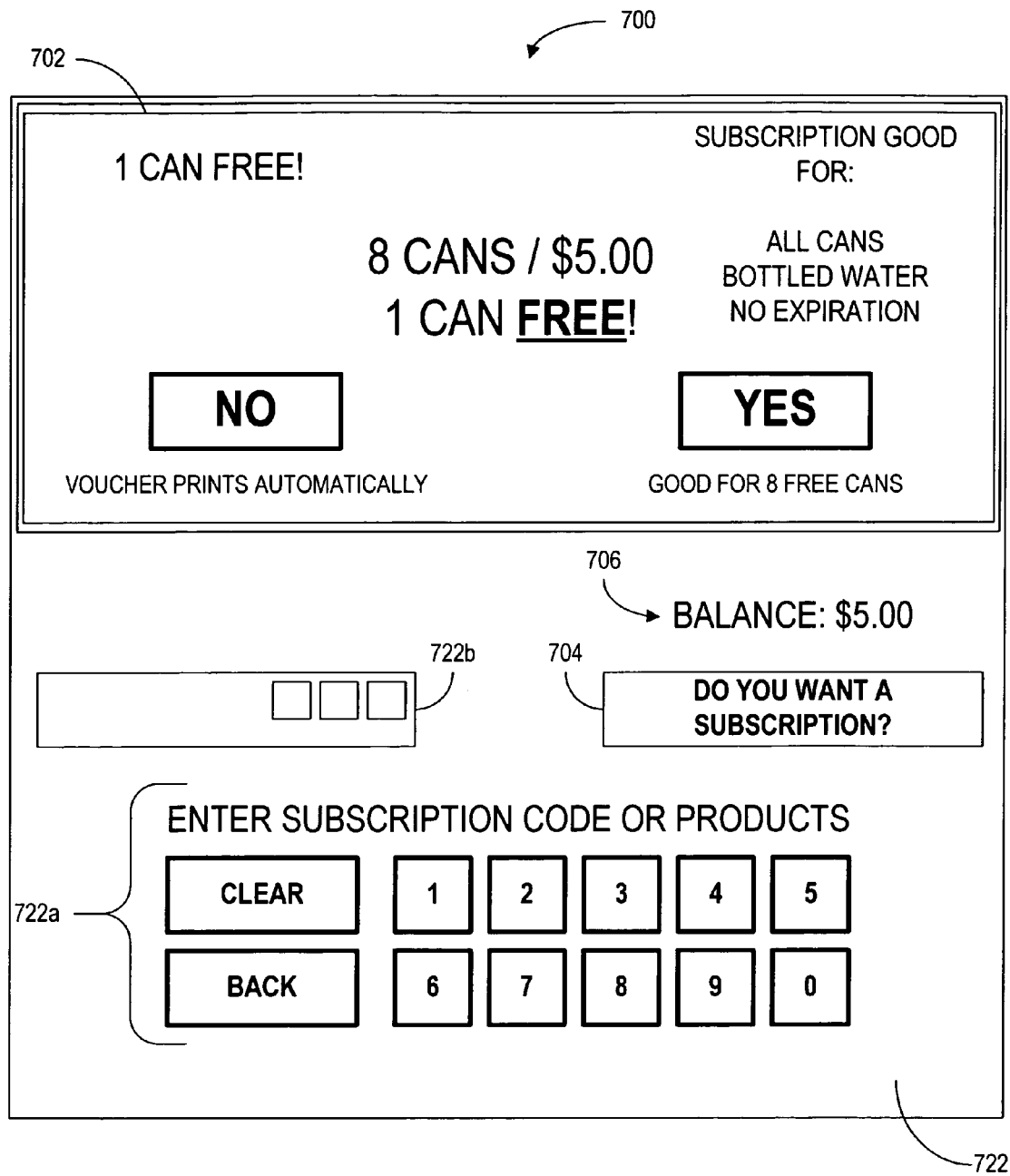

Offers may be output via any output device of the vending machine, regardless of whether such output device is a component or a peripheral of the vending machine, or is remotely in communication with the vending machine. In some embodiments, offers are output through an LCD display. Exemplary subscription offer content designed for a touch screen or LED/keypad combination is illustrated via the ongoing example in each of FIG. 7A, FIG. 7B, and FIG. 7C, as represented in the offer areas 702. FIG. 7A and FIG. 7B illustrate an embodiment in which a customer is (e.g., proactively and/or based on customer interactions with the vending machine) offered a choice to accept one of two subscription offers presented via the offer area 702. FIG. 7C illustrates an embodiment in which a single subscription offer is triggered in response to a customer's deposit of five dollars ($5.00).

In one embodiment, offers are displayed via a touch screen display so that customers may focus their attention on one location that serves to output information and receive information. It should be noted that in yet other embodiments, subscription offers may be output through a customer device, such as a cellular telephone, a PDA, a laptop computer, or the like. Further, subscription offers may be provided via e-mail, direct mailing, broadcasts, and/or other means, such that customers and/or third parties may be provided with the offers.

According to some embodiments, the method 600 may continue by receiving an indication of an acceptance of the offer, at 604. As described herein, for example, a customer presented with a subscription offer may indicate acceptance in any variety of ways, including, but not limited to: (i) inserting money into and/or otherwise providing funds to a vending machine, (ii) pressing a button and/or touch screen area associated with the subscription offer, (iii) providing an aural acceptance, and/or (iv) by performing (or failing to perform) one or more acts associated with subscription offer acceptance. A customer may, for example, press the "YES" button in the offer area 702 of the display 700 in any of FIG. 7A, FIG. 7B, and/or FIG. 7C, to indicate an acceptance of an associated subscription offer.

A customer may generally accept a subscription offer by so indicating via the vending machine's input device. For example, a customer may accept a subscription offer by pressing a button on a vending machine's touch screen or keypad. In an alternate embodiment, a customer may accept a subscription offer by pressing a button on the keypad of a cellular telephone that communicates (directly or indirectly) with the vending machine or with a server in communication with the vending machine. Further, a customer may accept a subscription offer verbally into a microphone attached to the vending machine or attached to another device, such as a customer's cellular telephone. The vending machine control system may receive an acceptance signal directly of indirectly from a device in communication with the microphone. Additionally or alternatively, a customer may accept a subscription offer by tendering payment of the subscription price.

The method 600 may continue, in some embodiments, by registering the subscription at 606. Once the subscription offer is accepted, for example, a vending machine subscription may be registered in a database, such as the illustrative subscription registration table of Applicant's U.S. Pat. Nos. 6,298,972, 6,085,888, and 5,988,346 (FIG. 5 therein). The registered subscription information may include a subscription code (e.g., a thumbprint and/or an alphanumeric code), an indication of the quantity remaining in the subscription, an indication of the terms of the subscription (e.g., subscription expiration date, redemption times), an indication of the customer and/or customer's identity, and/or an indication of a third party and/or the third party's identity.

The subscription code may be generated by the vending machine control system. For example, the code may be generated by a random number generator which generates unique random numbers having predefined characteristics, or may be identified/selected from a list of available (i.e., not-yet-issued) subscription codes.

Alternatively, as described above, the subscription code may be provided by the customer (e.g., the customer's birthday or phone number; the serial number of a five dollar ($5) bill entered into the vending machine by the customer; the customer's credit card number; biometric data provided by the customer such as a fingerprint or thumbprint). In some embodiments, the customer may be initially given the option of choosing his own alphanumeric code, or having the vending machine generate a code for the customer without reference to a customer's desired code. This option may take the form of a prompt or message on a touch screen, followed by two buttons representing the two choices, in which the customer presses one of the buttons to indicate his desired option.

Further, in embodiments where the customer redeems the first subscription item during the registration transaction, the subscription code may be linked to the first product redeemed in the subscription. For example, the subscription code may be included on the packaging of the first product (e.g., a code underneath a bottle cap; a code identified by a radio frequency transmitter affixed to the product's packaging, and/or a code indicated by a sticker coupled to a product's packaging).

In some embodiments, more than one code is identified and output to the customer. For example, in some embodiments, each prepaid item in the subscription may be associated, in a database, with a different code. In such embodiments, the vending machine may dispense several vouchers and/or tokens, such as printed vouchers, each containing a different code generated as described above (e.g., a "book" of vouchers).

Generally, customers who accept subscription offers may be issued one or more vouchers that denote and/or indicate their subscription. For example, the voucher may be a paper substrate on which is printed a code and terms of the subscription. The vending machine may generate voucher such as tickets, through a printer, or other printed matter containing subscription information (e.g., an account identifier) in a known manner.

Two vouchers may be output where it is desirable, e.g., to allow one to be stored in a safe place in case the first voucher is lost. In an embodiment where the two voucher are on a paper substrate or the like, the two voucher may be connected, and the interface between them is perforated so that the two can be easily detached from each other.

The voucher may be used by the customer to redeem subscription items upon subsequent visits to the vending machine. For example, the customer may enter a code printed on the voucher via a keypad of the vending machine, and/or the vending machine (or a peripheral device) may read or scan the voucher to determine a subscription code or identifier. The control system would in turn determine whether or not the code is valid, and if so, activate an item dispenser corresponding to the subscribed-to product, and update an account record in a subscription database to reflect the redemption. A printed subscription card containing a subscription code may indicate, via printed indicia, e.g., (i) a number of bottles of a drink the subscription card may be redeemed for, (ii) a seven digit code, and (iii) an instructional message regarding redemption (e.g., "Good any time at this vending machine only").

One or more of the vouchers may be a customer device, such as a PDA, cell phone, watch, or the like (e.g., the customer device 102 of FIG. 1). The subscription code, authorization code and/or subscription information may be transmitted via a wired or wireless medium (e.g., IR, RFID, Bluetooth™, Wi-Fi, a firewire port, and/or a USB port) to the customer device. The customer device may then be used in redeeming units of the subscription (e.g., to provide the subscription code to the vending machine wirelessly).

In some embodiments, an authorization code as well as a subscription code is output, and the authorization code is then used during, e.g., redemption of units of the subscription. The authorization code functions to authorize the use of the subscription, much like a "PIN" code authorizes the use of certain financial accounts. The authorization code may be generated like the subscription code (e.g., specified by a customer via a keypad).

For example, a first signal may be received from a fingerprint reader (e.g., indicating a representation of a customer's thumbprint) and a second signal may be received from a keypad (e.g., indicating a four digit code). Thus, a fingerprint may serve as a subscription code, and a four-digit sequence may serve as an authorization and/or verification code, or vice versa.

Further, in some embodiments a single code may serve as both the authorization code and the subscription code. For example, a single code (e.g., a fingerprint), when input, may identify the subscription and also authorize redemption of units of the subscription.

The subscription code and/or the authorization code may be, e.g., a signal received from a cellular telephone, RFID transmitter or other device that identifies the device. For example, cellular telephones emit a signal which, when detected and possibly decoded, indicates the telephone number of the cellular telephone. Thus, placing the cellular telephone within a predefined proximity of a sensor (e.g., a peripheral of a vending machine) can allow the cellular telephone number to be determined, and thus the subscription transaction to be authorized. Similarly, a vending machine can be capable of determining that a call has been placed to a predetermined number (e.g., a telephone number of the vending machine).

Accordingly, in some embodiments, the vending machine can identify the phone number (via caller-ID) of the calling telephone. Thus, the number of the calling telephone may serve as a subscription code and/or an authorization code. Other manners for determining the (unique or fairly distinct) identity of a device to be detected and determined are also known to those of skill in the art.

Again, the subscription code may also be determined from biometric data. For example, a fingerprint reader or eye scanner may detect a biometric signal of a customer, and determine the identifier of the customer and/or the corresponding subscription. Exemplary fingerprint matching software for use in accordance with the present invention includes VeriFinger™ 4.2 from Neurotechnologija, Ltd. of Vilnius, Lithuania.

Figure 7D:
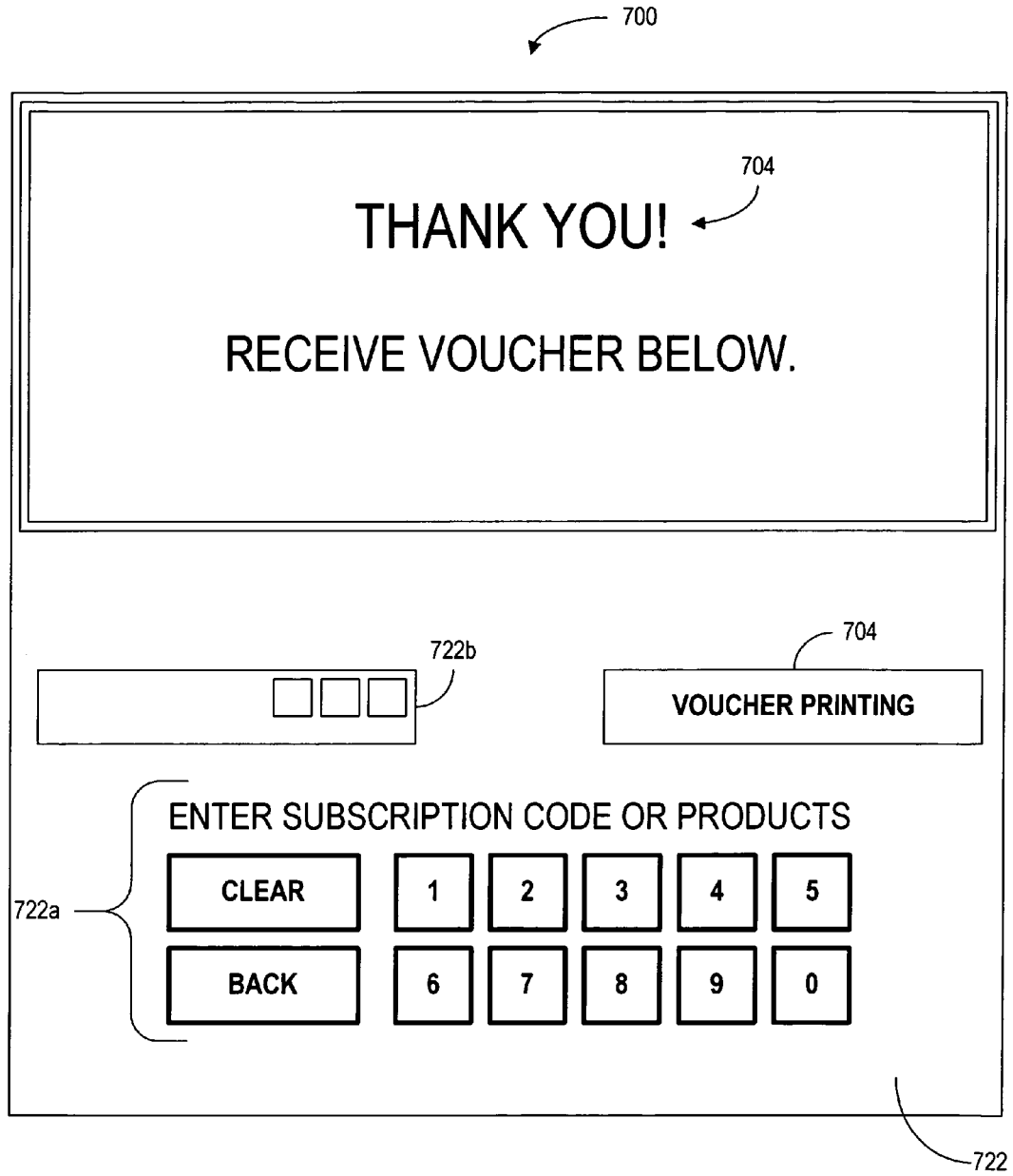
Figure 7E:
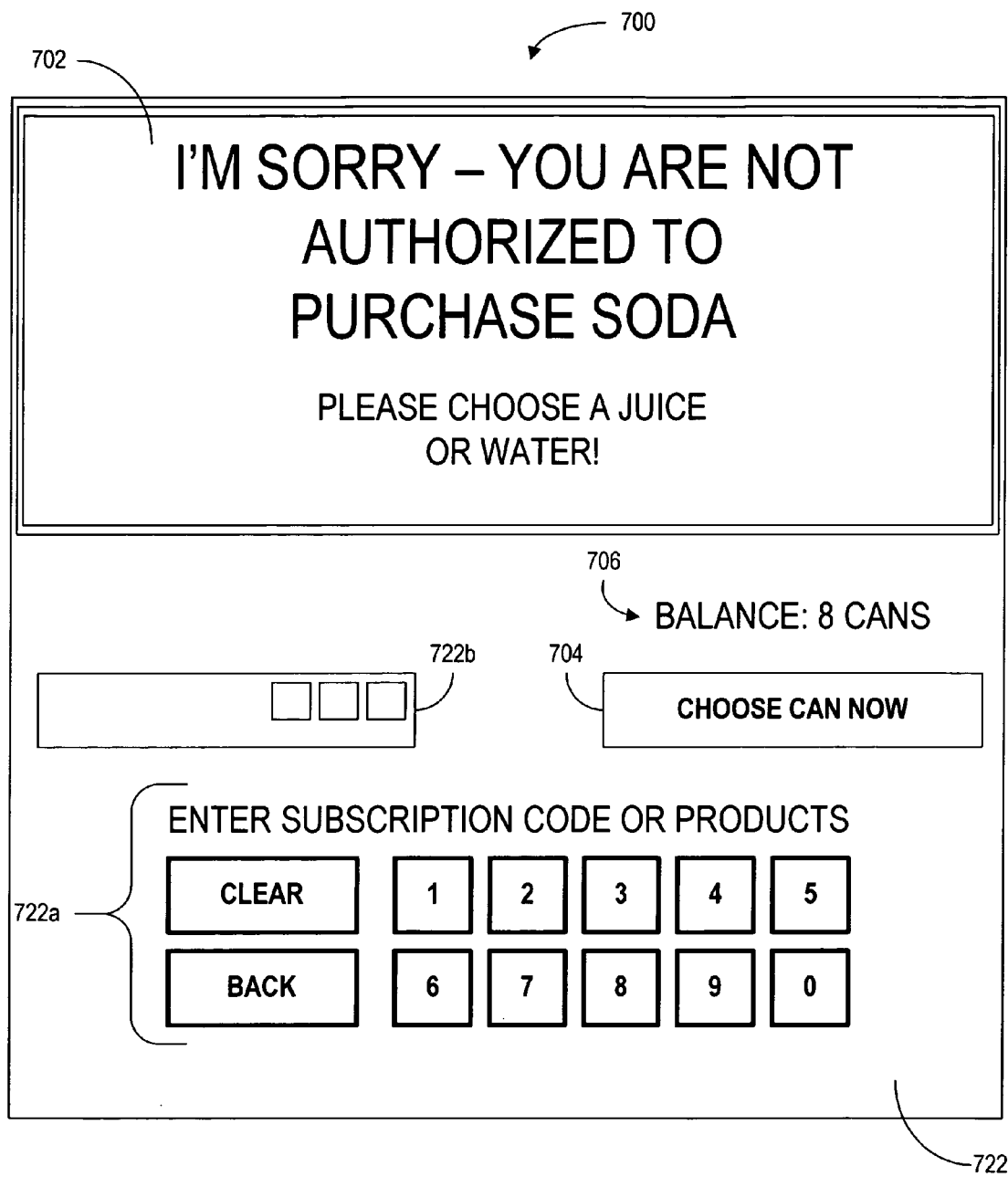

In some embodiments, the output of vouchers such as subscription cards or tokens may be preceded, accompanied by or followed by a message output via a touch screen or LCD, such as the "thank you" message depicted in FIG. 7D.

In one embodiment, customers who accept subscription offers may be issued a read/write magnetic stripe card that can be updated upon subsequent visits to reflect the redemption of subscription items. In such an embodiment, the magnetic strip of the card stores subscription information in a known manner, and that subscription information is read by a card reader in a known manner.

In other embodiments, customers who accept subscription offers may be provided with subscription information via other output devices (other than printers), such as LED or LCD displays (e.g., subscription codes may be provided on such displays), audio speakers, or the like. Such customers would be required to remember subscription codes. Thus, in some embodiments, customers may be prompted, as part of the subscription registration step, to provide challenge questions and/or response answers so that, should the customer later forget his code, he may be asked the registered question (e.g., "What is your pet's name?") and provided with the code if the customer's answer (e.g., the provided pet name) matches that which was previously stored in a database during the registration step.

In some embodiments, customers may register subscriptions online or remotely, e.g., via a cellular telephone, via a computer/Web-enabled cellular telephone which accesses the Internet. In some such embodiments involving the Internet, customers may (e.g., through a personal computer or Web-enabled cellular telephone) log on a Web site associated with the vending machine operator. Customers may be presented with subscription offers through the Web site, and may register for subscriptions by authorizing credit card charges in amounts corresponding to subscription prices. Other forms of payment include digital currencies, and online payment mechanisms such as the one by PayPal®. In some embodiments, customers are provided with a single subscription code for each subscription. In other embodiments, customers are provided with several subscription codes for a single subscription. In such embodiments, subscription codes maybe emailed to customers periodically (e.g., a new code every week).

In embodiments where customers register for subscriptions online, the issuance of subscription codes may be handled in several ways. In one embodiment, new codes are generated upon registration, and such codes are made available to one or more vending machines (e.g., via an electronic network the vending machines access, via data copied to the vending machine by one or more operators) so that, upon redemption of a subscription item, such vending machines may confirm that presented codes match the issued codes.

In another embodiment, duplicative lists of subscription codes are maintained both by the host computer that facilitates registration, and by the one or more vending machines that facilitate redemption. Thus, in such "duplicative list" embodiments, a real-time communication link need not be established between the vending machine and the registration computer during a redemption transaction.

In another embodiment, the subscription codes may be generated in such a way that duplication by another vending machine is virtually impossible (e.g., the subscription codes are thirty digits long). Thus, vending machines could generate codes without reference to codes on a list maintained by the host computer that facilitates registration. It should be noted that subscription codes may be output separately from account registration.

Before, during or after account registration, account parameters may be set, modified or otherwise controlled by an account holder and/or by a third party (a parent, a vending machine operator, a school principal, a commercial sponsor, etc.). Account parameters may be set, modified or otherwise controlled through a vending machine input device, through a remote computer (e.g., a server), through a customer device (e.g., cell phone, PDA, etc.), or through any combination thereof. In one or more embodiments, passwords, PINs, or the like may be required before account parameters may be set, modified or otherwise controlled. Account parameters may be recorded (in a database) in association with registered subscriptions (e.g., in a subscription registration table).

In one or more embodiments, rules may define the item(s) that may be redeemed according to product attributes such as the product's identity, type, category, brand, manufacturer, ingredients, nutritional information, and the like. Further, in one or more embodiments, other conditions for redemption may be set, including but not limited to: (i) time conditions (e.g., redemption only after noon; redemption only within two (2) days of scheduled restock event); (ii) weather conditions (e.g., no redemption if temperature exceeds ninety (90) degrees Fahrenheit); (iii) inventory conditions (e.g., redemption only permitted if more than fifteen (15) units of a product remain in inventory); and/or (iv) sales conditions (e.g., redemption only permitted if actual velocity is less than ideal velocity; redemption only permitted for relatively unpopular products).

In one example, a customer accepts a subscription offer at a vending machine (e.g., by pressing a button on a keypad, at 604) and is prompted by the vending machine (through an output device) to set certain account parameters. The customer may set account parameters that limit the customer's ability to redeem more than a certain number of products within a certain time period. Such an embodiment may be useful in that it acts as a way for customers to limit consumption of certain items such as high calorie candy bars, etc.

In another example, a parent of a school-age customer logs onto a website and is prompted to set account parameters corresponding to the child's subscription account. The parent may set account parameters that limit the categories of products that may be redeemed from a vending machine placed in the child's school (e.g., no chocolate, only trail mix; no soda, only water or juice). Such functionality may be of particular use to parents of diabetic children or children with certain allergies, as parents may prevent or reduce a child's access to products containing certain ingredients (e.g., sugar, peanut butter, etc.).

In yet another example, an operator of a vending machine accesses a customer's subscription account record through a personal computer. After viewing the customer's purchase history and/or redemption behavior, the operator may increase the number of remaining units in the subscription, thereby rewarding the customer his loyalty. Alternatively, after confirming a machine malfunction, an operator may increase the unit balance of the subscription (e.g., by one (1)) to compensate the customer for a product that was selected but not dispensed due to the malfunction. Various embodiments for querying and modifying subscription account records are disclosed with reference to FIGS. 9-42 herein.

Figure 8:
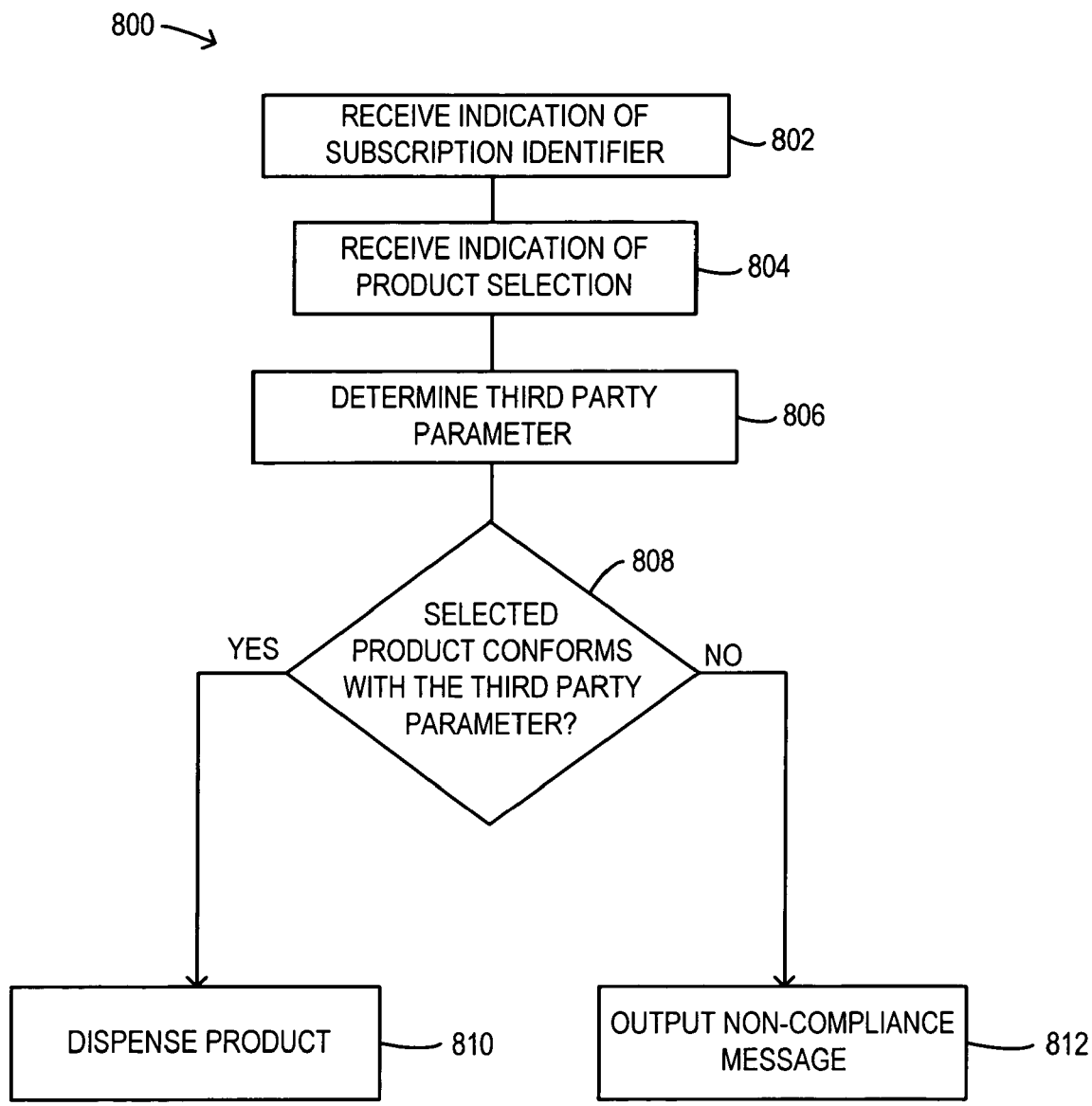
FIG. 8 is a flow diagram of a method according to some embodiments.
Figure 16:
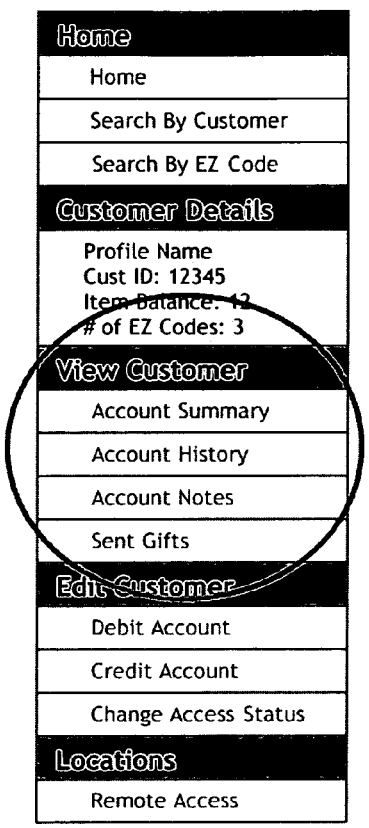
FIG. 16 is a block diagram of an exemplary display according to some embodiments.
Figure 26:
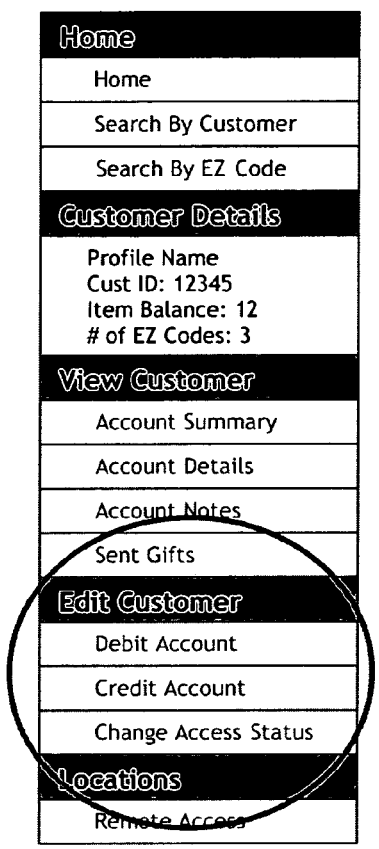
FIG. 26 is a block diagram of an exemplary display according to some embodiments.
Figure 37:
FIG. 37 is a block diagram of an exemplary display according to some embodiments.
Figure 38:
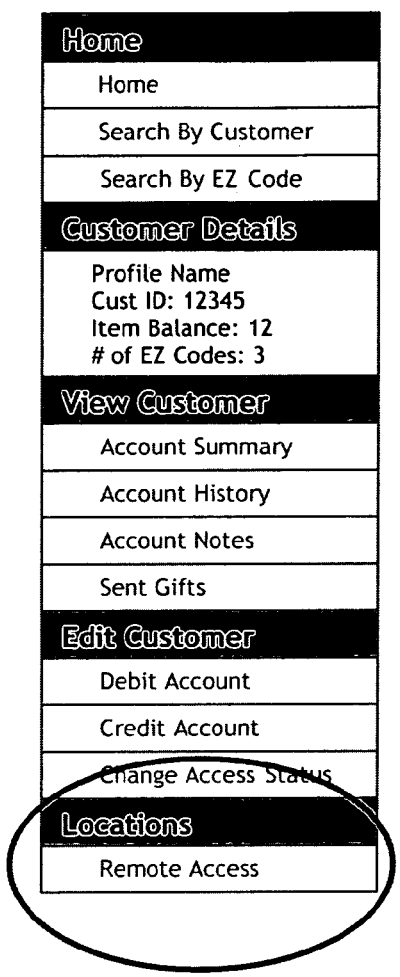
FIG. 38 is a block diagram of an exemplary display according to some embodiments.
Figure 40:
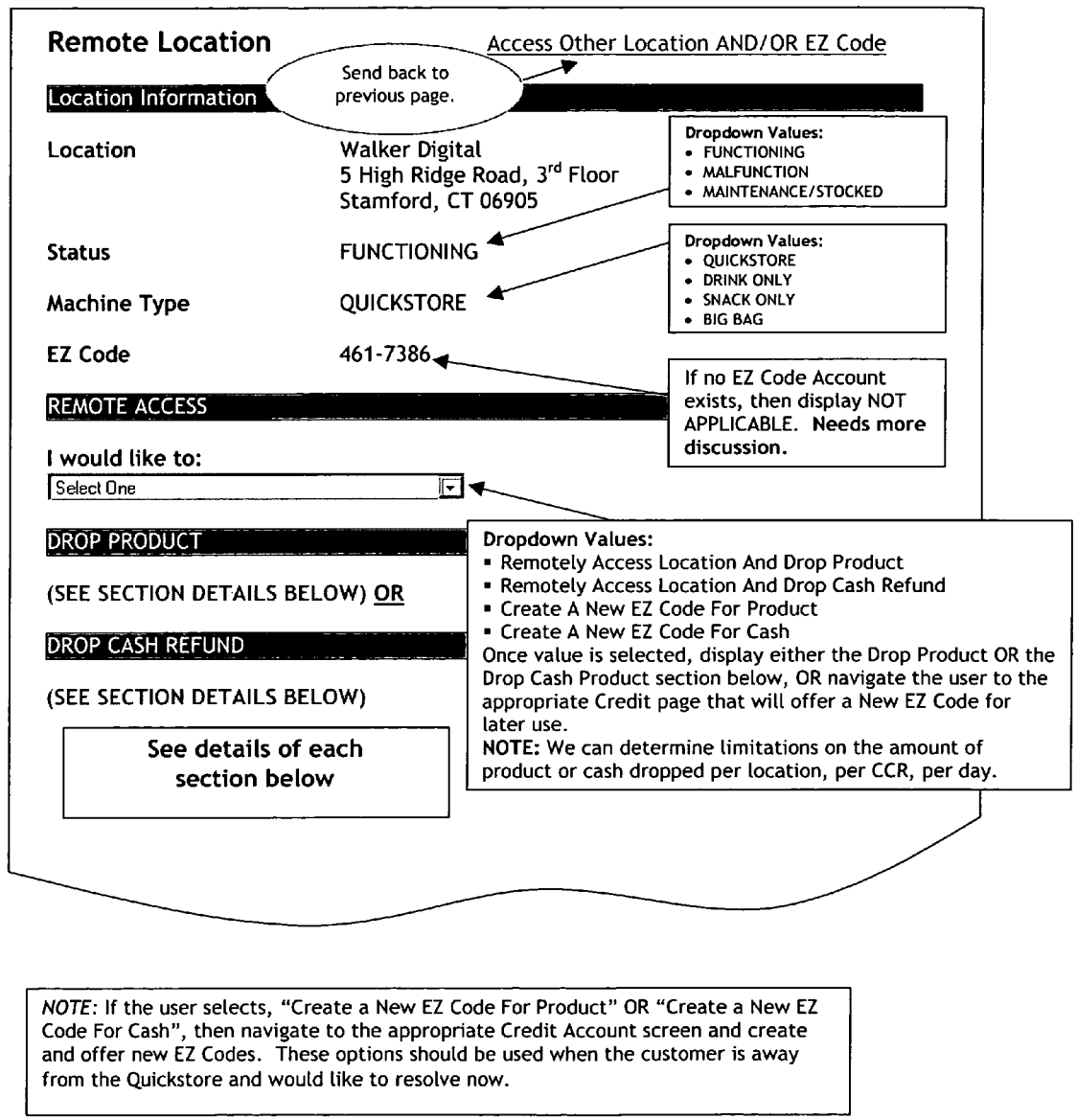
FIG. 40 is a block diagram of an exemplary display according to some embodiments.

Referring now to FIG. 8, a flowchart of a method 800 according to some embodiments is shown. In some embodiments, the method 800 may be related to the method 600 of FIG. 6. The method 800 may, for example, comprise processes that are a continuation and/or are supplemental to those of the method 600 of FIG. 6.

According to some embodiments, the method 800 may begin at 802 by receiving, by a vending machine, an indication of a subscription identifier. After a registration transaction has been successfully processed and/or account parameters have been established, for example, a customer having a subscription may proceed to use a subscription code to redeem one or more subscription items at a vending machine. Typically, the customer need first indicate to the vending machine that the customer so desires to redeem one or more subscription items.

In some embodiments, a redemption transaction is initiated when a customer sends a signal to the vending machine control system through an input device such as a touch screen, keypad and/or finger print reader. In some embodiments, a dedicated button of a touch screen or a keypad of keys (real keys or virtual keys on a touch screen) may function to allow customers to initiate a redemption transaction.

The method 800 may then continue, for example, by receiving an indication of a product selection, at 804. In an embodiment, customers may be allowed to fill a virtual "basket" of goods by selecting items and quantities through one or more input devices. The vending machine control system may store an indication of the selected products in a temporary memory, such as stored in RAM. After a customer indicates which item or items he or she wishes to purchase, the vending machine control system may output, through an output device such as a speaker, touch screen and/or LED display, one or more payment options, including but not limited to (i) a cash payment option, (ii) an option that allows, subscription customers to redeem one or more items with a subscription code, and/or (iii) a credit payment option.

The customer may indicate which item or items he or she wishes to purchase by explicitly indicating each of those items. Alternatively, the customer's selection(s) from prior transactions can be stored and offered to the customer. The customer may accept such an offer of a selection by, e.g., pressing an indicated button on a touch screen. For example, the customer's last selection may be offered (e.g., "Press here to order a Sprite® soda and a Snickers® candy bar again"). The customer's selections from the last few transactions may be offered (e.g., and accepted by pressing one of a plurality of buttons). The customer's most commonly selected selections from previous transactions may be offered (e.g., and accepted by pressing one of a plurality of buttons).

Subscription codes may be presented either directly via input devices such as keypads, finger print readers and touch screens, or via machine-readable tokens, such as bar coded vouchers, magnetic stripe cards, RFID transmitters, magnetic devices, etc. Further, in some embodiments, subscription codes may be presented to vending machines indirectly through customer devices (e.g., cell phones, PDAs, etc.).

In some embodiments, the method 800 may continue at 806 by determining a parameter governing a subscription associated with the identifier, wherein the parameter is defined by a third party. The subscription and/or subscription identifier may also or alternatively be verified. According on one embodiment, after the customer has indicated a desire to redeem a subscription item with a subscription code, the vending machine control system determines whether or not to honor the request, e.g., by determining (i) if the subscription code is valid, and (ii) if the requested item is out of stock or otherwise unavailable, such as if the requested item is outside previously established account parameters. As stated, account parameters may have been set by an account holder or by a third party (e.g., a parent, a vending machine operator).

The validation of a subscription code may be executed by referencing a stored record corresponding to the subscription in a subscription registration table. Thus, subscription codes may be validated by determining if a presented code matches a subscription code corresponding to a registered subscription in a subscription registration table. For example, in one embodiment, subscription codes may be validated by determining whether presented biometric data (e.g. a customer's finger print) matches biometric data stored in a record corresponding to a subscription in a subscription registration table. Again, exemplary fingerprint matching software for use in accordance with the present invention includes VeriFinger™ 4.2 from Neurotechnologija, Ltd. of Vilnius, Lithuania.

Further, as discussed in Applicant's U.S. Pat. Nos. 6,298, 972, 6,085,888, and 5,988,346, subscription codes may be validated, e.g., by determining whether or not the underlying subscription has expired, and/or whether or not all units in the subscription have been redeemed. For example, if a corresponding record indicates that the customer only has three items remaining in a subscription, he may not be permitted to redeem four items with the corresponding subscription code. Conversely, if a customer has indicated a request to redeem three items, he may be permitted to so redeem the items if his subscription indicates that he has four remaining units in his subscription. Thus, customers may redeem more than one item during a redemption transaction, so long as the vending machine control system can validate the provided subscription code in light of the quantity of unredeemed items in the customer's subscription.

If the subscription code is deemed valid (e.g., corresponds to an entry on a list of approved subscription codes), the vending machine control system may determine whether or not the requested item is out of stock, for example, by consulting an inventory database. Further, the vending machine control system may determine whether or not the requested item is instead reserved for another subscriber, such as a subscriber who has paid a premium to guarantee availability of subscription items (i.e., a "hard reserve" feature) at certain times.

The method 800 may continue, according to some embodiments, by determining whether the product selection is in conformance with the third-party parameter governing the subscription, at 808. The vending machine and/or vending machine control system may, for example, determine whether or not the requested item falls within account parameters previously established by a customer or a third party. Generally, this determination may be made by comparing attributes of a requested product to the account parameters stored in association with the requester's subscription account. For example, if a school age customer requests a soda beverage from a school's vending machine, the vending machine control system may query the customer's subscription account record to determine if his mother or father has previously indicated that the child is not to receive soda.

In the case that the selected product is determined to be compliant and/or conform with any subscription parameters—including third party parameters—the method 800 may continue to 810 to dispense the product (e.g., to the customer). If the provided subscription code is deemed valid, if the requested item is in stock, if the requested item is not reserved for another subscribing customer, and/or if the requested item falls within previously established account parameters, for example, the vending machine control system may activate an item dispensing apparatus corresponding to the requested product to dispense the product to the customer. The activation of product dispensing apparatus is known in the vending machine art and need not be described in further detail herein. In the case that the product is determined not to be complaint and/or otherwise acceptable in light of any account parameters, the method 800 may alternatively continue to 812, to output a non-compliance message (e.g., to the customer). Other actions and/or inactions may also or alternatively be associated with a determination of product unacceptability.

Various methods are contemplated, for example, for handling situations where a subscribing customer attempts to redeem a product that is sold-out or reserved for another subscribing customer, including: (i) offering a better or comparable substitute product (Methods for determining substitute products are disclosed in Applicant's co-pending U.S. patent application Ser. No. 09/345,094, entitled VENDING MACHINE SYSTEM AND METHOD FOR ENCOURAGING THE PURCHASE OF PROFITABLE ITEMS, the entirety of which is incorporated by reference herein), (ii) adding one or more additional units to the registered subscription of the customer, and/or (iii) offering "value" back to the customer, including but not limited to (a) refunds or rebates for the full retail price of the item requested, (b) refunds or rebates for the price paid per unit of the subscription item, and/or (c) sweepstakes entries. In some embodiments, refunds or rebates may take the form of cash or vouchers for machine credit. Vouchers for machine credit may optionally have usage restrictions associated therewith, such as time windows for usage and expiration dates.

In addition, if requested products are sold-out or reserved for other subscribing customers, then output devices may be configured to output one or more messages, such as informational messages. In one embodiment, "reserved" products are so indicated through LED lights or any other output device. Further, in some embodiments, an "assurance" message is output to the subscribing customer who is denied the ability to redeem a requested item during a redemption transaction. For example, a message may be communicated through a touch screen, reading "Don't worry, you still have 8 sodas in your subscription to redeem at a later time." Note that a vending machine might also output a similar message in the event of a "miss-vend", or mechanical error.

Further, in some embodiments where a requested product does not fall within previously established account parameters, a vending machine control system may: (1) output a message to the customer, reminding the customer that the selected item does not fall within established account parameters (e.g. "I'm sorry—you are not authorized to purchase soda—Please choose a Juice or Water!"; as shown in one of the message areas 704 of FIG. 7E, of the ongoing example); (2) record the request in a database; (3) record a picture of the requester in a database; (4) output a notification message to a third party or other party (e.g. a parent; an insurance company); and/or (5) seek authorization to dispense the requested product by (i) outputting a request for authorization to another party, such as a third party (e.g., an email message to a parent asking the parent to authorize redemption of the requested item), and (ii) receiving and evaluating a response to the request for authorization.

During redemption transactions, vending machines may output, through output devices, a variety of other messages. For example, a message reading "Thank you for using your subscription" may be communicated. Alternatively or additionally, a "savings reminder" message could be communicated to the customer, reminding the customer of the per unit savings realized through the use of the subscription promotion. For example, a message may be output, reading "You saved $0.25 on this unit by purchasing a subscription!" Further, in some embodiments, balance information (i.e., how many remaining units are available for future redemption in conjunction with a registered subscription) may be communicated to customers during the redemption transaction. However, it should be noted that, in some embodiments, balance and other subscription information may be "suppressed" (i.e., not shown) until and unless affirmatively requested by a subscribing customer (e.g., through a "balance inquiry" button of a touch screen). Such concealment would function to respect the privacy concerns of subscribing customers.

In some embodiments, it may be desirable to construct a vending machine that houses supplemental, dedicated inventory storage containers that may be exclusively used to fulfill the redemption of outstanding subscriptions. For example, certain product rows may be dedicated to fulfilling redemption requests for subscriptions.

In some embodiments, a subscription can allow a customer to acquire (additionally or alternatively) goods or services that are not available for sale from the vending machine to non-subscription customers. For example, the redemption of a subscription, or the mere possession of a subscription, can allow a customer to, e.g., use wireless services available from the vending machine. For example, the vending machine may allow Internet access by being a "hotspot" and granting the customer access. Similarly, the customer may be granted Voice-over-IP (VoIP) services (e.g., allowing the customer to make VoIP phone calls).

Such granted services may be restricted by a number of "units" conferred upon the subscriber, such units being consumed upon, e.g., acquisition of a good, use of a service. For example, the customer, upon purchasing a subscription, may be granted a predetermined number of "minutes", which are consumed as the customer uses wireless Internet access and/ or makes VoIP phone calls. Such units may be purchased by subscription holders (e.g., one hundred (100) minutes for five dollars ($5)), or only conferred/increased upon renewing/ recharging a subscription (e.g., every five dollar ($5) subscription confers an additional one hundred (100) "minutes"). According to one or more embodiments, account parameters may define a degree of access to a communication network, such as the Internet. For example, a parent may limit a child's ability to visit websites containing obscene, indecent or otherwise offensive material.

In addition to updating inventory databases to reflect the redemption of subscription items (e.g., reduce the number of items of the product remaining), the vending machine control system may update registered subscription data, for example, by updating records in a subscription registration table that correspond to the customer's subscription code (e.g., reduce the number of items which may subsequently be redeemed).

If a customer has been denied the ability to redeem requested subscription items in a given redemption transaction, and has been provided with one or more additional subscription units to compensate him for his inconvenience, the customer's subscription data may be adjusted to reflect this change (e.g., by adding the additional units to the appropriate customer record in the subscription registration table). Further, as noted, if the customer has requested an item that does not fall within previously established account parameters, the request may be recorded for later viewing by the customer and/or by a third party.

In addition to or in lieu of updating subscription registration databases, the vending machine's payment processing apparatus may be configured to physically modify tokens provided by the subscription customer during the redemption transaction. For example, in an embodiment where subscription codes are provided on magnetic stripe cards, magnetic information stored thereon may be updated by the vending machine's card reader/writer to reflect the redemption of one or more subscription items (e.g., reduce the number of items which may be subsequently redeemed). In an embodiment in which tokens take the form of paper-based vouchers or cards, such tokens may be notched, hole-punched, printed on or otherwise physically altered to reflect the redemption of subscription items.

A. Alternate Embodiments

Various methods for allowing customers to renew or modify subscriptions are within the scope of the present invention. In one embodiment, customers are provided, through an output device, a reminder message indicating the number of unredeemed items remaining in the subscription, along with a subscription renewal offer. For example, a textual message provided via touch screen may read "You only have 3 Cokes® sodas left. Would you like to add 8 more to your Soda Card for $5? Just press ACCEPT and deposit $5."

Customers may also enter their subscription code, press a "recharge" button or otherwise indicate a desire to "recharge" (e.g., increase the number of units which may be redeemed with the subscription by a predetermined number, based on the inserted amount of currency), and insert the required amount of currency to "recharge" the subscription. The terms of the offer may be based on the terms of the previous subscription, but need not be identical thereto. For example, it can be advantageous to offer a subscription with terms that increase the profitability of transactions or subscriptions.

In some renewal embodiments, the vending machine control system may dynamically construct such "renewal" offers depending on the customer's prior subscription purchase and redemption patterns. Thus, a customer who has purchased a threshold number of subscriptions in the past, and/or has consistently redeemed a threshold number of units associated with subscriptions, may be offered a subscription offer that provides for a greater subscription quantity than previously available to the customer. For example, a customer who has purchased three subscriptions to Coke® soda over the past three months and has redeemed ninety-five percent (95%) of the subscription items may be offered the ability to purchase a subscription to eight (8) units of Coke® at a deeper per unit discount. In this manner, customers who have already indicated their willingness and ability to establish longitudinal (long lasting) relationships with a vending machine and/or a product may be provided subscription offers that are intended to increase the customer's the level of commitment.

In some embodiments, third party approval may be required for the renewal of a subscription account. For example, a parent may be required to visit a website and accept a renewal offer (which may have been distributed via email). For the third party's consideration, the renewal offer may be accompanied by redemption information (i.e., so that the third party may consider the account holder's prior redemption behavior when determining whether to authorize renewal).

In some embodiments, where redemption of two (or an even number of) items is required (e.g., a "2-for-$1" vending machine), then the subscription offer, when accepted, may give the customer an odd number of units remaining to be redeemed. Thus, the customer cannot completely deplete (reduce to zero) the number of units remaining on the subscription. It is more likely that the customer, having, e.g., one (1) unit remaining, would renew or recharge his subscription.

Further, in some renewal embodiments, the vending machine and/or a remote computer may store, in a database, a financial account identifier associated with a subscription customer, allowing the customer to readily render/authorize payment through such financial account. Financial account identifiers include credit card numbers, debit card numbers, checking account numbers, or the like.

In some embodiments, customers are provided with subscription "renewal" offers that must be affirmatively accepted by customers before subscriptions are renewed and financial account identifiers are accordingly used to charge customers for the subscription price. In such embodiments, customers may be provided with such subscription extension offers either (a) at a vending machine (e.g., during a redemption transaction), or (b) through a communications network, such as over the Internet (e.g., via Web or email) or through a cellular network.

In other embodiments, customers agree to have their financial accounts automatically charged for subscription prices each time they have "depleted" a subscription through redeeming some or all paid-for units in the subscription. Thus, such "automatic renewal" may be authorized to occur automatically under certain conditions (e.g., when the number of units of products which may be redeemed per the subscription is at or below a predetermined threshold).

In such an embodiment, a customer may agree to such "automatic renewal" by, e.g., selecting one of two buttons (e.g., "auto-renewal" and "no auto-renewal") via a touch screen. In one embodiment, the customer is provided with the option to agree during each transaction in which the subscription is redeemed. The default upon registration of a subscription may be for "automatic renewal" to occur, and allow the customer to disable automatic renewal.

Many other additional embodiments are contemplated. In one embodiment, a customer may deposit extra coin change over time, and the vending machine control system may record each deposit in association with the customer's subscription account. When the total of the deposited change meets or exceeds a subscription price, the customer may be permitted to add units to the preexisting subscription account, or units may be added automatically. Thus, customers may have the ability to "save up" toward the purchase of additional units at a subscription price.

Alternatively, the unit balance of a subscription account may be incrementally increased as the customer deposits change, although price of each purchased unit may reflect the unit's retail price, rather than any unit discount that may be realized through a subscription price. For example, after the customer deposits seventy-five cents ($0.75) in coin change, the customer's subscription account may be incremented by one (1) unit, as units of soda in the machine are priced individually at seventy-five cents ($0.75).

In one embodiment, a subscription holder may command a vending machine to dispense an item without a consequential reduction in the number of units remaining for redemption in their subscription. Such a feature is advantageous where, for example, a customer claims the vending machine did not properly dispense a paid for product (e.g., a redemption of a unit of a subscription). Although some customers might abuse such a feature, in an embodiment where payment can be acquired automatically from the customer (e.g., by charging a known credit card account of the customer), this threat can be reduced. Specifically, whether there was actually a "misvend" (erroneous non-dispensing of an item) can be determined by determining the amount of units of the product in question that remain in the vending machine (i.e., is there one more unit than the number of recorded vends reflects?). If there is determined to be no misvend, then (i) the customer can be charged for the unit of the product reported as misvended, but believed received; (ii) the customer may be preventing from renewing the subscription; (ii) the customer may be preventing from redeeming any further units of the subscription (e.g., possibly receiving payment for unredeemed units); and/or (iv) the operator may set restrictive account parameters so that the customer is limited in his ability to redeem units of product using his subscription account.

In one embodiment, particular inventory rows or spaces within rows may be exclusively designated for "subscription only" products that are unavailable for sale to customers who do not accept subscription offers and who do not present valid subscription codes.

In one embodiment, when customers attempt to redeem a product during a redemption transaction, the vending machine control system may determine that the subscribed-to product is currently in high demand and/or short supply, and may accordingly output an offer to the customer that is intended to preserve the high demand and/or short supply inventory. For example, such customers may be offered a substitute product. In other words, customers may be provided with the option of accepting another product in lieu of the subscription item (e.g., where the customer has subscribed to a high demand product like Diet Coke® soda, the customer may be offered the ability to take another diet drink that has an equal or greater retail price). Also, where the subscribed-to product is in particularly high demand and/or short supply, the vending machine control system may output an offer to "buy the customer out" of his or her subscription, for example, by paying the customer/crediting the customer's account for an amount (e.g., an amount equal to the retail price of the remaining units in the subscription). Where the customer was initially provided a per unit discount through the subscription, such an embodiment may actually function as an opportunity for the customer to earn money by taking a financial position in vending machine inventory.

As described, in a "hard reserve" embodiment, customers may be provided the option of upgrading subscriptions so that they are guaranteed subscription items during redemption transactions. Such "hard reserve" upgrades may be purchased at a premium (for a different price) relative to other subscription offer prices.

In some embodiments, subscribers may be notified, either through the vending machine's output device(s) and/or through a communications network (e.g., via email), that service is disrupted or changed at one or more vending machines, for example, due to maintenance. The customer may indicate (e.g., to the vending machine, via a personal computer with a Web interface) which method of notification he prefers, and that method can be used to notify that customer.

In some embodiments, suggested inventory configurations for restocking purposes ("planograms"), may be designed and output based on outstanding subscriptions. Thus, in addition to or in lieu of constructing planograms based on anticipated future demand as forecasted based on previous demand for one or more products, a vending machine control system, or another computer, may retrieve information from a subscription registration database and calculate how many products are likely to be redeemed. Such a calculation may consider redemption rates for subscription promotions (e.g., only eighty percent (80%) of subscription items are redeemed).

In some embodiments, more than one individual may be registered in conjunction with a single subscription. Thus, "group" subscriptions may include several people. Each person in the group may be issued a code that references the group's subscription information in a registered subscription database. Individual codes may be comprised of a group component (e.g., the first four digits) and an individual component (e.g., the last six digits).

In some embodiments, an account holder may register, through a vending machine or through a computer, one or more account "preferences" that may be stored in association with his subscription account (e.g., in a subscription registration table). Such preferences may instruct a vending machine to perform in a certain way during a redemption transaction. Such preferences include but are not limited to: (i) language preferences (e.g., Spanish speaking account holders may have vending machines default to Spanish text on touch screens); (ii) promotional preferences (e.g., customers may wish to receive promotional offers only for certain types of products); and (iii) other preferences.

In some embodiments, an operator may establish a contractual relationship with one or more entities, including but not limited to product manufacturers, real property owners/landlords, retailers, third parties, etc. Such contractual relationships may grant such entities rights to commissions under certain conditions. Thus, in one embodiment, a "commission" database may be maintained so that different commission rates may applied for (1) different parties, and/or (2) items redeemed pursuant to a subscription as compared to items redeemed conventionally (i.e., at full retail price).

An alternate method for establishing "longitudinal relationships" with vending machine customers includes permitting customers to accept subscription offers without payment up front, provided they input a valid credit card number. The credit card number may be used to secure (i.e., "lock" or "freeze") a portion of the customer's available credit. At the end of the subscription term, the customer may be charged the subscription price.

A method for establishing "longitudinal relationships" with vending machine customers includes the provision of discounts and benefits with no pre-payment requirement. In one embodiment, customers, identified by unique customer identifiers (e.g., a frequent shopper card), agree to have their purchases tracked. Once customers have purchased a threshold number of goods or services, the vending machine control system may authorize a discount, rebate, free product, sweepstakes entry, or the like. In another embodiment, customers may agree to receive a discount unit price for an item or items, in exchange for their agreement to purchase a certain number of products over a certain period of time. Customer financial account information may be stored, so that financial accounts may be charged in the event that customers do not perform to the agreed-to terms.

In some embodiments, parents and/or other third parties may facilitate use of vending machines by customers, with or without funding or creating an account for a customer (e.g., a child). A parent may register, such as via telephone or via a Website for example, with the vending machine (or network of vending machines) to receive an activation code and/or to establish usage parameters. The customer, such as a child, may then utilize the code to access the vending machine in accordance with the defined parameters. The code may be good only for a single use, or may be utilized to interface with the vending machine on a repeat basis. According to some embodiments, teachers may utilize such codes and/or account management functions as rewards (or punishments) for students. Students receiving detention or other discipline, for example, may have their school vending machine accounts restricted, e.g., temporarily, such as during detention, for the following school day or week, etc.

According to some embodiments, such as in the case that biometrics are utilized as subscription identifiers, the vending machine may typically be required to compare two data elements (e.g., stored fingerprint data and currently received fingerprint data) to determine and/or verify a subscription identifier. In such embodiments, the stored data may reside locally, at the vending machine, such that query and processing times may be reduced. Similarly, customers that register for accounts via the vending machine may have their data stored locally, while other customer's data may need to be retrieved from a server and/or from other vending machines. In some embodiments, such as where currently received fingerprint data is determined not to be stored locally, a query to a central server may be initiated. The central server may then, for example, query an indexed database to locate any matching fingerprint data. To reduce query times, the stored data may be indexed by (i) geography (e.g., the region of the vending machine requesting the query), (ii) a customer's PIN, (iii) customer answers to various questions (e.g., "Where did you register?"), etc. According to some embodiments, customers identified as "non-local" (e.g., that required a server-based query to identify) may have their data stored locally at the vending machine for a certain amount of time. If the customer is on vacation, for example, then storing the data for longer than one week or one month may waste space in the vending machine's memory. If, however, the customer returns to the vending machine during that period, the period may be reset. Similarly, at some point the customer may be determined to now be "local", and the customer's data may be stored at the vending machine in perpetuity.

V. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method, comprising:
   receiving, by a vending machine and from a customer, an indication of a subscription identifier;
   receiving, by the vending machine and from the customer, an indication of a product selection, wherein the product selection comprises a selection of one or more of: (i) a beverage, (ii) a snack, (iii) recordable media, (iv) access to digital content, (v) network access, (vi) access to photography services, (viii) access to car wash services, and (ix) access to an electronic game;
   determining, by the vending machine, a parameter governing a subscription associated with the identifier, wherein the parameter is defined by a third party, and wherein the third party is not an operator of the vending machine;
   determining, by the vending machine, whether the product selection is in conformance with the third-party parameter governing the subscription; and
   providing, by the vending machine and to the customer, in the case that the product selection is determined to be in conformance with the third-party parameter governing the subscription, the selected product.

2. The method of claim 1, wherein
   the third party comprises one or more of: (i) a relative of the customer; (ii) a teacher of the customer; (iii) a principal of an educational institution attended by the customer;

(iv) a personal trainer of the customer; and (v) a nutritionist associated with the customer.

3. The method of claim 1, wherein the receiving of the subscription identifier comprises at least one of:
   (i) receiving an indication of the subscription identifier via a keypad;
   (ii) receiving an indication of the subscription identifier via a biometric device;
   (iii) receiving an aural indication of the subscription identifier; and
   (iv) receiving an indication of the subscription identifier by reading a voucher comprising the indication.

4. The method of claim 1, further comprising:
   verifying the subscription identifier.

5. The method of claim 1, wherein it is determined that the product selection is not in conformance with the third-party parameter governing the subscription, further comprising:
   outputting a message, the message comprising a description associated with the reason that the product selection was determined not to be in conformance with the third-party parameter governing the subscription.

6. An apparatus comprising:
   a processor; and
   a memory in communication with the processor, the memory storing instructions that when executed by the processor result in:
      receiving funds from a third party;
      establishing, based on the receipt of the funds from the third party, a subscription account for a customer, wherein the subscription account entitles the customer to redeem units of products offered for sale by a vending machine;
      receiving, from the third party, an indication of a definition of a parameter associated with the subscription account for the customer;
      receiving, after the establishment of the subscription account for the customer, an indication of a product selection made by the customer at the vending machine;
      determining whether the product selection satisfies the parameter defined by the third party; and
      dispensing, in the case that the product selection is determined to satisfy the parameter defined by the third party, the selected product to the customer.

7. The apparatus of claim 6, wherein the third party comprises one or more of: (i) a relative of a customer associated with the subscription; (ii) a teacher of the customer; (iii) a principal of an educational institution attended by the customer; (iv) a personal trainer of the customer; and (v) a nutritionist associated with the customer.

8. The apparatus of claim 6, wherein the third party comprises a sponsor of a product associated with the subscription.

9. The apparatus of claim 6, wherein the instructions, when executed by the processor, further result in one or more of:
   notifying the third party, in the case that the product selection is not determined to satisfy the parameter defined by the third party, of the product selection made by the customer; and
   requesting from the third party, in the case that the product selection is not determined to satisfy the parameter defined by the third party, authorization for a sale of a unit of the product selected by the customer.

10. The apparatus of claim 6, wherein the parameter defines a product selection condition based on one or more of: (i) a sales velocity of the selected product, (ii) a popularity of the selected product, (iii) one or more ingredients of the selected product, (iv) nutritional information of the selected product, (v) a category of the selected product, (vi) a time condition, (vii) a weather condition (viii) a brand of the selected product, (ix) a manufacturer of the selected product, and (x) a threshold amount of inventory of the selected product, wherein the threshold is greater than one unit.

11. The method of claim 1, wherein the third party comprises a sponsor of a product associated with the subscription.

12. The method of claim 1, further comprising:
   notifying the third party, in the case that the product selection is not determined to satisfy the parameter defined by the third party, of the product selection made by the customer; and
   requesting from the third party, in the case that the product selection is not determined to satisfy the parameter defined by the third party, authorization for a sale of a unit of the product selected by the customer.

13. The method of claim 1, wherein the parameter defines a product selection condition based on one or more of: (i) a sales velocity of the selected product, (ii) a popularity of the selected product, (iii) one or more ingredients of the selected product, (iv) nutritional information of the selected product, (v) a category of the selected product, (vi) a time condition, (vii) a weather condition (viii) a brand of the selected product, (ix) a manufacturer of the selected product, and (x) a threshold amount of inventory of the selected product, wherein the threshold is greater than one unit.

14. A vending machine, comprising:
   a processor; and
   a memory in communication with the processor, the memory storing instructions adapted to be executed by the processor to:
      receive, from a customer, an indication of a subscription identifier;
      receive, from the customer, an indication of a product selection;
      determine a parameter governing a subscription associated with the subscription identifier, wherein the parameter is defined by a third party, and wherein the parameter defines a product selection condition based on one or more of: (i) a sales velocity of the selected product, (ii) a popularity of the selected product, (iii) one or more ingredients of the selected product, (iv) nutritional information of the selected product, (v) a category of the selected product, (vi) a time condition, and (vii) a weather condition;
      determine whether the product selection is in conformance with the third-party parameter governing the product selection pursuant to the subscription; and
      provide to the customer, in the case that the product selection is determined to be in conformance with the third-party parameter governing the product selection pursuant to the subscription, a unit of the selected product.

15. The vending machine of claim 14, wherein the third party comprises one or more of: (i) a relative of a customer; (ii) a teacher of the customer; (iii) a principal of an educational institution attended by the customer; (iv) a personal trainer of the customer; and (v) a nutritionist associated with the customer.

16. The vending machine of claim 14, wherein the third party comprises a sponsor of a product associated with the subscription.

17. The vending machine of claim 14, wherein the instructions are further adapted to be executed by the processor to:
   notify the third party, in the case that the product selection is not determined to satisfy the parameter defined by the third party, of the product selection made by the customer.

18. The vending machine of claim 14, wherein the instructions are further adapted to be executed by the processor to:
request from the third party, in the case that the product selection is not determined to satisfy the parameter defined by the third party, authorization for a sale of a unit of the product selected by the customer.

19. A vending machine located in a school, the vending machine comprising:
a processor; and
a memory in communication with the processor, the memory storing instructions adapted to be executed by the processor to:
receive, from a student of the school, an indication of a subscription identifier;
receive, from the student, an indication of a product selection;
determine nutritional criteria governing a subscription associated with the subscription identifier, wherein the nutritional criteria is defined by a parent of the student;
determine whether the product selection is in conformance with the parent-defined nutritional criteria governing the product selection pursuant to the subscription; and
provide to the customer, in the case that the product selection is determined to be in conformance with the parent-defined nutritional criteria governing the product selection pursuant to the subscription, a unit of the selected product.

20. The vending machine of claim 19, wherein the instructions are further adapted to be executed by the processor to:
transmit an e-mail to the parent, in the case that the product selection is not determined to satisfy the parent-defined nutritional criteria, the e-mail containing one or more of: (i) a notification of the product selection made by the student, and (ii) a request for authorization to dispense a unit of the product selected by the student.

* * * * *

UNITED STATES PATENT AND TRADEMARK OFFICE
CERTIFICATE OF CORRECTION

PATENT NO. : 7,627,496 B2
APPLICATION NO. : 11/398378
DATED : December 1, 2009
INVENTOR(S) : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Second Day of November, 2010

David J. Kappos
*Director of the United States Patent and Trademark Office*